US010846257B2

(12) United States Patent
Coddington et al.

(10) Patent No.: US 10,846,257 B2
(45) Date of Patent: Nov. 24, 2020

(54) INTELLIGENT LOAD BALANCING AND HIGH SPEED INTELLIGENT NETWORK RECORDERS

(71) Applicant: Endace Technology Limited, Hamilton (NZ)

(72) Inventors: Anthony James Coddington, Tauranga (NZ); Stephen Frank Donnelly, Auckland (NZ); David William Earl, Hamilton (NZ); Maxwell John Allen, Redwood City, CA (US); Stuart Wilson, Hamilton (NZ); William Brier, Hamilton (NZ)

(73) Assignee: Endace Technology Limited, Hamilton (NZ)

( * ) Notice: Subject to any disclaimer, the term of this patent is extended or adjusted under 35 U.S.C. 154(b) by 168 days.

(21) Appl. No.: 15/145,787

(22) Filed: May 3, 2016

(65) Prior Publication Data
US 2016/0328159 A1    Nov. 10, 2016

Related U.S. Application Data

(60) Provisional application No. 62/156,885, filed on May 4, 2015.

(51) Int. Cl.
*G06F 13/40* (2006.01)
*G06F 13/42* (2006.01)
(Continued)

(52) U.S. Cl.
CPC ...... *G06F 13/4068* (2013.01); *G06F 13/4022* (2013.01); *G06F 13/4282* (2013.01);
(Continued)

(58) Field of Classification Search
CPC .... G06F 3/0613; G06F 3/0631; G06F 3/0685; G06F 13/4022; G06F 13/4068; G06F 13/4282
See application file for complete search history.

(56) References Cited

U.S. PATENT DOCUMENTS 6,625,161 B1    9/2003  Su
8,254,262 B1 *  8/2012  Williams ................ H04L 43/12
                                                        370/238
(Continued)

OTHER PUBLICATIONS

Sizes Inc.; "Rack Unit"; Apr. 12, 2011; 2 pages (Downloaded from http://sizes.com/units/rack_unit.htm on Oct. 30, 2014).
(Continued)

*Primary Examiner* — Tim T Vo
*Assistant Examiner* — Harry Z Wang
(74) *Attorney, Agent, or Firm* — Alford Law Group, Inc.; Tobi C. Clinton

(57) ABSTRACT

A high speed intelligent network recorder for recording a plurality of flows of network data packets into and out of a computer network over a relevant data time window is disclosed. The high speed intelligent network recorder includes a printed circuit board; a high speed network switching device mounted to the printed circuit board; and an X column by Y row array of a plurality of intelligent hard drives with micro-computers mounted to the printed circuit board and coupled in parallel with the high speed network switching device.

19 Claims, 36 Drawing Sheets

(51) Int. Cl.
*H04L 29/06* (2006.01)
*H04L 12/26* (2006.01)

(52) U.S. Cl.
CPC .......... *H04L 43/026* (2013.01); *H04L 43/106* (2013.01); *H04L 63/1408* (2013.01); *H04L 63/1425* (2013.01)

(56) References Cited

U.S. PATENT DOCUMENTS

| | | | |
|---|---|---|---|
| 8,880,801 B1* | 11/2014 | Robins | G06F 12/0246 711/114 |
| 2004/0117037 A1* | 6/2004 | Hinshaw | G06F 16/273 700/2 |
| 2004/0198234 A1* | 10/2004 | Wacker | H04W 24/00 455/67.13 |
| 2006/0002311 A1 | 1/2006 | Iwanaga | |
| 2007/0091559 A1 | 4/2007 | Malone | |
| 2007/0101173 A1* | 5/2007 | Fung | G06F 1/3209 713/300 |
| 2007/0206763 A1 | 9/2007 | Chandra | |
| 2007/0280115 A1 | 12/2007 | Meyer | |
| 2009/0073961 A1* | 3/2009 | Jayapalan | H04L 12/66 370/352 |
| 2010/0165881 A1 | 7/2010 | Hof | |
| 2010/0172083 A1 | 7/2010 | Randall | |
| 2010/0251242 A1 | 9/2010 | Sivasubramanian | |
| 2011/0110248 A1 | 5/2011 | Koitabashi | |
| 2011/0167221 A1* | 7/2011 | Pangal | G06F 3/065 711/117 |
| 2012/0201002 A1 | 8/2012 | Schmitt | |
| 2012/0230208 A1 | 9/2012 | Pyatkovskiy | |
| 2013/0050955 A1 | 2/2013 | Shinsato | |
| 2013/0132775 A1* | 5/2013 | Onoue | G06Q 10/063 714/33 |
| 2013/0282944 A1 | 10/2013 | Shaw | |
| 2014/0075536 A1* | 3/2014 | Davis | H04L 63/1416 726/13 |
| 2014/0226662 A1 | 8/2014 | Frost | |
| 2014/0317315 A1* | 10/2014 | Duchesneau | H04L 41/00 709/250 |
| 2014/0374366 A1* | 12/2014 | Tsai | G11B 33/00 211/26 |
| 2015/0036533 A1 | 2/2015 | Sodhi | |
| 2015/0039719 A1 | 2/2015 | Berk | |
| 2015/0071072 A1* | 3/2015 | Ratzin | G06F 9/455 370/235 |
| 2015/0146539 A1* | 5/2015 | Mehta | H04L 47/125 370/237 |
| 2015/0188831 A1 | 7/2015 | Farmanbar | |
| 2015/0277512 A1 | 10/2015 | Davis | |
| 2016/0036716 A1 | 2/2016 | Pal | |
| 2016/0112287 A1 | 4/2016 | Farmer | |
| 2016/0212021 A1 | 7/2016 | Barry | |
| 2016/0234962 A1* | 8/2016 | Shinsato | G11B 33/128 |

OTHER PUBLICATIONS

Kingston Technology Corp.; "SMART Attribute Details"; 2013; 9 pages.
Endace; "How an Endace Monitoring and Recording Fabric Aids Corporate Compliance"; 2011; 8 pages.
Endace; "EndaceProbe 3000 Series Intelligent Network Recorder", Monitor Data Sheet; Oct. 2014; 2 pages.
Endace; "EndaceProbe 7000 Series Intelligent Network Recorder", Monitor Data Sheet; Oct. 2014; 2 pages.
Endace; "EndaceProbe Series 7000 Packet Capture Performance Evaluation", Whitepaper; Oct. 2014; 4 pages.
Endace; "Pervasive Data Center Visibility with a Network Recording Fabric"; Jun. 2013; 3 pages.
Eneterprise Networking Planet; Endace: The 'Google of Packets'; Mar. 28, 2012; Copyright 2014; (downloaded from http://www.enterprisenetworkingplanet.com/nethub/endace-the-google-of-packets.html, Oct. 2014); 3 pages.
SC Magazine; "EndaceProbe: High-speed Packet Recording for Security Monitoring"; Oct. 1, 2013; (downloaded from http://www.scmagazine.com/endaceprobe-high-speed-packet-recording-for-security-monitoring/article/311648/ on Oct. 2014), 3 pages.
Ronver Systems; "EndaceProbe Intelligent Network Recorders"; Nov. 19, 2013; (downloaded from http://www.ronver.com/data-management-software/endaceprobe™-intelligent-network-recorders on Oct. 2014), 2 pages.
European Patent Office; Extended European Search Report; European Application No. 16790048.9; dated Dec. 14, 2018; 3 pages.
Lee, Young; "International Search Report"; PCT/US2016/030861; dated Sep. 22, 2016; 6 pages.
Mohri, Mineko; "International Written Opinion on Patentability"; PCT/US2016/030861; dated Nov. 16, 2017; 10 pages.

* cited by examiner

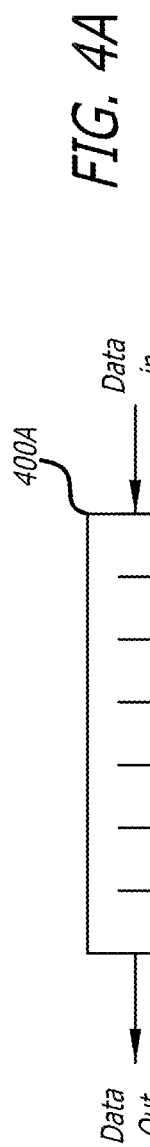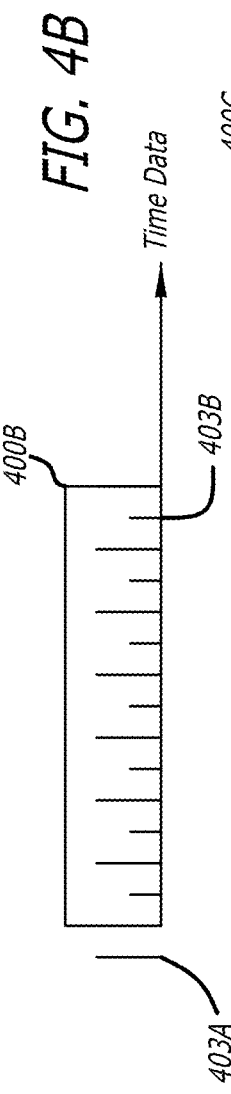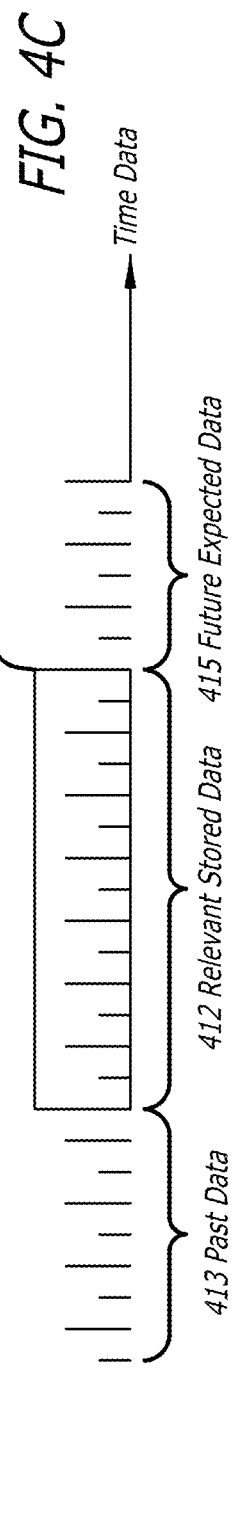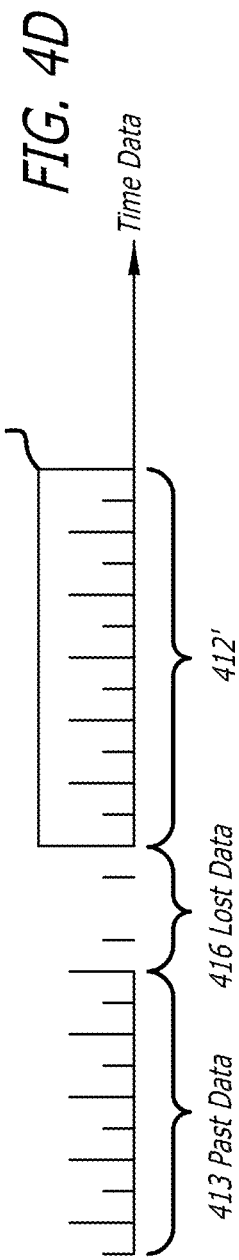
FIG. 4A
FIG. 4B
FIG. 4C
FIG. 4D

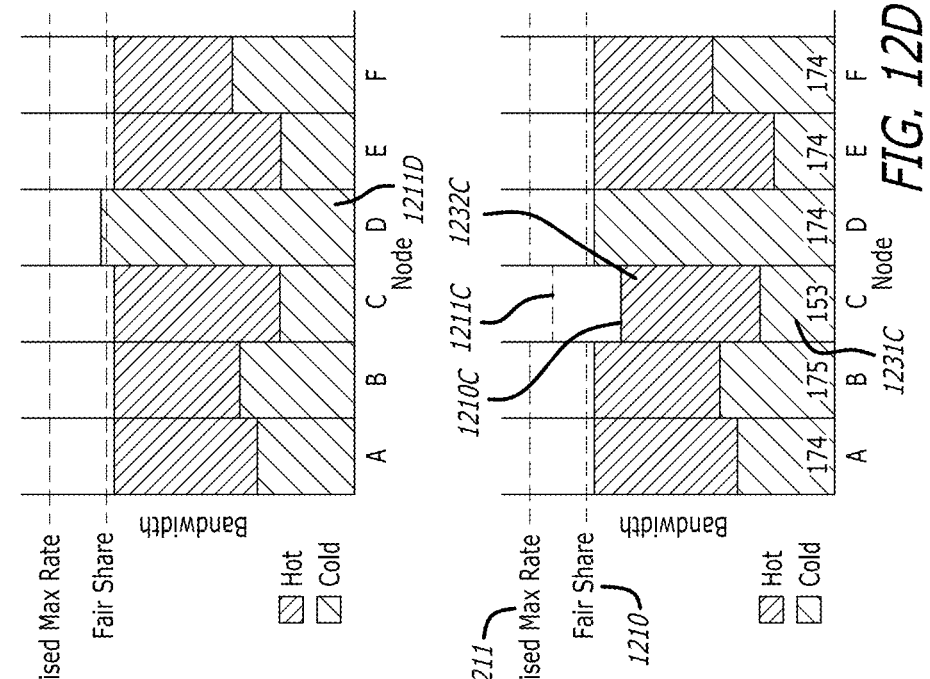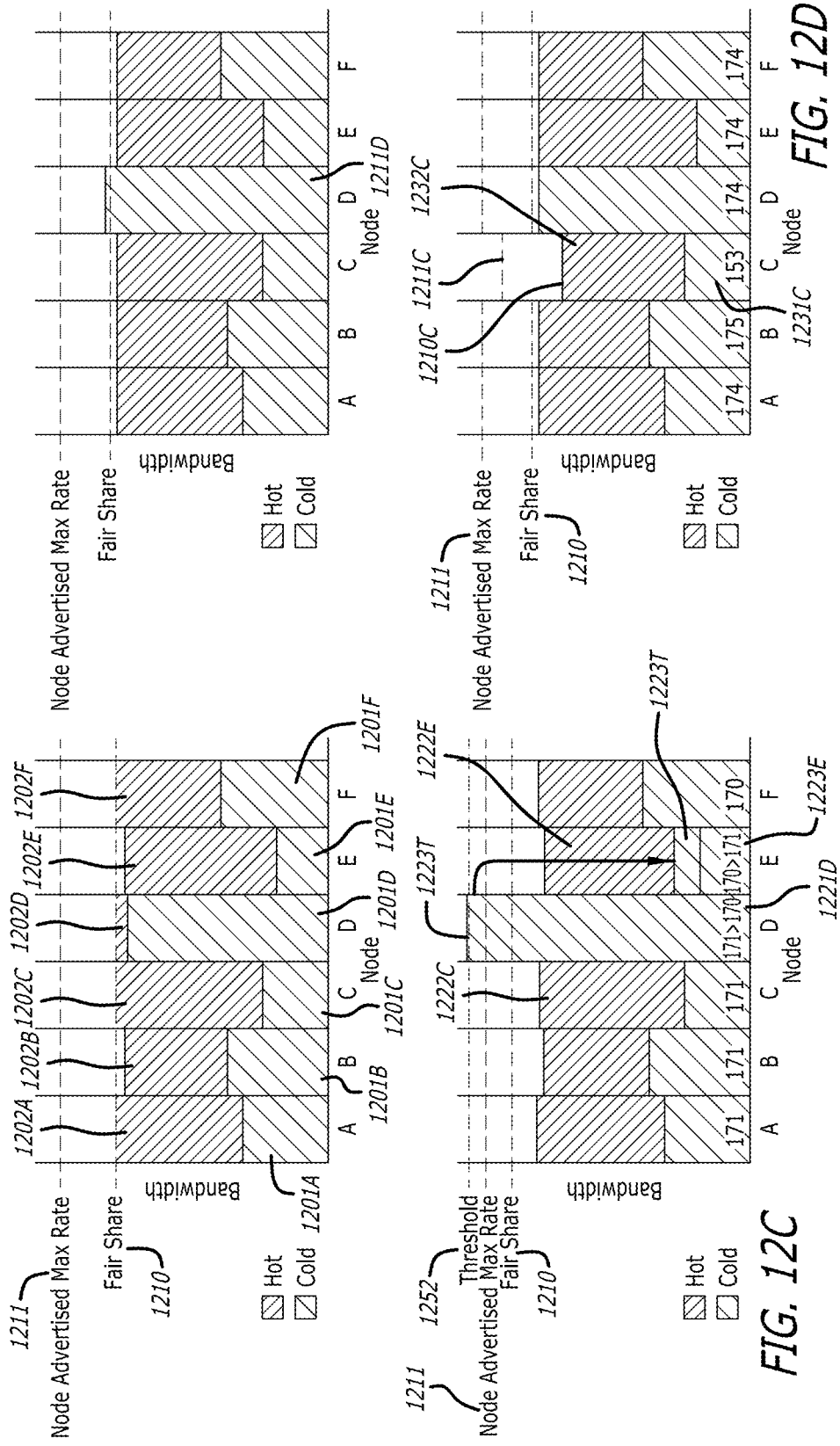

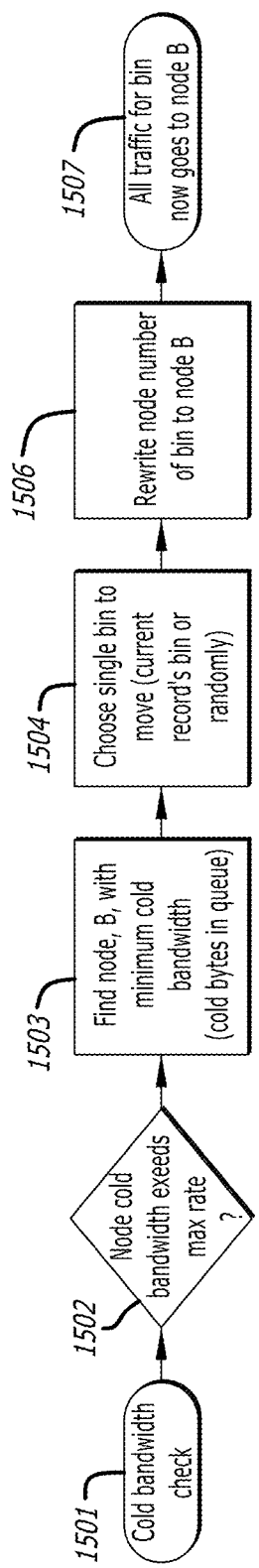
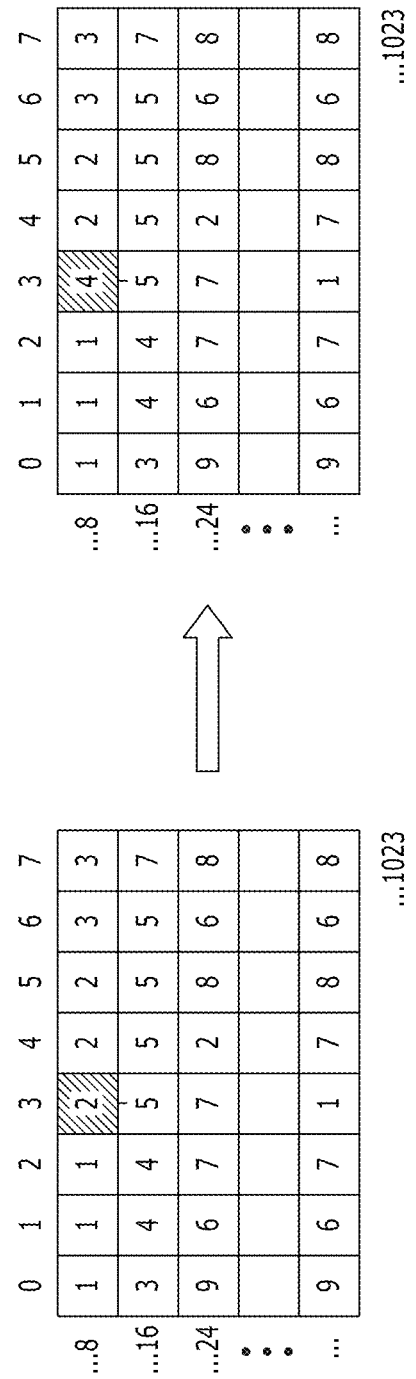
FIG. 15A
FIG. 15B

INTELLIGENT LOAD BALANCING AND HIGH SPEED INTELLIGENT NETWORK RECORDERS

CROSS REFERENCE

This patent application claims the benefit of U.S. Patent Application No. 62/156,885 entitled METHODS, APPARATUS, AND SYSTEMS FOR DISTRIBUTED HIGH SPEED INTELLIGENT NETWORK RECORDER filed on May 4, 2015 by inventors Anthony Coddington et al.

This patent application is related to U.S. patent application Ser. No. 14/459,748, entitled HASH TAG LOAD BALANCING filed on Aug. 14, 2014 by inventors Karsten Benz et al., with its hash tagging methods and apparatus incorporated herein by reference. U.S. patent application Ser. No. 14/459,748 claims priority to U.S. Patent Application No. 61/973,828 filed on Apr. 1, 2014 by inventors Karsten Benz et al.

FIELD

The embodiments generally relate to storing of ingress and egress packet communications with networked devices in a local area network.

BACKGROUND

Effective computer security strategies integrate network security monitoring. Network security monitoring involves the collection and analysis of data to help a network administrator detect and respond to intrusions. Accordingly, network security and maintenance are not simply about building impenetrable firewalls. Determined attackers may eventually overcome traditional defenses of a computer network.

The ability to capture and analyze network behavior for incident detection of a computer network attack is becoming increasingly challenging. Incident detection is particularly challenging for network and security administrators in which the computer network is capable of transmitting Ethernet frames or packets at a rate of ten gigabits per second (10 GbE) or higher. Incident detection is also challenging where a network includes a virtual, hybrid, or cloud architecture.

After an incident of a computer network attack has been detected, it is desirable to analyze how the attack occurred and what data may have been compromised or copied from a computer network. There may be some delay in determining when an incident is detected. Accordingly, storage of the data packet communication into and out of a computer network can be useful in making a determination of what data was compromised, how the data was compromised, and whom performed the attack.

Accordingly, it is desirable to store data packet communication with a computer network to assist in resolving a computer network attack.

BRIEF DESCRIPTION OF THE DRAWINGS

Embodiments will be described with reference to the Figures, in which like reference numerals denote like elements and in which:

FIGS. 4A-4D illustrate diagrams of relevant data windows along data flow time lines.

FIGS. 12A-12D illustrate bandwidth charts for various load balancing conditions that may occur in the intelligent network recording system.

FIGS. 15A-15D illustrate the process of cold bin movement rebalancing by the intelligent load balancer.

DETAILED DESCRIPTION

In the following detailed description of the embodiments, numerous specific details are set forth in order to provide a thorough understanding of the embodiments. However, it will be obvious to one skilled in the art that the embodiments may be practiced without these specific details. In other instances well known methods, procedures, components, and circuits have not been described in detail so as not to unnecessarily obscure aspects of the embodiments. A device described herein is hardware, software, or a combination of hardware and software.

Introduction

The ability to collect and access packet-level data is important to analyzing the root cause of network issues. However, capturing all of the data packets on high-speed networks can prove to be challenging. To help overcome these issues, high speed intelligent network recorders (HSINRs), are provided that include an array of intelligent hard drives, among other devices. The HSINRs provide a network recording of data packets with minimal latency, regardless of packet size, interface type, or network load. In particular, the HSINRs use hash tags in a way that simplify a load balancing scheme for recording data packets for data flows within a data center computer network.

The description herein includes a general overview of a data center, the role of HSINRs within a data center, and details of load balancing operations of network flows.

Data Center Computer Network Overview

Figure 1A:
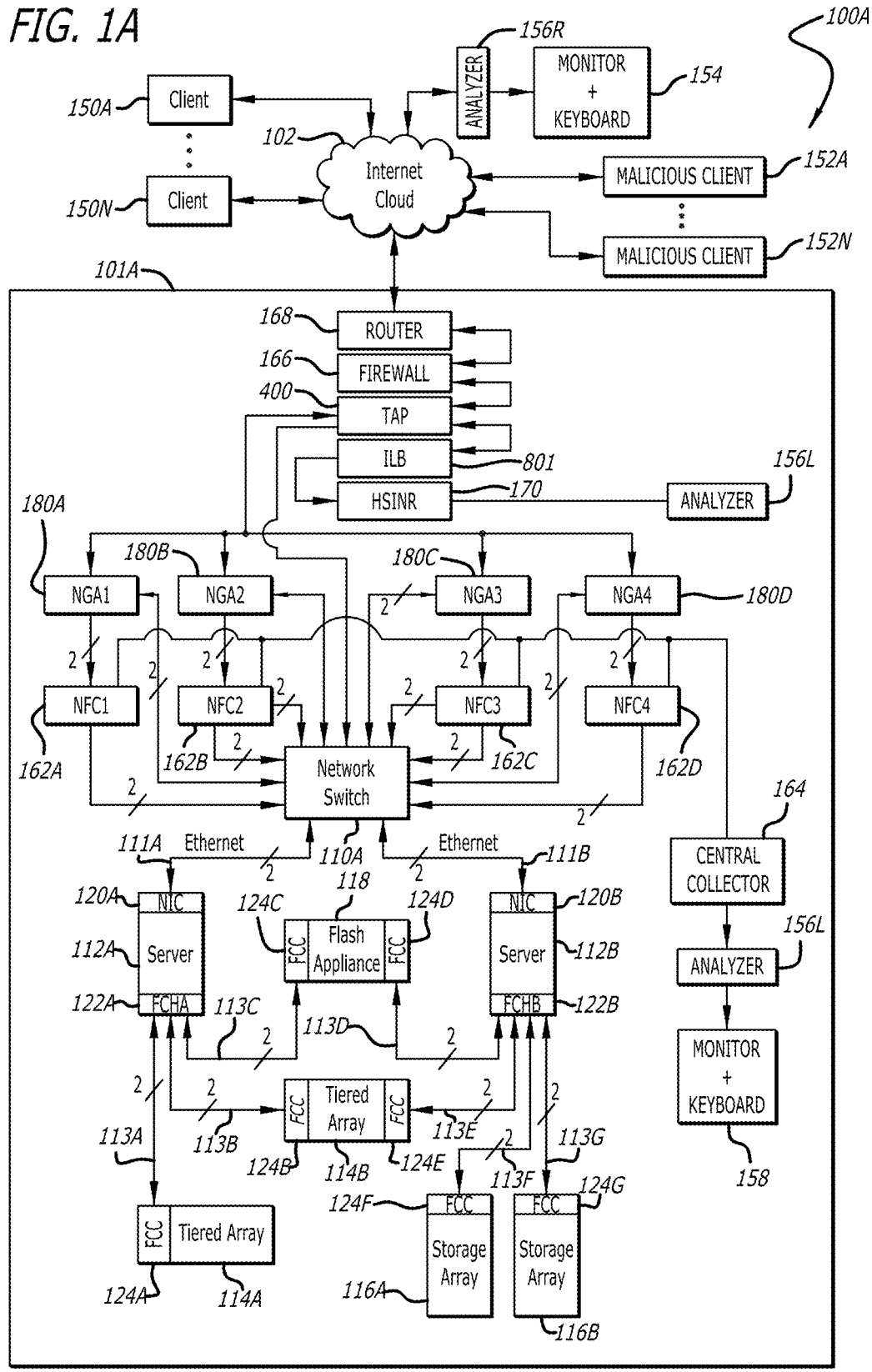
FIG. 1A illustrates a block diagram of a data center configured for centralized packet capture of ingress and egress Ethernet packets and centralized netflow record collection.

Referring now to FIG. 1A, a block diagram of an exemplary data center computer network 100A is shown. The data center computer network 100A may include, without limitation, a router 168, a firewall 166, a tap 400, an intelligent load balancer (ILB) 801, a high speed intelligent network recorder (HSINR) 170, netflow generators 180A-180D, netflow collectors (NFCs) 162A-162D, a central NFC 164, a network switch 110A, one or more servers 112A-112B, one or more tiered storage appliances 114A-114B, one or more storage array appliances 116A-116B, and one or more flash appliances 118 coupled together by one or more high speed networking cables (e.g., Ethernet wired cables 111A-111B, Fibre Channel optical cables 113A-113G) to form a local computer network 101A, often referred to as a local area network (LAN) 101A.

To store ingress and egress network internet protocol (IP) packets (e.g., Ethernet packets) between the computer network 101A and the internet cloud (wide area network) 102, the local computer network 101A includes a high speed intelligent network recorder (HSINR) 170. To balance the load of storing packets into a plurality of storage devices in the HSINR 170, the network 101 includes the intelligent load balancer (ILB) 801. To analyze the stored packets, the HSINR 170 may couple to an analyzer 156L that provides a query agent. Alternatively, a query agent may be included as part of the ILB 801.

Each NGA 180A-180D is coupled to the tap 400 to receive ingress and egress IP packets. Each NGA 180A-180D may be coupled to the switch 110A. Each NGA 180A-180D analyzes the ingress and egress IP packets it receives and generate netflow records that summarize a computer communication between IP addresses. The netflow records may be routed to a plurality of NFCs 162A-162D. Each NFC 162A-162D is coupled to the network switch 110A and the central NFC 164 that can merge netflow records together.

A pair of computer servers 112A-112B are connected to the network switch 110A via Ethernet cables 111A-111B terminating in Ethernet cards 120A-120B installed on the servers 112A-112B to communicate using an Ethernet communication protocol. The computer servers 112A-112B may further have Fibre Channel host bus adapter cards 122A-122B respectively installed into them to communicate using a Fibre Channel communication protocol.

In one embodiment, a target network device (also referred to herein as a storage target) includes Fibre Channel cards 124A-124C installed to receive signals, including a storage request, from the servers 112A-112B off of wires or cables, such as Fibre Channel cables 113C-113D. The target network device may be one of the tiered storage arrays 114A-114B, the storage arrays 116A-116B, or the flash appliance 118 (referred to collectively as storage array appliances). Fibre Channel cards 124A, 124B, 124E, 124F, and 124G may be installed in the storage array appliances 114A, 114B, 116A-116B and 118.

The servers 112A-112B have Fibre Channel host bus adapters 122A-122B that are coupled to the Fibre Channel cards 124A-124C, 124D-124G in the storage array appliances 114A-114B, 116A-116B and 118. The Fibre Channel host adapters 122A-122B may differ somewhat from the Fibre Channel cards 124A-124B, 124E-124G because the server 112A, 112B is an initiator and the storage array appliances 114A-114B, 116A-116B, 118 are targets.

In some embodiments, the connections between servers 112A-112B and the storage array appliances 114A, 114B, 116A, and 116B are via fiber cables 113A, 113B, 113E, 113F, and 113G that terminate at one end at the Fibre Channel cards 118, 124A, 124B, 124C, 124E, 124F, and 124G of the storage array appliances 114A, 114B, 116A and 116B.

One or more clients 150A-150N in a client-server network 100A may interface with the local computer network (data center) 101A over a wide area network (WAN) 102, such as the Internet or World Wide Web. The one or more clients 150A-150N may desire one or more server functions of the servers 112A-112B for software applications and/or storage capacity provided by the storage arrays or appliances 114A-114B, 116A-116B, 118 to store data. Servers/storage arrays in the data center 101A can communicate with the one or more remotely located clients 150A-150N over the WAN 102.

One or more malicious clients 152A-152N may pose a security threat to the data center computer network 100A. Accordingly, a user (e.g., network administrator) can manage security of the data center computer network 100A via tools, such as with a local analyzer 156L or a remote analyzer 156R. A local analyzer 156L may be coupled to the HSINR 170 or to the one or more NFCs 162A-162D, 164. A management console 158, including a monitor and a keyboard may be coupled to the local analyzer 156L from which the computer network can be managed by a user. Alternatively, the user can manage security of the data center computer network 100A remotely over the Internet cloud 102. For example, the user can manage security of the data center computer network 100A via tools, such as a remote analyzer tool 156R and a remote management console 154, including a monitor and keyboard. The remote analyzer 156R and the remote management console 154 are in communication with the one or more NFCs 162A-162D, 164 and/or the HSINR 170.

Figure 1B:
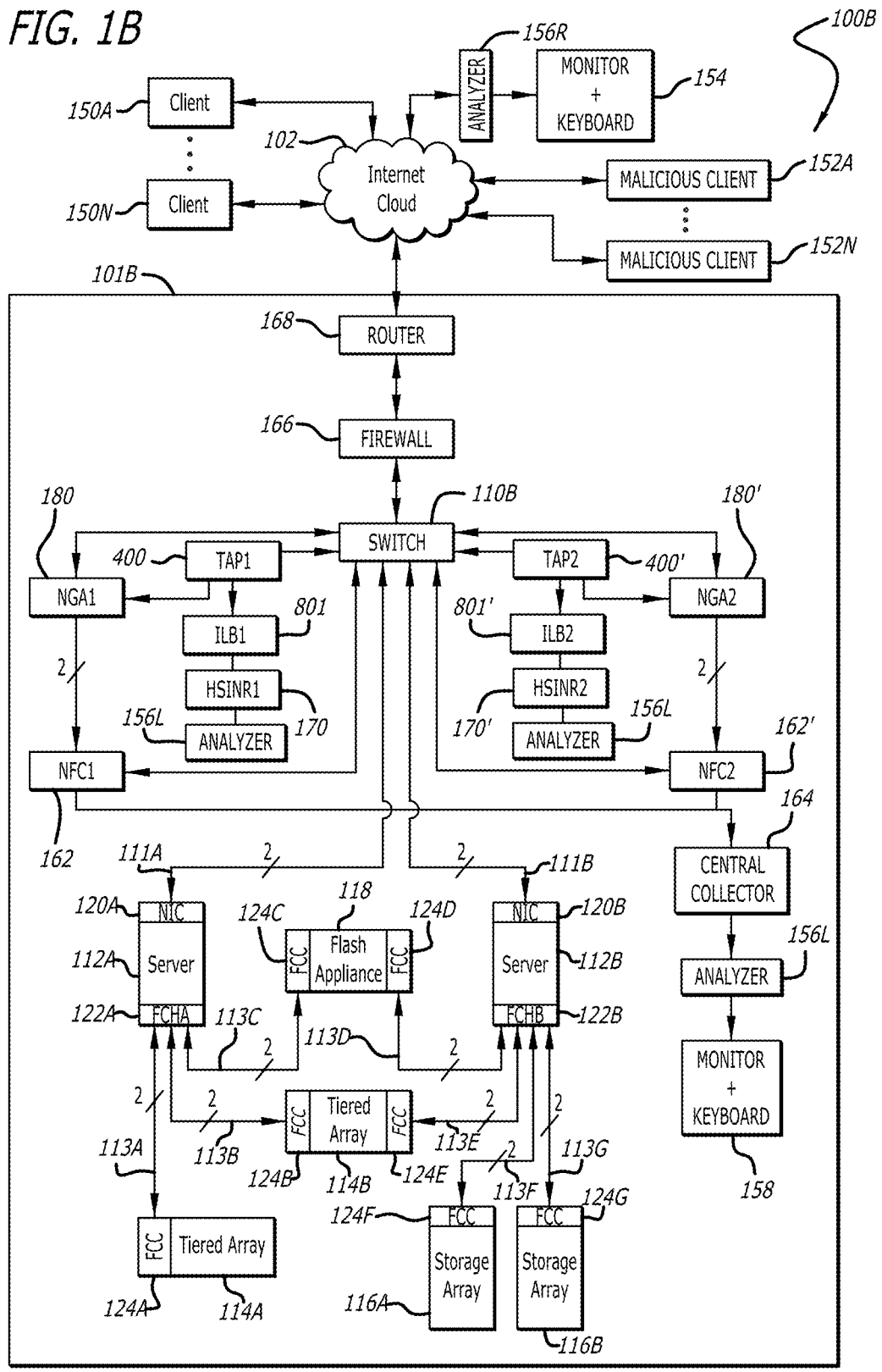
FIG. 1B illustrates a block diagram of a data center configured for distributed packet capture of ingress and egress Ethernet packets and centralized netflow record collection.

FIG. 1B is a block diagram of another example data center computer network 100B. The data center computer network 100B is similar to the data center computer network 100A of FIG. 1A. However, the data center computer network 100B of FIG. 1B includes a switch 110B that is located between the firewall 166 and two taps 400 and 400'. The network 100B includes a pair of intelligent load balancers ILB1 801 and ILB2 801', as well as a pair of high speed intelligent network recorders HSINR1 170 and HSINR2 170' respectively coupled to the pair of ILBs 801,801'. One or more local analyzers 156L with a query agent 2000 may be coupled to pair of high speed intelligent network recorders HSINR1 170 and HSINR2 170' to analyze the network traffic. Alternatively, a query agent 2000 may be included as part of each of the ILBs 801,801'.

The switch 110B is coupled to the firewall 166, tap 400, tap 400', NGA 180, and NGA 180'. The first tap TAP1 400 is also coupled to the intelligent load balancer ILB1 801 which is in turn coupled to the high speed intelligent network recorder HSINR1 170. The second tap TAP2 400' is coupled to the intelligent load balancer ILB2 801' which is in turn coupled to the high speed intelligent network recorder HSINR2 170'. The NGA 180 is coupled to the tap 400, the switch 110B, and the NFC 162. NGA 180' is coupled to the tap 400', the switch 110B, and NFC 162'. NFC 162 and NFC 162' are coupled to the switch 110B and the central NFC 164.

Other devices of the data center computer network 100B may be similar to the devices of the data center computer network 100A of FIG. 1A.

Network Data Flows and Ethernet Packets

Figure 1C:
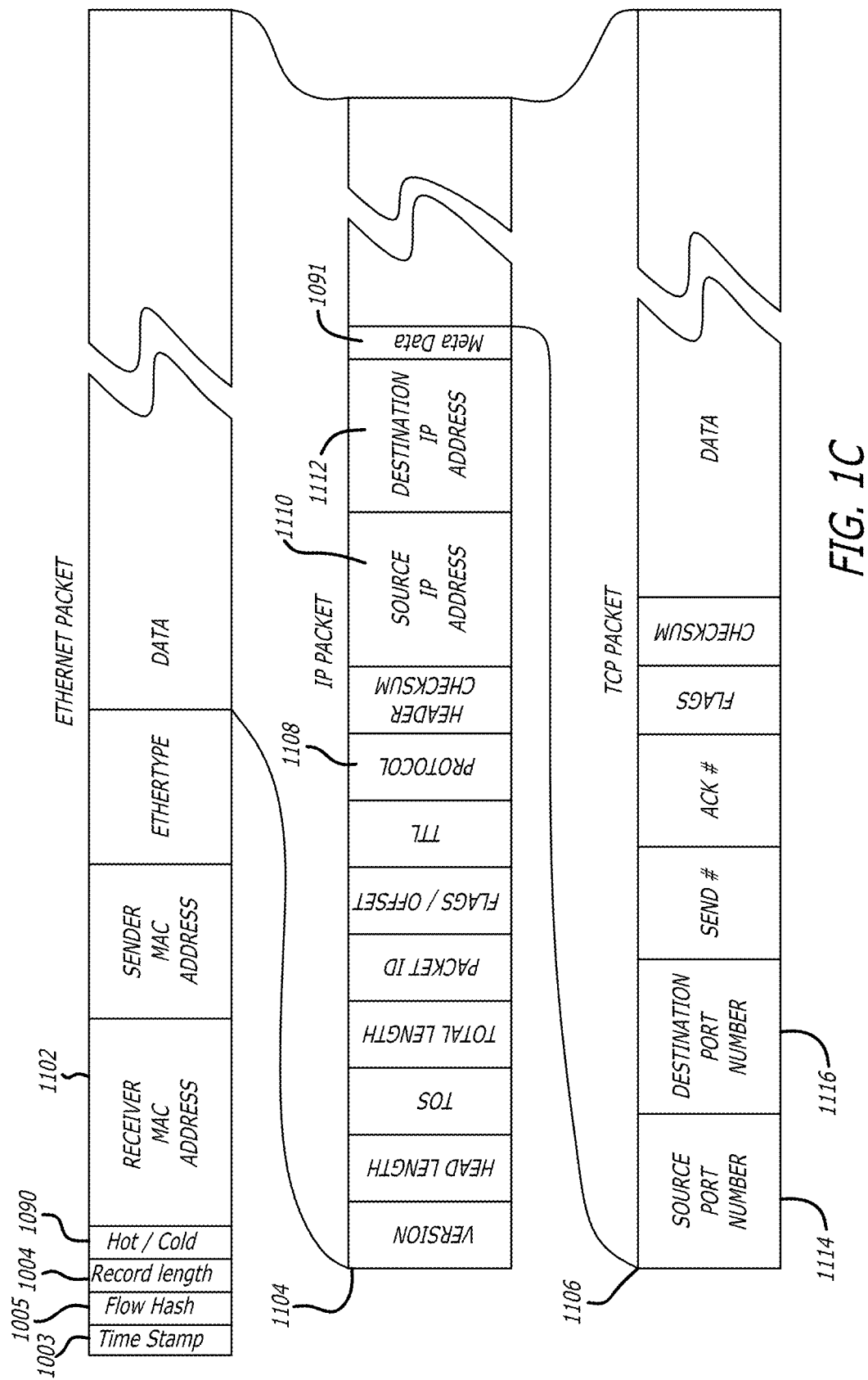
FIG. 1C illustrates a diagram of an exemplary network data packet that is recorded as part of a data flow between network addresses.

FIG. 1C is a diagram illustrating an example network data packet 1102, such as an Ethernet packet. The Ethernet packet 1102 includes a header field and a data field. The header field of the Ethernet packet 1102 includes a destination or receiver media access control (MAC) address, a source or sender MAC address, and a field for other header information such as ethertype.

The data field of the Ethernet packet 1102 includes an IP packet 1104, which includes a header field and a data field. The header field of the IP packet 1104 includes a version field, a header length field, a type of service (ToS) field, a total length field, a packet identifier, a time to live (TTL) field, a protocol field 1108, a header checksum, a source IP address 1110, and a destination IP address 1112.

To form a record, additional fields may be inserted into the header field or data field of the Ethernet packet 1102; or the header field or data field of the IP packet 1104. For example, a time stamp 1003, a flow hash 1005, and a record length 1004 may be pre-pended to the header of the Ethernet packet 1102 as shown. The Ethernet packet 1102 with this added information may be re-encapsulated to transmit one or more records over a network from one network device to another, for example, into the data field of the IP packet 1104. Further information may be added to the IP packet 1104 during processing of the record, such as a hot/cold flag 1090, and/or other meta data 1091 such as a logical unit number (LUN) or disk identifier of a storage device, for example.

The data field of the IP packet 1104 may include one or more of transmission control protocol (TCP) packets, user datagram protocol (UDP) packets, or stream control transmission protocol (SCTP) packets. FIG. 1C illustrates a transmission control protocol (TCP) packet 1106 including a header field and a data field. The header field of the TCP packet 1106 includes a source port number 1114, a destination port number 1116, a send number, an acknowledgement number, one or more flags, and a checksum. A plurality of TCP packets between the same IP addresses and port numbers may be grouped together, to form a network flow.

Network traffic into and out of a data center or local area network is organized into network flows of network packets forming conversations between processes or computers. A network flow is one or more network data packets sent over a period of time for a given communication session between two internet protocol (IP) addresses. A network flow record (netflow record) may be generated to summarily identify the network flow of network data packets between two devices associated with the two internet protocol (IP) addresses.

Devices which analyze these conversations require access primarily to the first group of N packets, perhaps twenty or thirty packets for example, in a network flow. Some analysis of conversations will find the first N packets sufficient (for example, application detection). However some analysis of conversations will require all the flow packets (for example, a SNORT analysis). Unfortunately, network flows are not uniform.

Network flows vary widely in size from conversation to conversation. Network flows with a data bandwidth smaller than a certain bandwidth threshold are referred to herein as being a cold flow, cold traffic, or just cold. Network flows with a bandwidth greater than or equal to the bandwidth threshold are referred to herein as being a hot flow, hot traffic, or just hot.

A network flow is identified by the end points which are communicating via the network flow. However, the number of specific details and the size of the specific details that identify the endpoints depend on the protocol the endpoints are using to communicate. For example, a web server and client communicating over an IPv4 TCP connection will be characterized by a pair of IPv4 32-bit IP addresses, a pair of 16-bit ports and the ethertype used. However, a similar communication over an IPv6 TCP connection will require 128-bit IPv6 addresses. A non-IP communication may be identified by MAC addresses.

In order to refer to all network flows equally, a hash is formed over the characterizing identifiers, referred to as a flowhash 1005. The flowhash is a pseudo-random number generated in response to the fields (e.g., a source IP address 1110, a destination IP address 1112, a source port number 1114, a destination port number 1116, in an Ethernet packet 1102, an IP packet 1104, and a TCP packet 1106, that are encapsulated together as one for example. U.S. patent application Ser. No. 14/459,748 describes a method of generating hash tags for netflow records, for example. The data bit width of a flowhash may be 24, 32 or 56 bits, for example.

The timestamp 1003 added to each packet of the flows can in a uniform manner identify the different dates and times the packets are received by a network device, for example, such as at probe or tap in a data center or a local area network.

High Speed Intelligent Network Recorder Functions

High speed intelligent network recorders (HSINR) are a part of a network monitoring infrastructure. High speed intelligent network recorders can capture and store network traffic at wire speed without packet loss. A high speed intelligent network recorder can store days, or weeks of network flows of data between devices depending upon how much storage is available.

High speed intelligent network recorders (HSINR) unobtrusively monitor every packet on network links, simultaneously adding a time/date stamp into each packet and storing a copy of each packet into memory and then into a hard drive. Similar to a database, network operators can query and search through the stored data packets in the high speed intelligent network recorder to quickly isolate issues that might be impacting network performance and security. A network flow of packets can be played back to analyze the traffic in greater detail. The high speed intelligent network recorder is a massively parallel distributed processor and data storage device.

Instead of packets, a data base of data fields may be stored in a high speed intelligent network recorder with an index to accelerates searches and function as a high speed data base server. An array of intelligent hard drives in the high speed intelligent network recorder can be used to perform data base operations on the data (or data packets) stored therein. One such data base operation is a network search for example.

With every captured packet being time stamped, a high speed intelligent network recorder can accurately replay stored data while maintaining inter-packet delay intervals, guaranteeing recreation of the originally monitored network traffic. Network operators can replay the stored network traffic to see events on a network as it occurred, providing the ability to recreate real network scenarios, identify the cause and effect of alarm conditions, load and test networking and security equipment and actively study user experiences for services, such as live video on demand, for example.

Figure 2A:
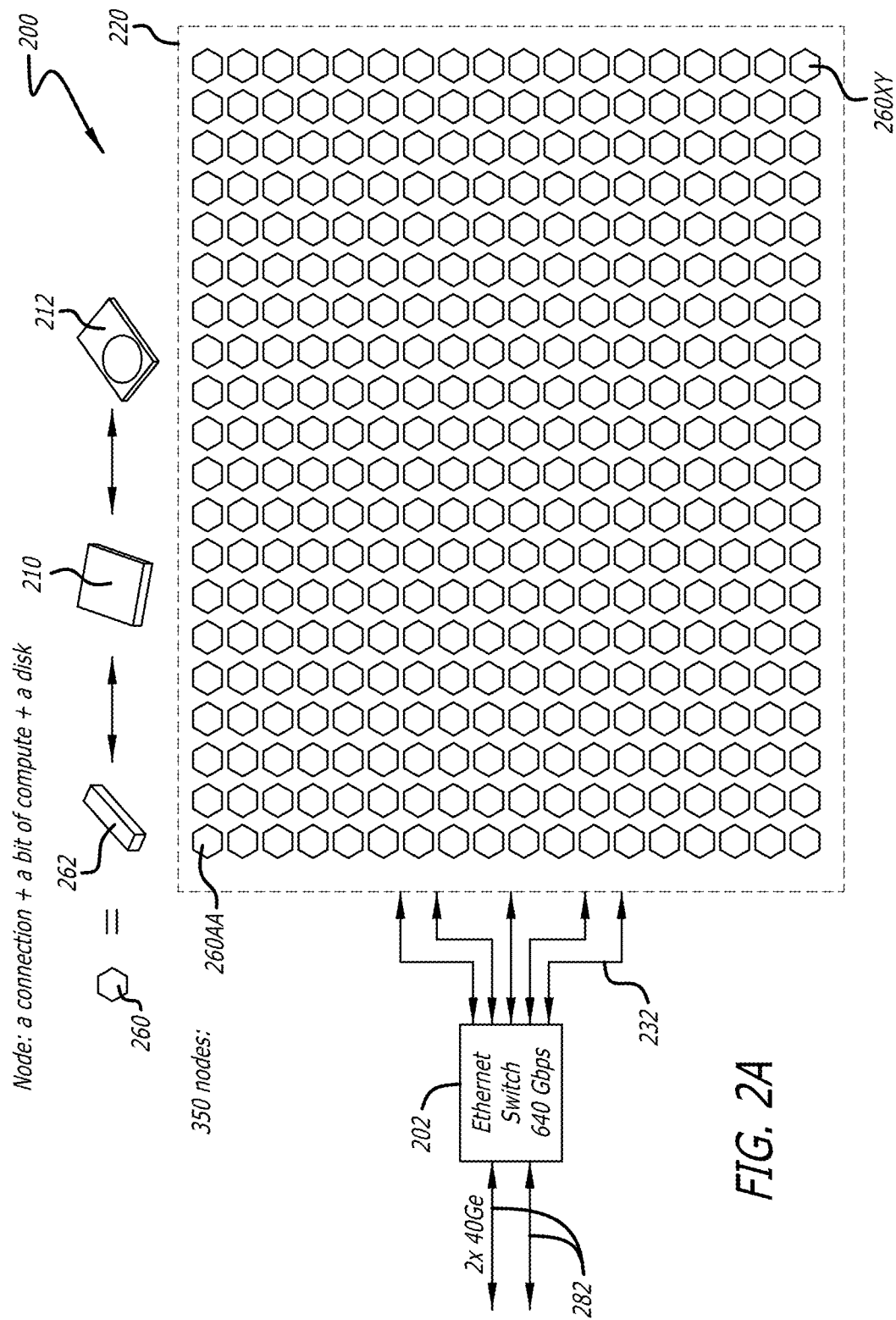
FIG. 2A illustrates a block diagram of a plurality of intelligent storage nodes coupled in communication with a high speed switch to form the basis of a high speed intelligent network recorder.

FIG. 2A illustrates a conceptual diagram of a high speed intelligent network recorder 200 with an intelligent storage array 220 of a plurality of intelligent storage nodes 260AA-260XY coupled in communication with a high speed switch 202. An intelligent storage node 260 is a system of storage resources including a connection device 262, a microcomputer 210 or portion of computer cycles thereof, and at least one hard drive 212 coupled together. The ratio of hard drive storage devices 212 to the microcomputer 210 may be one to one (1:1) or a plurality to one (e.g., N:1). One microcomputer 210 may be shared by a plurality of nodes 260 using a plurality of software processes.

Each of the plurality of storage nodes 260AA-260XY are coupled in parallel to one or more high speed network switching devices 202 by one or more high speed networking cables 232 (e.g., Ethernet or Fibre Channel communication protocols over optical or wire cables). The one or more high speed network switching devices 202 are considered to be a part of the high speed intelligent network recorder 200. The one or more high speed network switching devices 202 may be coupled to a local storage area network by another set of one or more high speed networking cables 282 (e.g., Ethernet or Fibre Channel communication protocols over optical or wire cables).

High Speed Intelligent Network Recorder Architecture

Figure 2B:
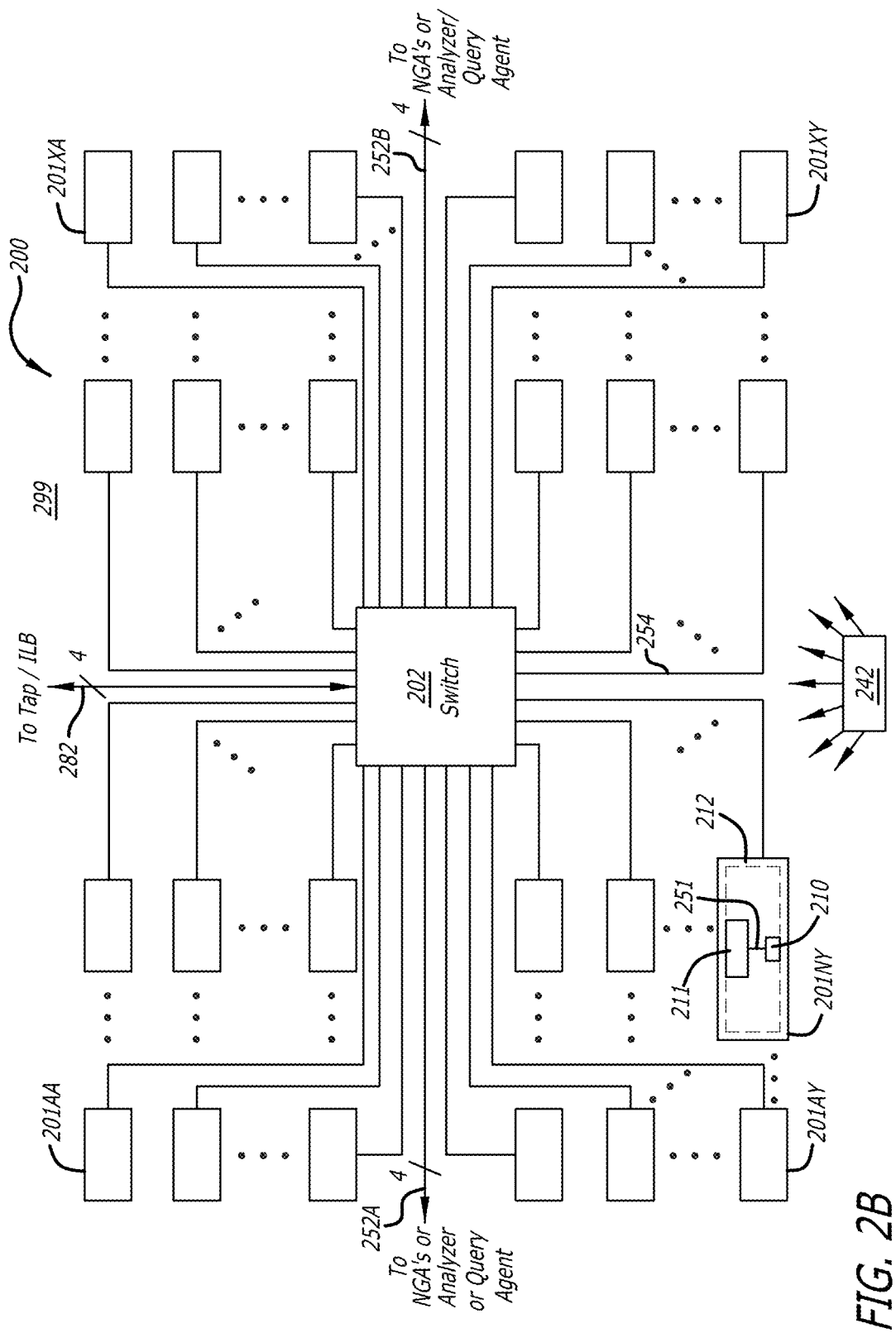
FIG. 2B illustrates a detailed block diagram of a high speed intelligent network recorder (HSINR) for recording data packets of network flows over a relevant data time window.

Referring now to FIG. 2B, a functional block diagram of a high speed intelligent network recorder (HSINR) 200 that may be used to implement the high speed intelligent network recorder (HSINR) 170,170' shown in FIGS. 1A-1B. The HSINR 200 includes a printed circuit board 299 with an X by Y intelligent storage array 220 of a plurality of intelligent hard drives 201AA-201XY coupled in parallel to a high speed network switching device 202. The printed circuit board 299 includes a plurality of wires, or printed circuit board traces 251,252A,252B,254 to propagate network signals, including Ethernet or network data packets, between devices for storage into the array of the plurality of intelligent hard drives 201AA-201XY. Alternatively, wire cables or optical cables 282,232 may be used to propagate network signals, including Ethernet or network data packets, between devices for storage into the array of the plurality of intelligent hard drives.

Figure 2C:
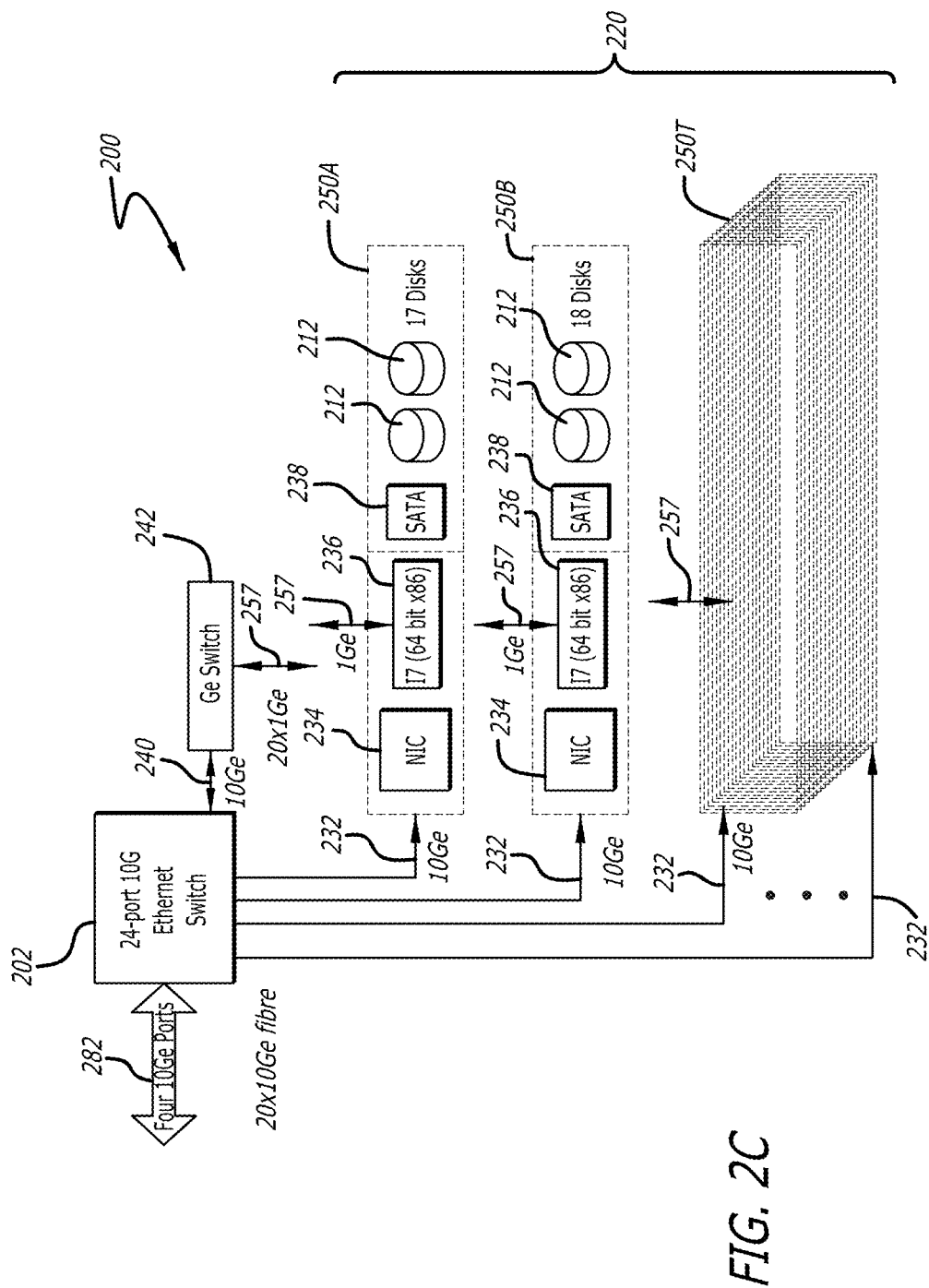
FIG. 2C illustrates a block diagram of a high speed intelligent network recorder for the management and distributed storage of IP packets in network flows.

The high speed network switching device 202 may be mounted to or plugged into the printed circuit board 299 and coupled to the wires or PCB traces 254 of the printed circuit board so that it is in communication with the plurality of intelligent hard drives 201AA-201XY. Alternatively, the high speed network switching device 202 may be a separate device that couples to the plurality of intelligent hard drives 201AA-201XY via wire cables or optical cables 232 as shown in FIG. 2C to form the HSINR.

In FIG. 2B, the high speed network switching device 202 is coupled to a network to receive a plurality of flows of network data packets to and from one or more network devices in the network. The high speed network switching device 202 may couple to the intelligent load balancer 801,801' (or the tap 400,400' without an ILB) shown in FIGS. 1A-1B by wire cables or optical cables 282. The high speed network switching device 202 may couple to one or more query agents, or analyzers by a plurality of wire cables or optical cables 252A,252B.

Each of the plurality of intelligent hard drives 201 may include a micro-computer 210 and one or more hard drive storage devices 212, such as a magnetic disk drive or a solid state storage drive (SSD), coupled in communication together. The ratio (D to M ratio) of hard drive storage devices 212 to microcomputer devices 210 may be one to one (1:1); a plurality to one (e.g., D:1); or a plurality to two (e.g., D:2).

The high speed intelligent network recorder (HSINR) may have different form factors, such as a two rack unit (2 U) form factor, a three rack unit (3 U) form factor, a four rack unit (4 U) form factor, or a six rack unit (6 U) form factor.

The number of hard drive storage devices 212 in the array 220 ranges from 100 to 2000. In one embodiment, there are 350 hard drive storage devices in the array 220, each having a capacity of about two terabytes such that there is approximately 700 terabytes of storage capacity in the array of the plurality of intelligent hard drives 201AA-201XY. In some embodiments, the hard drive storage devices have a small form factor, such as a 2.5 inch form factor of laptop drives, and a SATA interface plug.

The hard drive storage device 212 is a pluggable drive that plugs into a socket 211 such that the length of the hard drive is perpendicular to the printed circuit board 299. The socket 211 and microcomputer 210 are mounted to the printed circuit board 299. The socket 211 is coupled in communication to the microcomputer 210 through wire traces 251 of the PCB 299.

The hard drive storage device 212 includes one or more driver controllers (see driver controller 313 in FIGS. 3A-3B) that supports self-monitoring, analysis, and reporting technology (SMART). U.S. Pat. No. 6,895,500 issued May 17, 2005 to inventor Michael Rothberg, incorporated herein by reference, discloses a magnetic disk drive with SMART and how it may be used. The controller can report SMART attributes about the hard drive storage device such as head flying height, remapped sector quantity, corrected error counts, uncorrectable error counts, spin up time, temperature, and data throughput rate. Other SMART attributes can also be reported.

Information may be used to predicted advanced failure. For example, a drop in head flying height often occurs before a head crashes onto the disk or platter. Remapped sectors occur due to internally detected errors. A large quantity of remapped sectors can indicate the drive is starting to fail. Correctable error counts if significant and increasing can indicate that the drive is failing. A change in spin-up time of a disk or platter, usually an increase, can indicate problems with a spindle motor that spins the disk or platter. Drive temperature increases may also indicate spindle motor failure. A reduction in data throughput, can indicate an internal problem with the hard drive. In any case, the controller can provide an indication of advance failure of writing and reading to a hard drive, indicating unreliable, failing, or failed storage capacity, that is useful in an array of intelligent hard drives.

Referring now to FIG. 2C, a block diagram of a plurality of storage processing units 250A-250T to form the intelligent storage array 220 in the HSINR 200. Each storage processing unit 250 of the plurality may include one or more drive controllers 238 that are coupled to the one or more storage hard drives 212. Each storage processing unit 250 may further include one or more microcomputers 236 coupled to the one or more drive controllers 238 through a connector (e.g., Com Express 2.1 connector) plugged into a socket (e.g., a Com Express 2.1 socket) mounted on the backplane printed circuit board. The one or more drive controllers may be one or more SATA drive controllers 238 which are coupled to the one or more SATA storage hard drives 212.

A plurality of storage processing units 250A-250T are coupled in parallel to one or more high speed network switching devices 202 by one or more high speed networking cables 232 (e.g., Ethernet cables or Fibre Channel cables). The one or more high speed network switching devices 202 are further coupled to a local area network by one or more high speed networking cables 282 (e.g., Ethernet or Fibre Channel).

A plurality of microcomputers 236 couple to a gigabit switch 242 by a networking cable (e.g., Ethernet cable 257) for the management and control. The gigabit switch 242 is coupled to the high speed network switching device 202 by a high speed networking cable 240 and thereby coupled to the local area network. Queries may be multicasted in parallel to each of the microcomputers 236 in the high speed intelligent network recorder through the switch 242. Alternatively, unique queries may be made to a microcomputer 236 and data stored on a hard drive that is under its control.

Intelligent Hard Drives

Figure 3A:
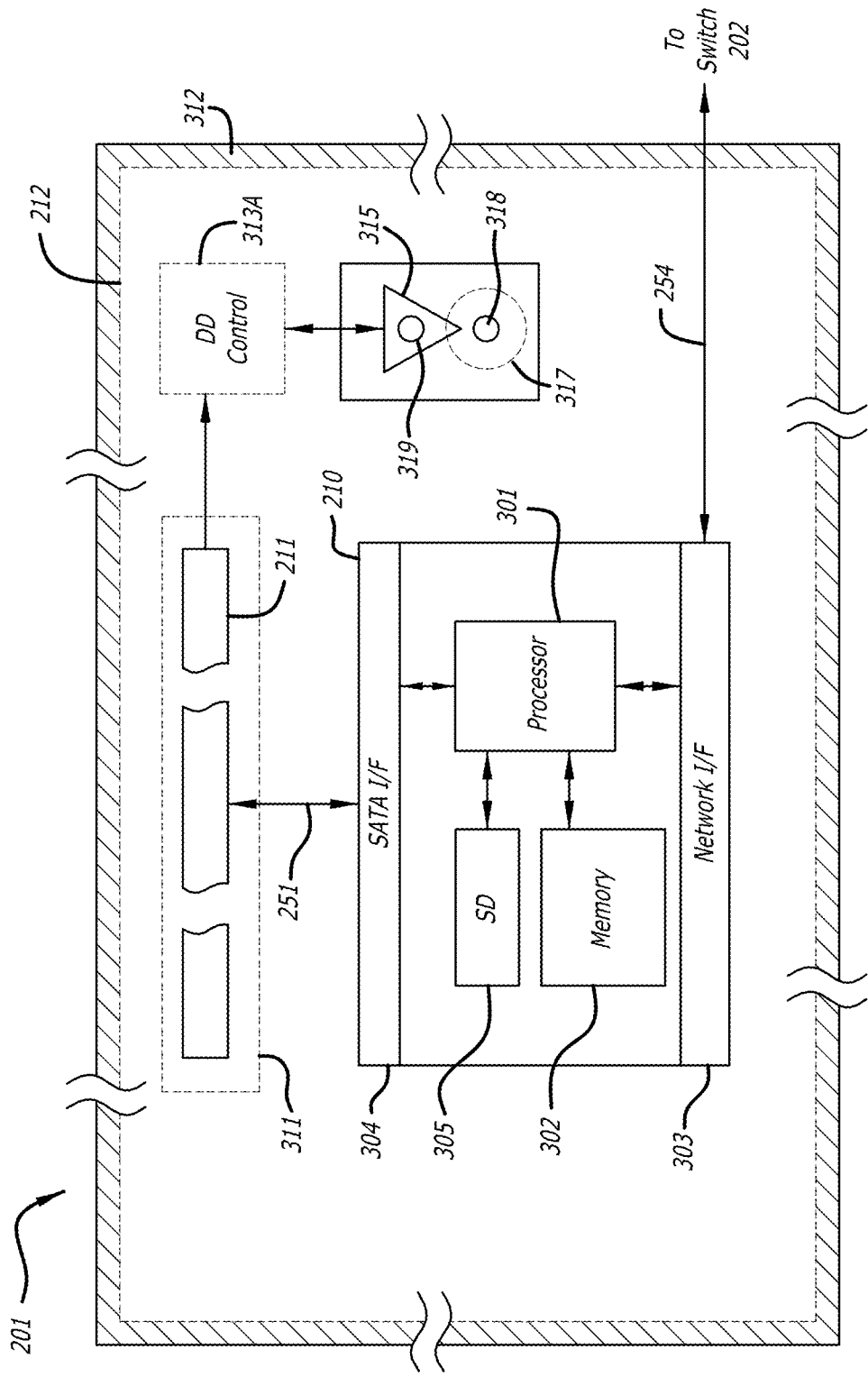
FIG. 3A illustrates a block diagram of an instance of an intelligent hard drive with a magnetic disk that may be instantiated into the array of intelligent hard drives of the network recorder illustrated in FIG. 2B.

Referring now to FIG. 3A, a block diagram of an intelligent hard drive 201 is illustrated that may be instantiated as the plurality of intelligent hard drives 201AA-201XY in the high speed intelligent network recorder (HSINR) 200, 170,170'.

The intelligent hard drive 201 includes a microcomputer 210 coupled to a hard drive storage device 212, a magnetic hard disk drive. The magnetic hard disk drive 212 includes a magnetic disk drive controller 313A and one or more read/write heads 315 coupled together. The magnetic hard disk drive 212 further includes one or more magnetic platters 317 that are rotated by an electric motor 318. The one or more read/write heads 315 are pivoted together over the one or more magnetic platters 317 by an electric motor 319. U.S. Pat. No. 6,895,500 issued on May 17, 2005 to Michael S. Rothberg discloses further exemplary information regarding a magnetic hard drive and is incorporated herein by reference.

The mechanical motions of the magnetic disks and the read/write heads of a magnetic hard disk drive can cause the drive 212 to vibrate. With a large array of intelligent hard drives 201AA-201XY, the vibrations can be significant such that it may be desirable to dampen the vibrations to reduce the stress on the socket 211 (e.g. SATA socket) of the PCB and plug (e.g. SATA connector) of the hard drive as well as other components.

Each intelligent hard drive 201,201' in the array may further include an elastic bumper 312 around a portion of the magnetic hard disk drive 212 to dampen vibrations from the one or more rotating magnetic platters and/or the one or more moveable read/write heads. In the network recorder, each elastic bumper forms an array of elastic bumpers around the array of magnetic hard disk drives.

The micro-computer 210 of the intelligent hard drive 201 includes a processor 301, a memory 302 coupled to the processor, a network interface adapter/controller 303 coupled to the processor, a SATA interface controller 304 coupled to the processor, and a storage device 305 coupled to the processor.

The network interface adapter/controller 303 is coupled to the high speed network switching device 202 to send and receive network flows of network data packets. The network interface adapter/controller 303 is coupled to the processor 301 to pass network flows of network data packets to it. Upon a query, the processor 301 may pass network flows of network data packets to the network interface adapter/controller 303.

The network interface adapter/controller 303 may optionally be a separate device coupled to and between each processor 301 of the plurality of intelligent hard drives 201 and the high speed network switching device 202.

Figure 3B:
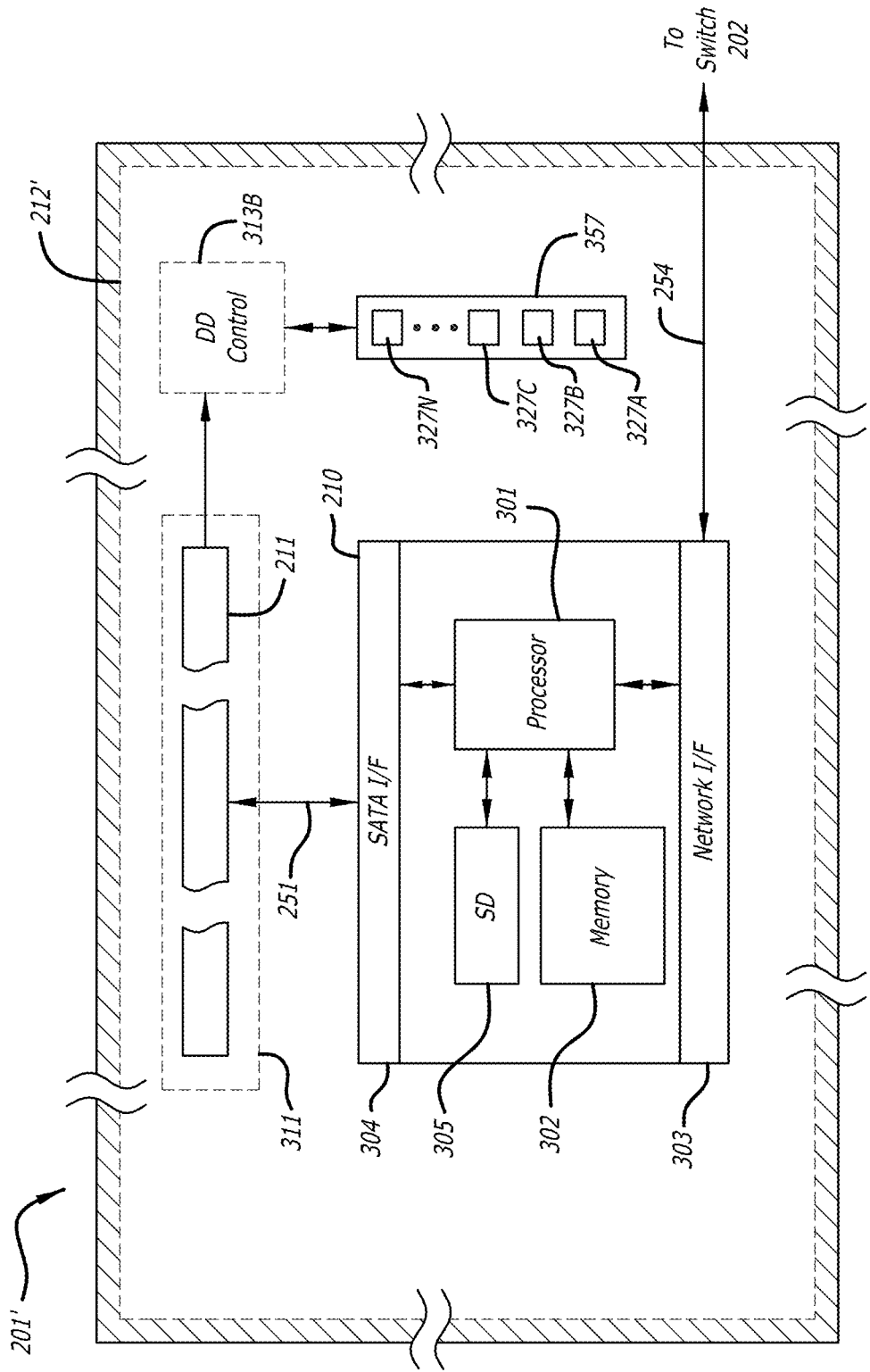
FIG. 3B illustrates a block diagram of an instance of an intelligent hard drive with solid state memory that may be instantiated into the array of intelligent hard drives of the network recorder illustrated in FIG. 2B.

Referring now to FIG. 3B, a block diagram of an intelligent hard drive 201' that may be instantiated as the plurality of intelligent hard drives 201AA-201XY in the high speed intelligent network recorder (HSINR) 170,170'.

The intelligent hard drive 201' includes a microcomputer 210 coupled to a hard drive storage device 212', a solid state storage drive (SSD) 212'. The hard drive storage devices 212 and 212' have the same form factor so they are interchangeable. The solid state storage drive 212' includes a solid state drive controller 313B coupled to a plug 311 and a non-volatile memory array 357 including a plurality non-volatile memory devices 327A-327N coupled to the solid state drive controller 313B. The plug 311 (e.g., SATA connector) of the solid state storage drive (SSD) 212' couples to the socket 211 mounted to the printed circuit board 299.

Because the solid state storage drive 212' has no moving parts, there are no vibrations generated by each. Accordingly, an elastic bumper around a solid state storage drive is not needed to dampen vibrations.

Figure 3C:
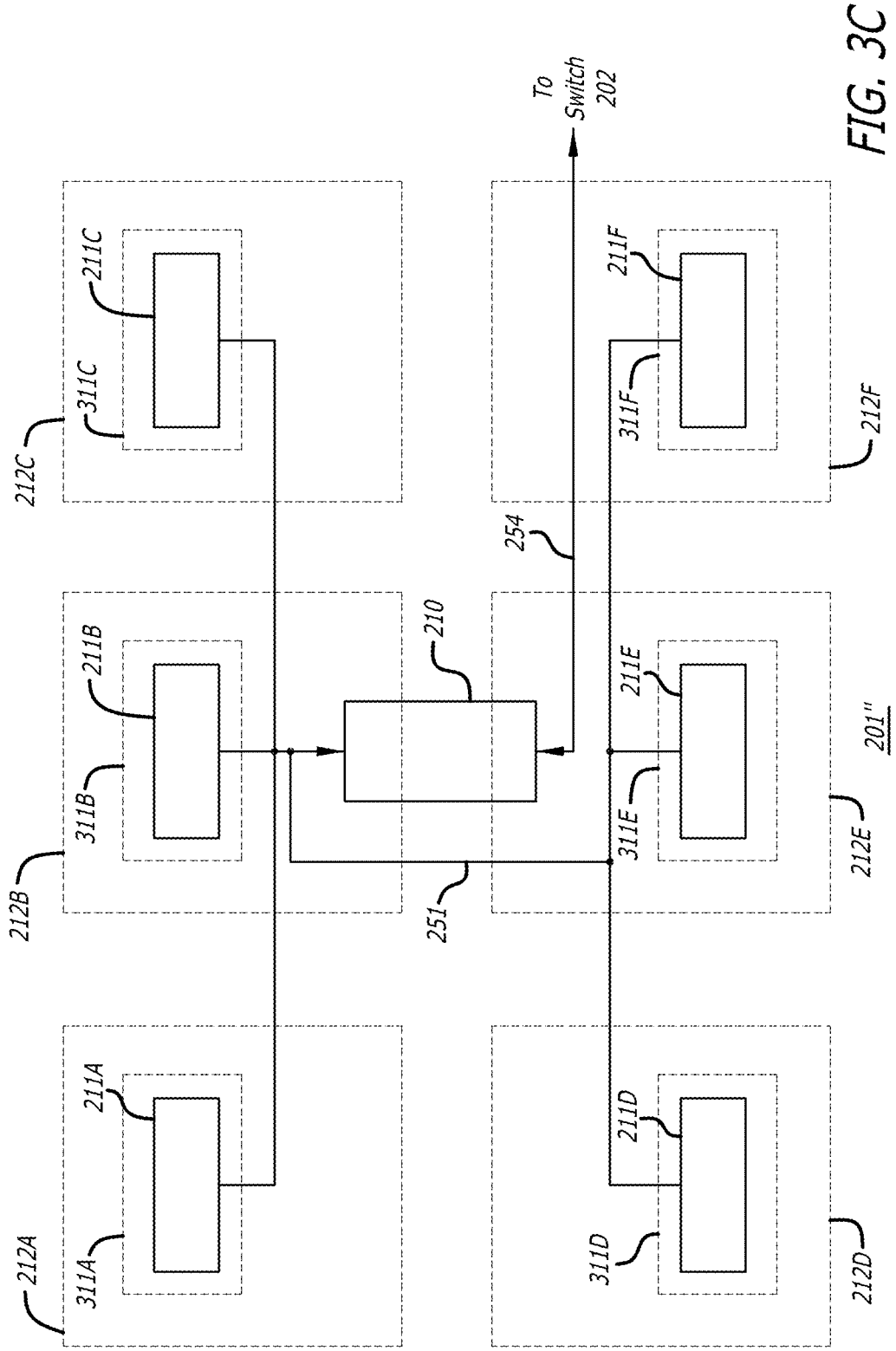
FIG. 3C illustrates a block diagram of an instance of an intelligent hard drive including a plurality of hard drives coupled to one micro-computer that may be instantiated into the array of intelligent hard drives of the network recorder illustrated in FIG. 2B.

The storage array 202 of an HSINR 200 has a storage drive D to microcomputer M ratio (D to M ratio) greater than or equal to one. FIGS. 3A-3B illustrate a one to one ratio of hard drive 212,212' to micro-computer 210 in each intelligent hard drive. FIG. 3C illustrates a six to one ratio of hard drives to micro-computer in an intelligent hard drive 201". Generally, a D to one ratio (or a 2D to two ratio) of hard drives to micro-computer is used, where D is a predetermined variable. That is, 2D hard drives may be served by 2 microcomputers in each intelligent hard drive and instantiated multiple times as the plurality of intelligent hard drives 201AA-201XY in the high speed intelligent network recorder (HSINR) 170,170'.

For example, the intelligent hard drive 201" of FIG. 3C includes a plurality of hard drives 212A-212F and a micro-computer 210 coupled in communication together. The intelligent hard drive 201" may be instantiated multiple times as the plurality of intelligent hard drives 201AA-201XY in the high speed intelligent network recorder (HSINR) 170,170'.

Each of the plurality of hard drives 212A-212F of the intelligent hard driver may be a magnetic disk drive 212 or a solid state storage drive 212'.

High Speed Network Switching Device

Figure 5:
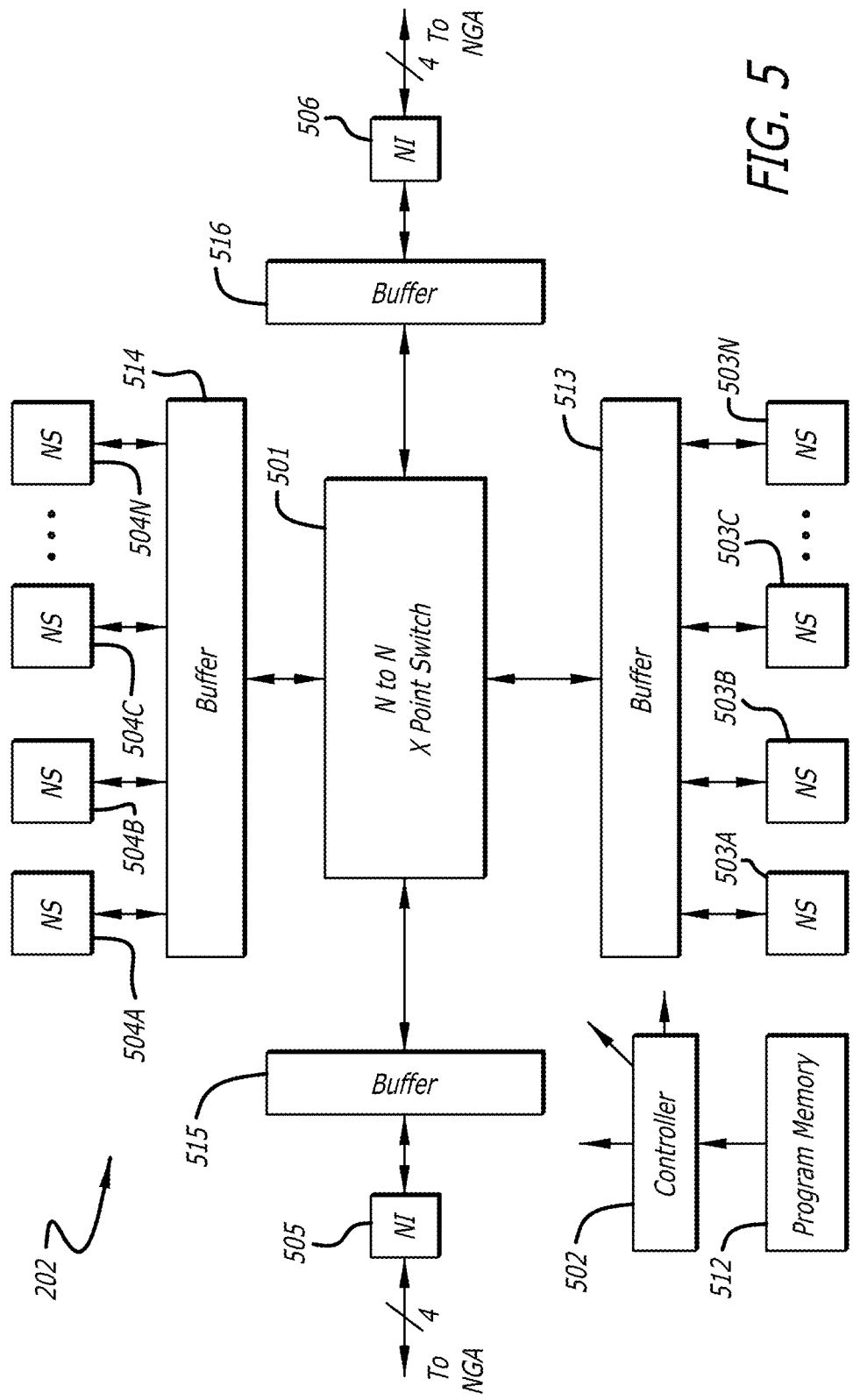
FIG. 5 illustrates a block diagram of an instance of a switch illustrated in FIG. 2B.

FIG. 5 illustrates a block diagram of an instance of the high speed switch 202. The high speed switch 202 includes an N to N cross point switch 501, a controller 502 with a program memory 512, a plurality of network interfaces (NI) 503A-503N, 504A-504N, 505, 506, and a plurality of buffer memories 513, 514, 515, 516. The controller 502 is coupled to each to control the switching of packets in the switch and within the high speed intelligent network recorder (HSINR) 170,170'. Instructions stored in the program memory 512 cause the controller 502 to generate control signals and control the switch.

The network interfaces 503A-503N, 504A-504N coupled to the plurality of intelligent hard drives 201AA-201XY in the high speed intelligent network recorder (HSINR) 170, 170'. The network interface 505 couples to other networking equipment in the data center computer network 100A,100B such as the intelligent load balancer 801, and/or tap 400,400' shown in FIGS. 1A-1B. The network interface 506 may couple to other networking equipment in the data center computer network 100A,100B such as the analyzers 156L shown in FIGS. 1A-1B.

In response to control signals from the controller 502, the N to N cross point switch 501 switches packets between the devices coupled to the network interfaces 503A-503N, 504A-504N. A packet, such as a command packet for example, may be multicasted to network interfaces 503A-503N,504A-504N so that the plurality of intelligent hard drives 201AA-201XY in the high speed intelligent network recorder 170,170' may act together.

The buffers 513-516 temporarily buffer packets for switching through the cross point switch 501.

Relevant Data Time Windows

Storage of the data packet communication into and out of a computer network can be useful in making a determination of what data was compromised, how the data was compromised, and whom performed the attack. However, with incident detection in a computer network, stored data packet communications can become less relevant and useful over time. Accordingly, the more recent data packet communication is more desirable to store into the capacity of the array of the plurality of intelligent hard drives 201AA-201XY.

The array of the plurality of intelligent hard drives 201AA-201XY shown in FIG. 2B records a plurality of flows of network data packets, eventually filling the capacity of the aggregated plurality of the array of intelligent hard drives 201AA-201XY, without the need for data redundancy such as may be found in a redundant array of independent disks (RAID). The capacity of the array of intelligent hard drives 201AA-201XY defines a relevant data time window of network data packets (ingress and egress) associated with network flows. In contrast to backup data, the network data packets stored in the array of intelligent hard drives 201AA-201XY are readily accessible for queries and analysis during the relevant data time window, which may be performed in a distributed manner by the processors or microcomputers 210. Generally, data need not be recovered by backup software before it can be used or analyzed.

FIGS. 4A-4D illustrate drawings of relevant data time windows 400A-400D for the array of intelligent hard drives 201AA-201XY along a data time axis. The capacity of the array of intelligent hard drives 201AA-201XY can be represented by the relevant data time windows 400A-400D along the data time axis Td. The network data flows that are stored into the array of intelligent hard drives 201AA-201XY, the relevant stored data, is represented by the data flows 402A-402B within the relevant data time windows 400A-400D.

In FIG. 4A, the more recent stored network data flows 402B are the youngest data packets stored into the array of intelligent hard drives represented by being nearest one end of a relevant data time window 400A. The earlier stored network data flows 402A are the oldest data packets stored into the array of intelligent hard drives represented by being nearest an opposite end of the relevant data time window 400A. Accordingly, network data packets most recently stored in the array of intelligent hard drives are the most relevant data in the relevant data time window. Network data packets least recently stored in the array of intelligent hard drives are the least relevant data in the relevant data time window.

In FIG. 4B, after the capacity of the array of intelligent hard drives is filled with relevant stored data the first time, the oldest stored network data flows 403A are over written with newer stored network data flows 403B. The least recently received network data packets near the end of the relevant data time window are overwritten with the most recently received network data packets. This is represented by the oldest stored network data flows 403A falling outside one end of the relevant data time window 400B with the newer stored network data flows 403B being included within the relevant data time window 400B near the opposite end.

In FIG. 4C, after a period of time of storing a plurality of network data flows, relevant stored data 412 in the array of intelligent hard drives is represented by network data flows within the relevant data time window 400C. Past network data flows 413 that have been overwritten are shown outside the relevant data time window 400C at one end. Future expected network data flows 415 are shown outside the relevant data time window 400C at the opposite end.

The capacity of the array of intelligent hard drives may change over time. Sectors within one or more hard drives may be mapped out from being written to. One or more sectors may have uncorrectable errors such that they are unreadable. One hard drive may completely fail so that its entire capacity may be unavailable and eliminated from the capacity of the array of intelligent hard drives. These drives that are unreadable or have a substantial number of failing sectors with uncorrectable errors are unreliable hard drives can reduce the reliable or usable storage capacity of the array. Accordingly, the reliability of each drive in the array of intelligent hard drives is monitored to determine if its storage capacity is to be utilized or not as part of the reliable or usable storage capacity in the array. The relevant data time window is responsive to the reliable usable storage capacity of the plurality of intelligent hard drives in the array. Failing or unreliable intelligent hard drives may not be replaced thereby reducing the reliable or usable storage capacity in the array and the size of the relevant data time window. In other cases, one or more unreliable intelligent hard drives with unreliable storage capacity are replaced to maintain the relevant data time window and the storage capacity of the array of intelligent hard drives.

To keep maintenance costs low and to avoid powering down the high speed intelligent network recorder, and thereby continue to record network data flows of data packets, intelligent hard drives that fail within the array may not be replaced. Furthermore, advanced notice of failing sectors and hard drives may be obtained by self-monitoring, analysis and reporting technology (SMART) data for each intelligent hard drive in the array. With advanced notice, new network data flows that are to be stored in the network recorder can avoid being stored into failing sectors or failing hard drives with unreliable, failing, or failed storage capacity. The failing sectors or failing hard drives may still be readable. In which case, older stored network data flows may be stored in the failing sectors or failing hard drives and become more and more irrelevant as time passes.

In FIG. 4D, the capacity of the array of intelligent hard drives has decreased such as from a failing sector or a failing hard drive. This is indicated by the relevant data time window 400D being narrower with fewer relevant network data flows 412' being stored within the window 400D. Data flows no longer available within the array may be deemed lost network data flows 416. Lost network data flows 416, previously within the relevant data time window 400C, is now shown outside the relevant data time window 400D along with the past network data flows 413.

The capacity of the array of intelligent hard drives may initially be sized to store days, weeks, or months worth of expected network data flows of data packets into and out of a computer network between devices. The number of intelligent hard drives in the array may number 960 for example and store two weeks worth of network data flows. If one hard drive is lost, only a portion of the two weeks of stored network data flows is lost, such as a few hours during a day. It may not be worth the maintenance costs and lost recording time to recover a few hours of lost data capacity. Accordingly, the failing or failed intelligent hard drives are not replaced, thereby lowering maintenance costs of the network recorder. If failed intelligent hard drives have reduced the capacity of the array of intelligent hard drives to an unacceptable level, a tray of hard drives may be replaced. Alternatively, the entire network recorder may be replaced. The hard drives that are available at a later time may be lower in costs and developed with greater density (fewer dollars per gigabyte), such that the network recorder may be larger in capacity and lower in costs when replaced.

High Speed Intelligent Network Recorder Implementation

FIGS. 6A-6D and 7A-7C illustrate implementation details for an exemplary embodiment of the high speed intelligent network recorder 200 shown in FIGS. 2A-2C and 3B-3C. FIGS. 6A-6D and 7A-7C illustrate embodiments of a high speed intelligent network recorder 170,170', 170" with 350 storage drives 212,212' and 20 microcomputers 750 providing a drive D to microcomputer M (D to M) ratio of 35 to 2. The storage array 202 of storage drives 212,212' (as well as each drive tray) may be arranged into X columns and Y rows of hard drives in order to efficiently use the space and provide the appropriate drive D to microcomputer M (D to M) ratio for the high speed intelligent network recorder. For example, when viewed from the front of a rack, the 350 storage drives in the intelligent storage array 202 may be arranged as 35 columns by 10 rows of storage drives 212,212' mounted perpendicular to a backplane printed circuit board (PCB).

Figure 6A:
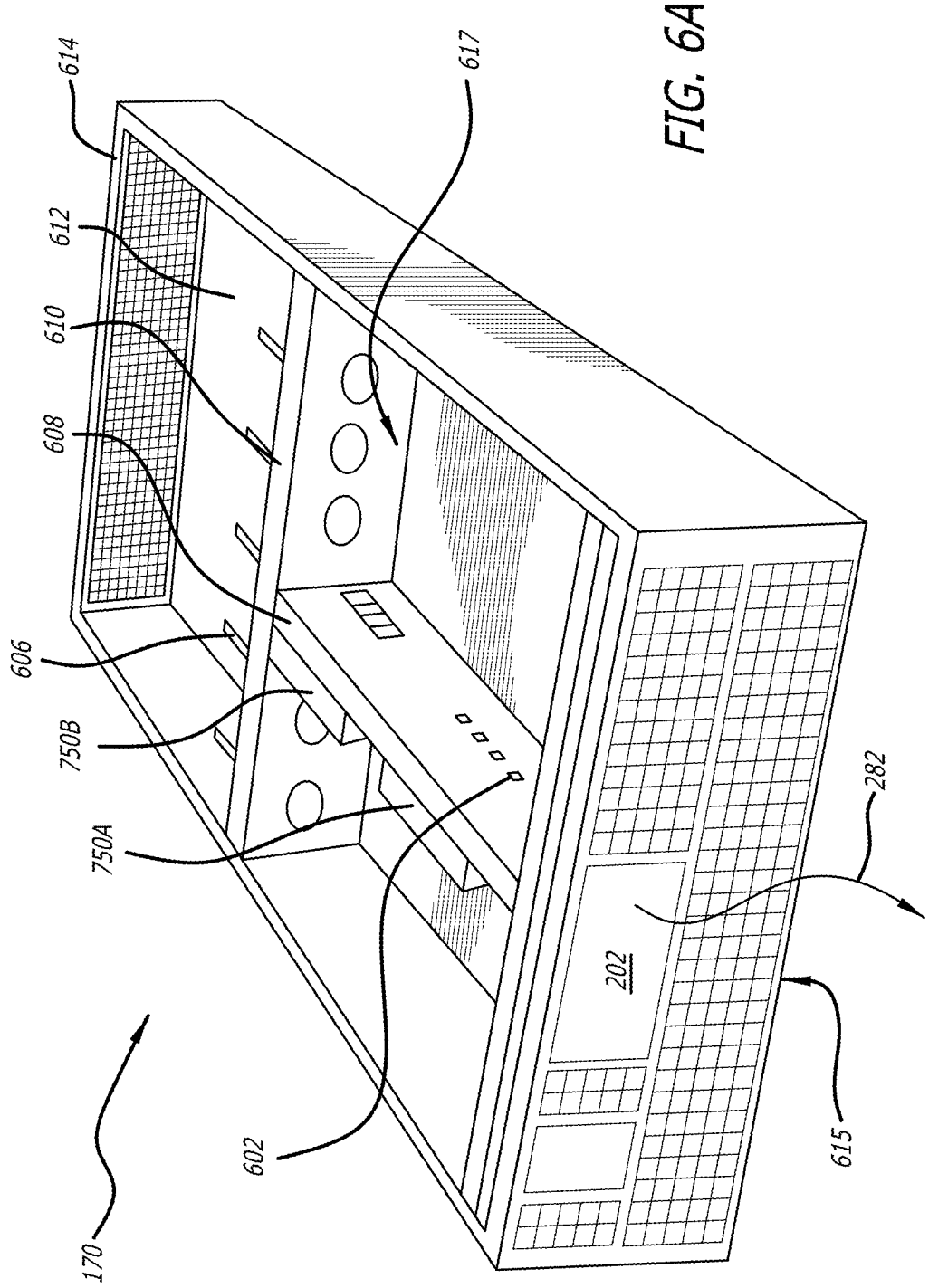
FIG. 6A is a perspective view from the bottom of the subassemblies within the bottom bay of a high speed intelligent network recorder.

FIG. 6A illustrates a computer enclosure 614 for the high speed intelligent network recorder 170,170' viewed from the bottom. In one embodiment, the computer enclosure 614 is a 6 U sized metal computer enclosure. The metal computer enclosure 614 is utilized for mounting computing and storage resources into two bays, a top bay 615 and a bottom bay 617. A backplane printed circuit board (backplane PCB or backplane) 612 is mounted in the enclosure 614 between the top bay 615 and a bottom bay 617. The top bay 615 of the high speed intelligent network recorder receives hard drive trays 618. The bottom bay 617 of the high speed intelligent network recorder receives controller cards 608. Each side of the backplane PCB 612 includes a plurality of sockets 606. Sockets 606 on one side of the backplane 612 receive connectors of controller cards 608. Sockets 606 on the opposite side of the backplane PCB 612 receive connectors of hard drive trays 618 (see FIGS. 6C-6D). Sockets 606 aligned with each other on opposing sides of the backplane are coupled in communication together so that controller cards 608 on one side are coupled in communication to hard drive trays 618 on the opposite side. The backplane PCB 612 provides power and ground to the each controller card 608 and hard drive tray 618. The backplane PCB 612 may further provide a communication connection to each processor of each controller card 608.

In the bottom bay 617, one or more controller cards 608 plug into the one or more sockets 606 of the backplane PCB 612 on one side. When plugged in, the controller cards 608 are perpendicular with the backplane PCB 612.

In the top bay 615, one or more hard drive trays 618 (see FIG. 6B) plug into one or more sockets 606 of the backplane PCB 612 on the opposite side. When plugged in, the hard drive trays 618 are parallel with the backplane PCB 612.

In one embodiment, each of the one or more sockets 606 are a Com Express 2.1 connector mounted on the backplane 612. The controller cards 608 and the hard drive trays 618 have the same form factor and position of connectors 606 so that each may be interchangeable in the backplane 612 to provided different system configurations.

The controller card 608 includes a printed circuit board (PCB) 602 with one or more processing units 750A,750B mounted to it. The controller card 608 is mounted to the computer enclosure 614 by a partitioning frame 610.

As discussed herein, the high speed intelligent network recorder 170,170' includes a high speed switch 202. The high speed switch 202 may be an integrated circuit chip mounted to the backplane printed circuit board 612. Alternatively, the high speed switch 202 may be a daughter card with a connector that plugs into a socket of the backplane printed circuit board 612. In another case, the high speed switch 202 may be a separate device that is mounted to the enclosure 614 or a separate device with its own 1 U enclosure that is adjacent the array 220 and coupled in communication with the intelligent hard drives by wire cables or optical cables. The cables 282 from switch 202 couple the high speed intelligent network recorder 170,170' to the ILB or tap within the network.

Figure 6B:
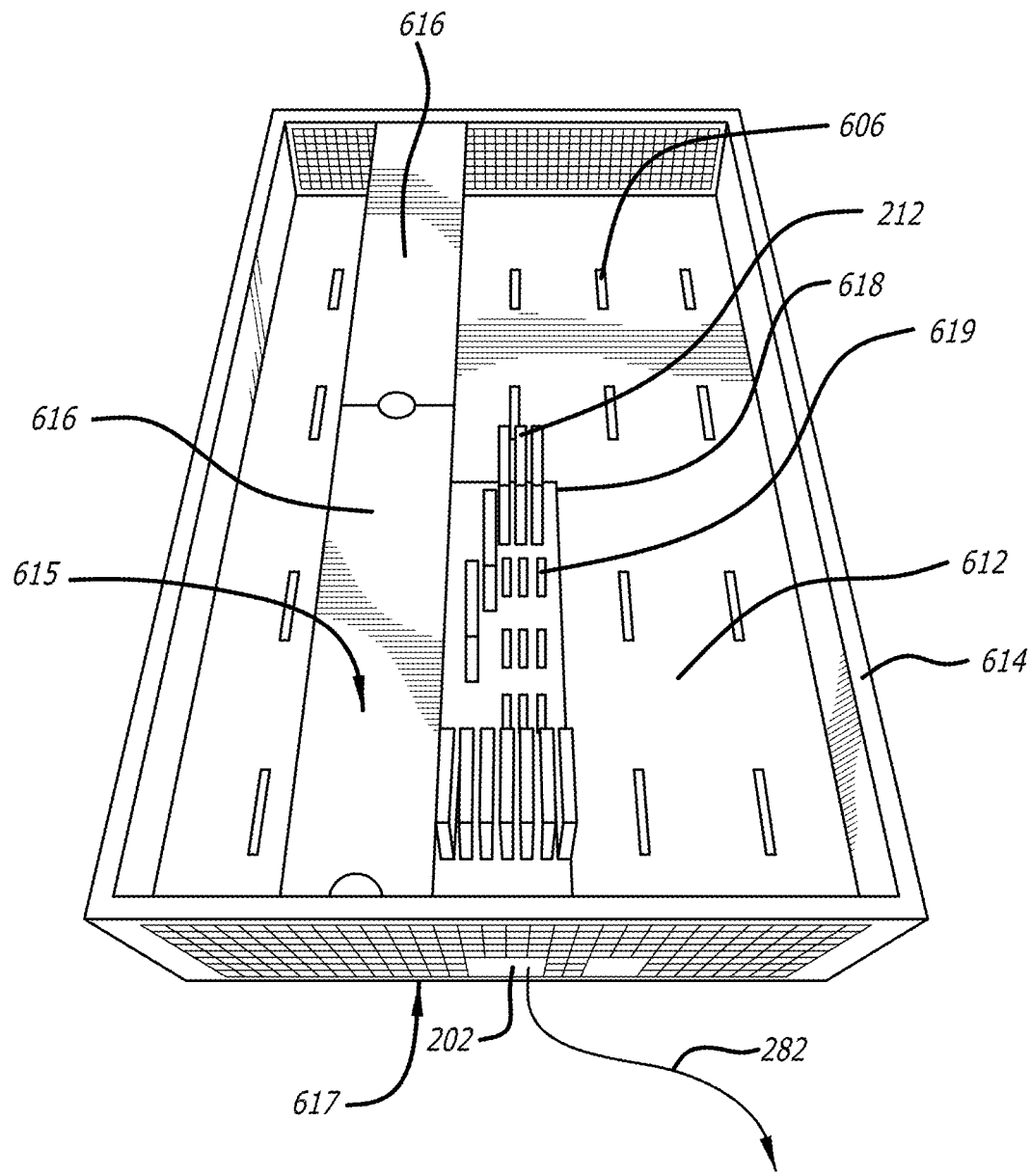
FIG. 6B is a perspective view from the top of the subassemblies in the top bay of a high speed intelligent network recorder.

FIG. 6B illustrates the computer enclosure 614 viewed from the top. In the top bay 615, a drive tray 618 is plugged into the backplane PCB 612. A plurality of hard drives 212 are plugged into the SATA sockets 619 of the drive tray 618.

Hard drive cover plates 616 over a plurality of hard drives are coupled to the computer enclosure 614. The hard drive cover plates 616 protect the hard drives 212 and provide an enclosed cavity for the cooling fans 630 (see FIG. 6C). Within the cavity, the cooling fans circulate cooling air around the hard drives 212 to maintain operating temperatures inside the computer enclosure 614.

Figure 6C:
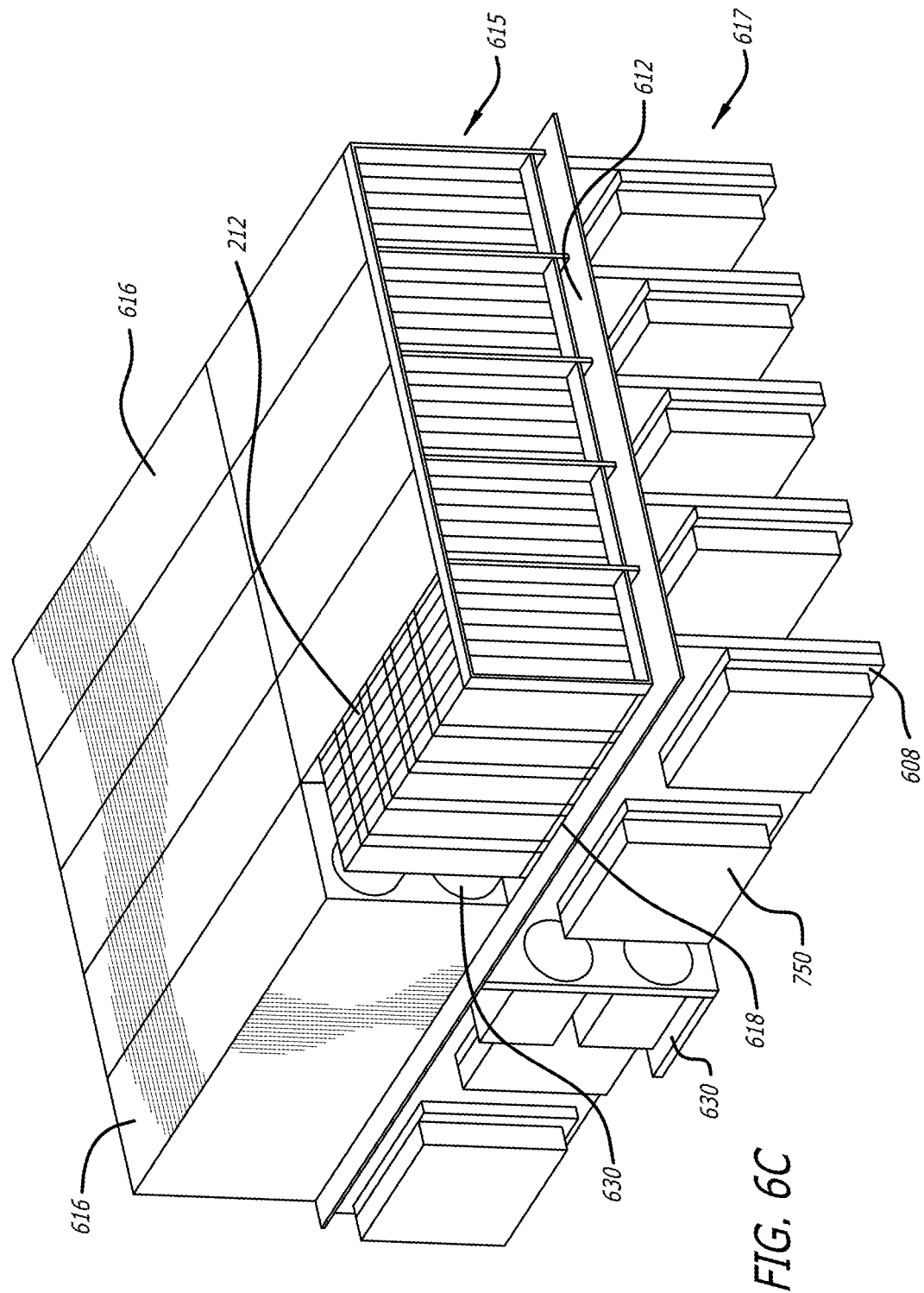
FIG. 6C is a perspective view from the side of the high speed intelligent network recorder with the case ghosted out for better view of the subassemblies.

FIG. 6C is a perspective view of the high speed intelligent network recorder with the enclosure being ghosted out to better show its assembly. In the top bay 615, one or more hard drive trays 618 are mounted to the backplane PCB 612. In the bottom bay 617, one or more controller trays 608 are mounted to the backplane PCB 612.

Each of the one or more hard drive trays 618 has a printed circuit board with a plurality of SATA sockets 619 (see FIG. 6B) in the top side. SATA connectors of a plurality of SATA hard drives 212 are plugged into the plurality of SATA sockets 619. The underside of printed circuit board of the drive tray 618 has one or more connectors (see FIG. 7C) that plug into one or more sockets 606 of the backplane PCB 612.

FIG. 6C better shows the one or more processing units 750 mounted to the controller trays 608. FIG. 6C further shows how the controller cards 608 are plugged into sockets 606 to be perpendicular to one side of the backplane PCB 612. FIG. 6C further shows how the one or more hard drive trays 618 are plugged into sockets 606 to be parallel with the opposite side of the backplane PCB 612.

One or more circulating fans 630 are mounted to a partition frame between the one or more hard drive trays 618. One or more circulating fans 630 are also mounted to a partition frame between the one or more controller trays 608. The cooling air provided by the circulating fans 630 is contained and directed by the protective covers 616 for the hard drives. This insures adequate airflow for internal temperature control of the computer enclosure 614 (see FIG. 6B).

Figure 6D:
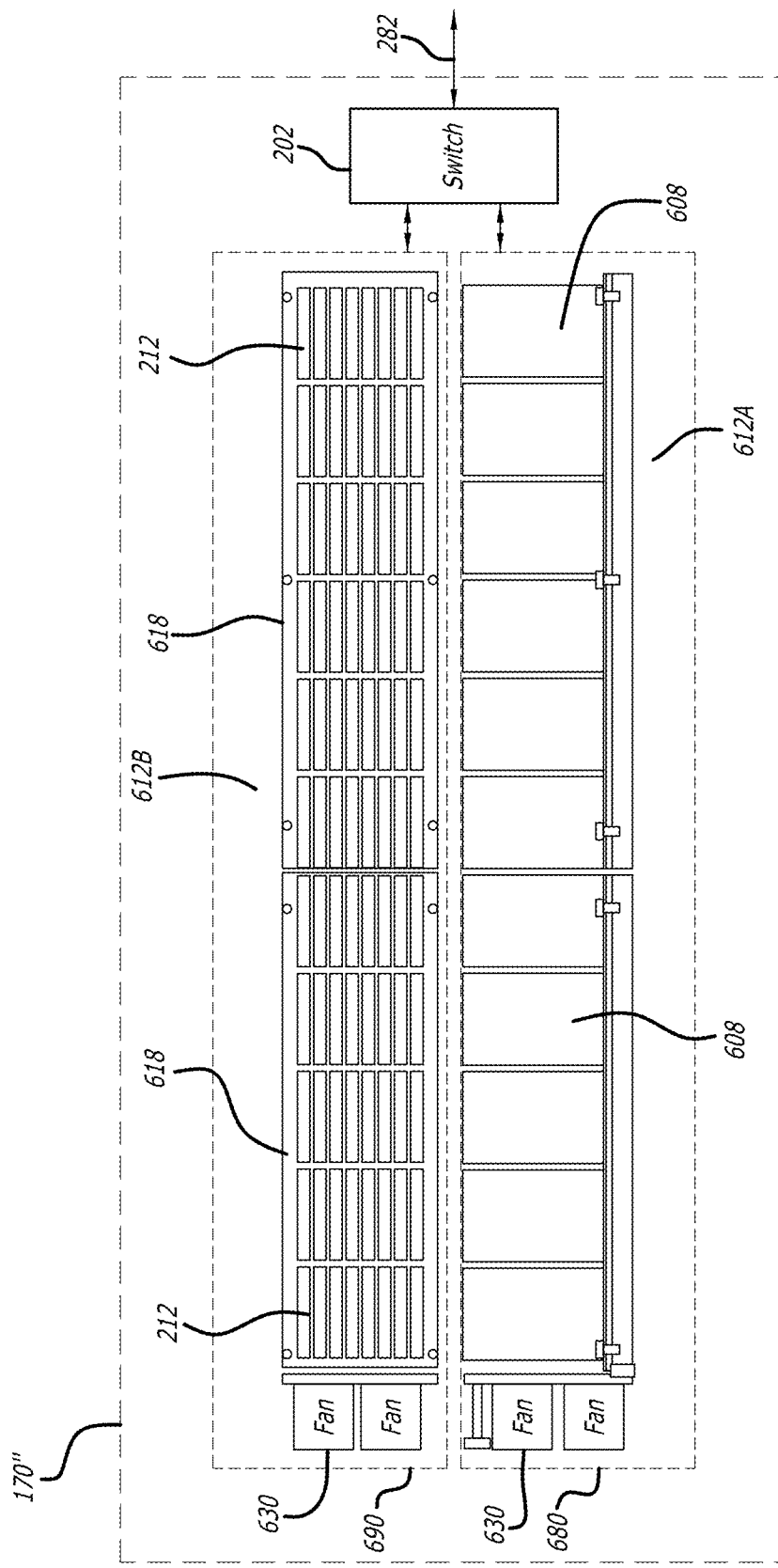
FIG. 6D is a side view of a storage unit and a control unit together forming an alternate embodiment of a high speed intelligent network recorder to allow each unit to be located in different server storage racks.

In FIG. 6D a side block diagram view of an alternate configuration of a high speed intelligent network recorder 170" is illustrated. The enclosures are ghosted out in FIG. 6D to better show the assemblies. The high speed intelligent network recorder 170" includes a controller unit 680, a storage unit 690, and the high speed switch 202. The controller unit 680 and the storage unit 690 are coupled in communication together by the high speed switch 202. The cables 282 from the switch 202 couple the high speed intelligent network recorder 170" to the ILB or tap within the local computer network.

In this embodiment, the computer enclosures for the controller unit 680 and the storage unit 690 are 3 U metal computer enclosures to conserve space in a server rack. A contiguous 6 U opening is often unavailable in a single server rack. The 3 U height allows the controller unit 680 and the storage unit 690 to be placed in the same server rack or different server racks where 3 U openings are often available. In alternate embodiments, the controller unit 680 may have a one rack unit (1 U) form factor while the storage unit 690 has a different form factor, such as between a two rack unit (2 U) form factor and a six rack unit (6 U) form factor.

As shown in FIG. 6D, the controller unit 680 includes one or more controller cards 608 plugged into a backplane 612A. The controller unit 680 further includes fans 630 to keep the controller cards 608 cooled.

The storage unit 680 includes one or more hard drive trays 618 plugged into a backplane 612B. The backplane in this case is not shared between the hard drive trays 618 and the controller cards 608. A plurality of hard drives 212 are plugged into the SATA sockets 619 of the drive trays 618. The drive trays 618 are in turn plugged into the backplane 612B. One or more SATA controllers 238 (see FIG. 2C) may be mounted to the drive tray printed circuit board 760 (see FIG. 7C) or the backplane PCB 612B to control the plurality of hard drives 212. One or more network interface controller (NIC) chips 234 (see FIG. 2C) may be mounted to the drive tray printed circuit board 760 (see FIG. 7C) or the backplane PCB 612B and coupled in communication with the SATA controllers 238. The NIC chips 234 through network ports (e.g., Ethernet ports) couple the storage unit 690 in communication with the local area network and the controller unit 680 through the high speed switch 202.

The storage unit 690 further includes an independent set of cooling fans 630 to provide a cooling air for the plurality of hard drives in the hard drive trays.

The separation of the original 6 U computer enclosure 614 structure, with all associated components, into two separate 3 U computer enclosure units permits the user greater flexibility for the installation of the controller unit 680 and the storage unit 690 in the various racking configurations available in server storage racks. The high speed network switch 202 and high speed network cables can be coupled between the controller unit and the storage unit to couple the controller unit and the storage unit in communication together.

The high speed switch 202 may be an integrated circuit chip mounted to the backplane printed circuit board 612A, 612B. Alternatively, the high speed switch 202 may be a daughter card with a connector that plugs into a socket of the backplane printed circuit board 612A,612B. In another case, the high speed switch 202 may be a separate device that is mounted to one of the enclosures or a separate device with its own 1 U enclosure that is near the controller unit 680 and the storage unit 690. Wire cables or optical cables may be used to couple the controller unit and the storage unit in communication together. The cables 282 from switch 202 couple the high speed intelligent network recorder 170" to the ILB or tap within the network.

Figure 7A:
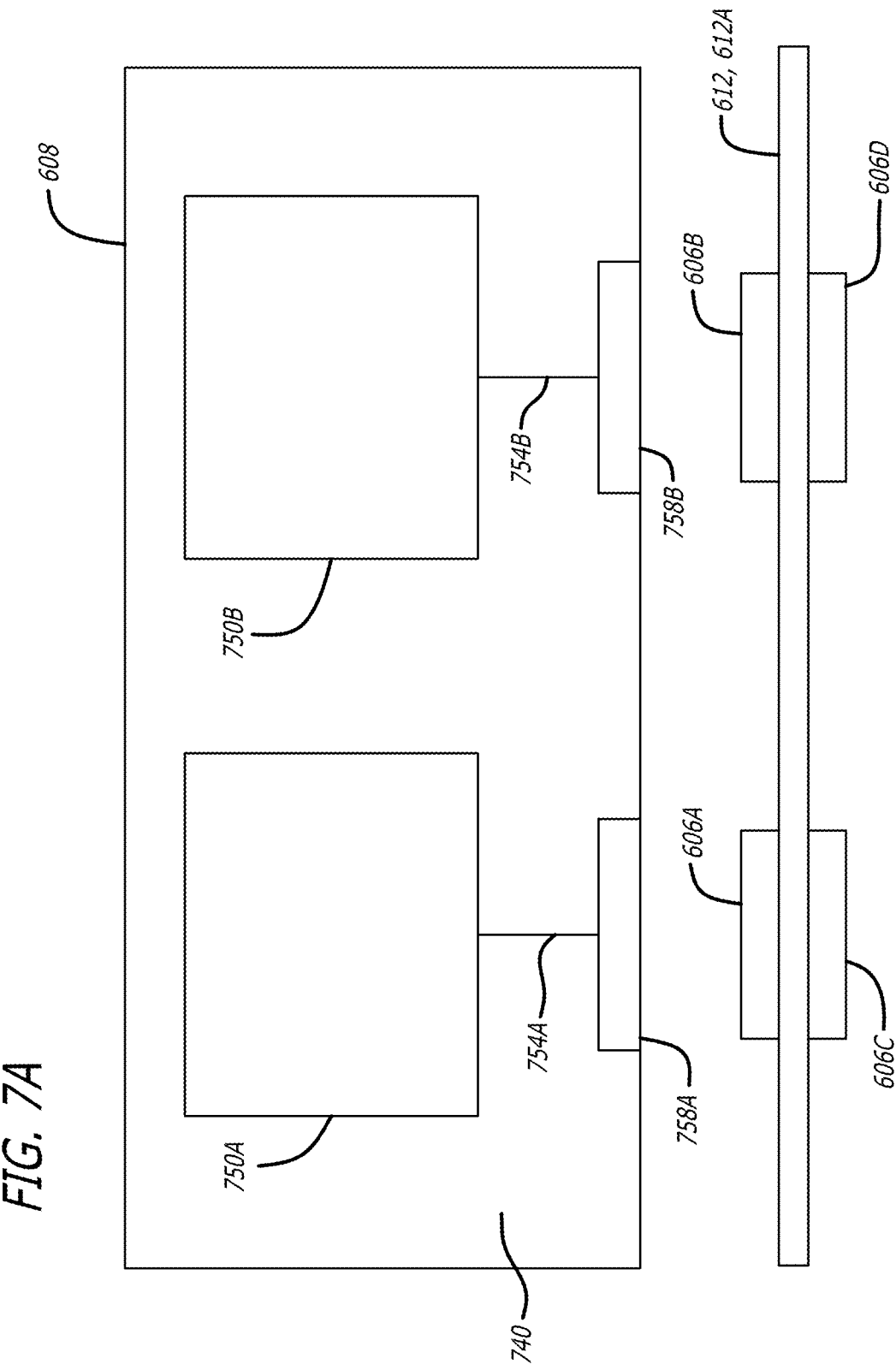
FIG. 7A illustrates a block diagram of an instance of a controller card being plugged into sockets of a backplane printed circuit board.

Referring now to FIG. 7A, a block diagram of a controller card 608 is illustrated being plugged into the backplane 612,612A. The controller card 608 includes a printed circuit board 740 with a plurality of wire traces. Connectors 758A-758B are mounted to the printed circuit board 740 and coupled to one or more of the plurality of wire traces. Connectors 758A-758B of the controller card 608 respectively plug into bottom sockets 606A-606B of the backplane 612,612A. A pair of microcomputers 750A,750B are mounted to the printed circuit board 740 of the controller card 608 coupled to a plurality of wire traces. The printed circuit board 740 includes wire traces including wire traces 754A,754B to couple the microcomputers 750A,750B in communication with the sockets 758A-758B. The connectors 758A-758B are Com Express 2.1 connectors in one embodiment.

Figures 1, 7B:
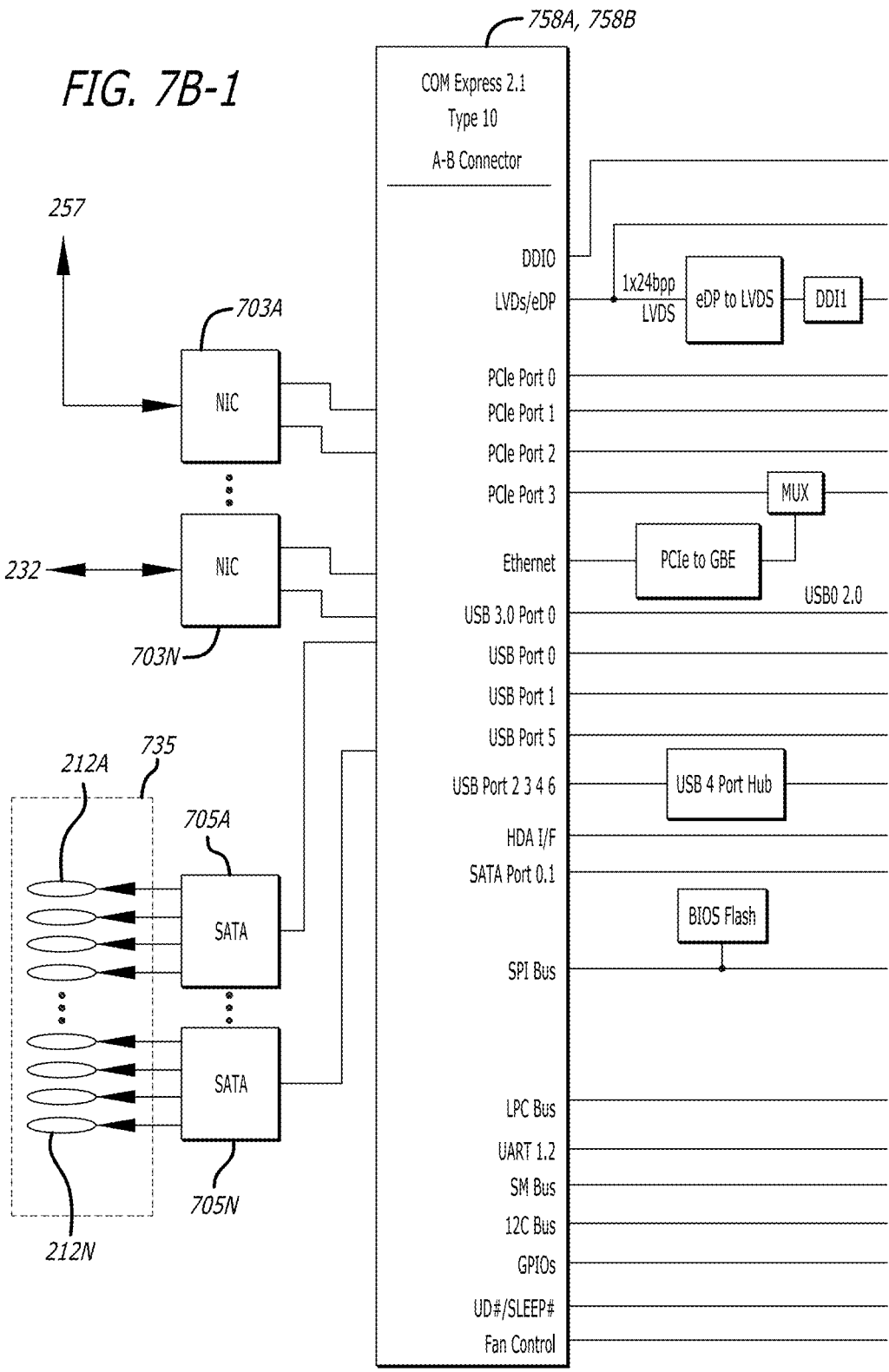
FIGS. 7B-1 and 7B-2 (collectively FIG. 7B) illustrate a functional block diagram of a portion of the controller card shown in FIG. 7A that may be plugged into a high speed intelligent network recorder.
Figures 2, 7B:
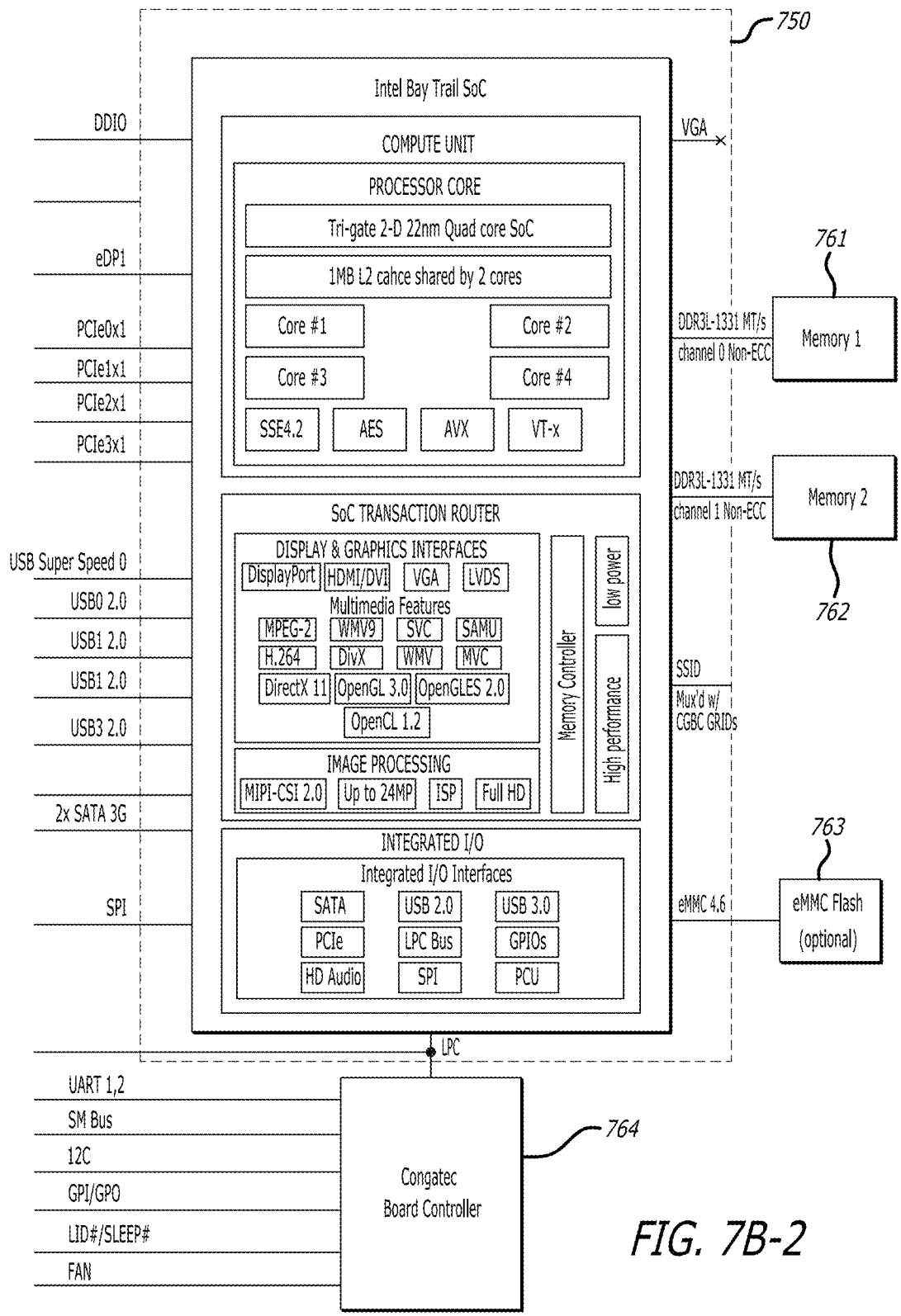

Referring now to FIGS. 7B-1 and 7B-2, a detailed block diagram of a portion (e.g., one half) of the controller card 608 is illustrated coupled in communication with a plurality of hard drives 212A-212N. A connector 758A,758B of the controller card 608 is coupled to a microcomputer 750, one or more network interface controller chips 703A-703N, and one or more SATA controllers 705A-705N on the printed circuit board. In one embodiment, the connector 758A,758B is a Com express 2.1 Type 10 connection interface. The controller card 608 further includes two random access memory (RAM) devices 761-762, an optional flash memory device 763, and a board controller 764 coupled to the microcomputer 750. The wire traces of the printed circuit board couple the electrical elements (e.g., microcomputer 750, network interface controller chips 703A-703N, SATA controllers 705A-705N, RAM devices 761-762, flash memory device 763, and board controller 764) of the controller card 608 together.

The one or more SATA controllers 705A-705N are coupled in communication with the plurality of hard drives 212A-212N on the hard drive tray 618 that is associated with the controller card.

The one or more network interface controller chips 703A-703N couple the controller card 608 and the hard drives 212,212' in the hard drive tray 618 in communication with devices (e.g., tap, network probe, intelligent load balancer, query agent, analyzer) in the local area network over one or more networking cables 232,257 (e.g., Ethernet cables, Fibre Channel cables).

Each microcomputer 750 on the controller card includes a plurality of processor cores (Core #1-Core #4), a memory controller, and an input/output (TO) controller. The memory controller is coupled in communication with the RAM devices 761-762 and the flash memory device 763. The board controller 764 controls various functions (e.g., fan speed) for the controller card 608.

Figure 7C:
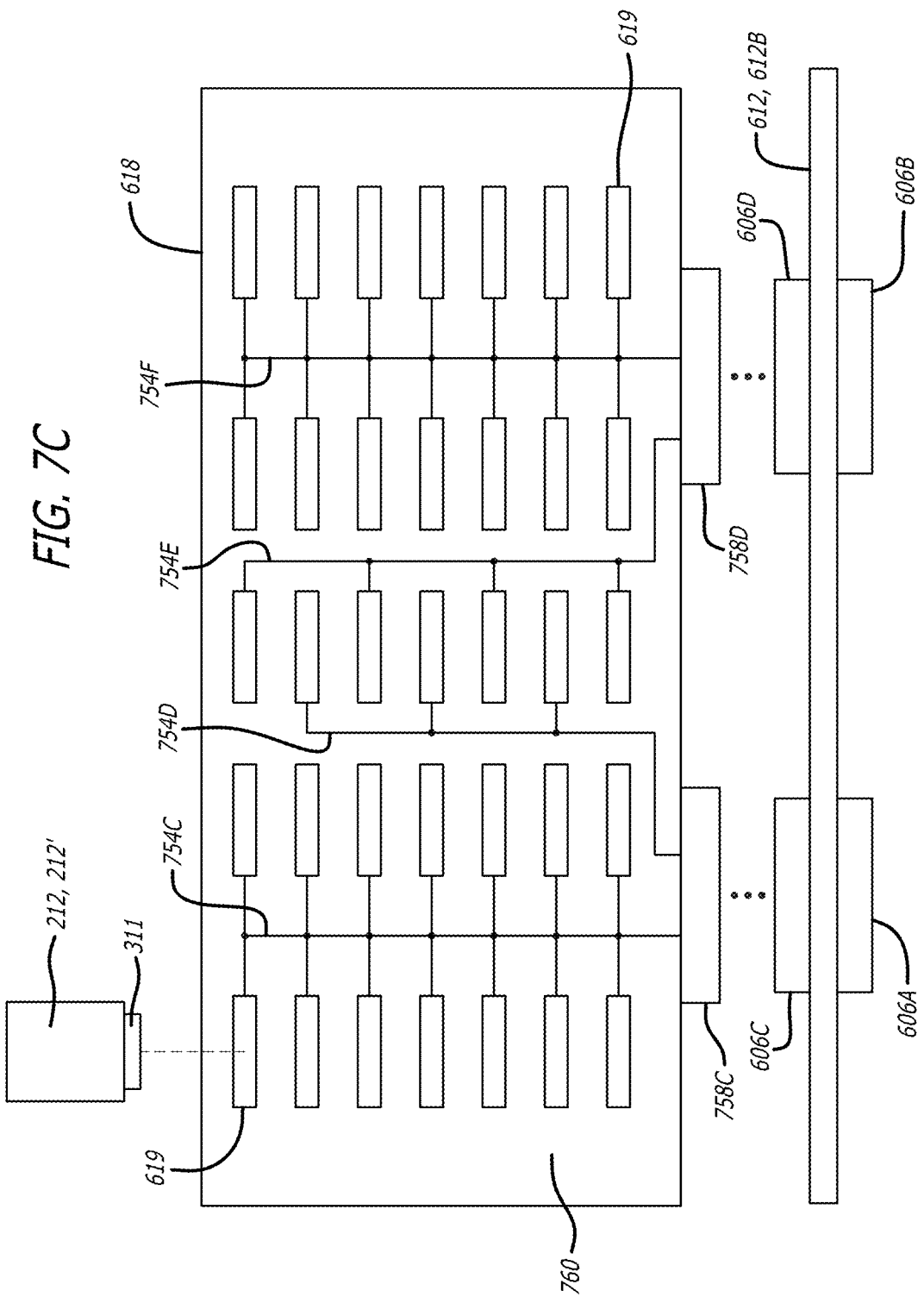
FIG. 7C illustrates a block diagram of an instance of a storage drive being plugged into a drive tray that is in turned plugged into sockets of the backplane printed circuit board.

Referring now to FIG. 7C, a block diagram of a hard drive tray 618 is illustrated being plugged into the backplane 612,612B. The hard drive tray 618 includes a printed circuit board 760 with connectors 758C-758D and SATA sockets 619 mounted thereto. The printed circuit board 760 includes a plurality of wire traces, including wire traces 745C-745F coupled between the connectors 758C-758D and the SATA sockets 619. A plurality of SATA drives 212,212', each with a SATA connector 311, are plugged into the SATA sockets 619 of the drive tray 618. The drive tray 618 is in turn plugged into the backplane 612,612B.

A plurality of drive trays 618 may plug into the backplane 612,612B. The backplane 612,612B includes one or more pairs of sockets 606C-606D to receive each drive tray 618. The connectors 758C-758D of each drive tray 618 plug into sockets 606C-606D of the back plane 612,612B.

One or more SATA controllers 238 (see FIG. 2C) may be mounted to the printed circuit board 760 of each drive tray 618 to control the plurality of hard drives 212,212'. Alternatively, SATA controllers 238 may be mounted to the backplane PCB 612,612B to control the plurality of hard drives 212,212'. One or more network interface controller (NIC) chips 234 (see FIG. 2C) may be mounted to the PCB 760 or the backplane PCB 612,612B and coupled in communication with the SATA controllers 238.

Intelligent Load Balancing Introduction

The data flow rate into a computer network may be tens of gigabits per second (or on the order of gigabytes per second for an entire data center). It is desirable for the network recorder to store data packets to support the data flow rate into the computer network in near real time. The write access time of one hard drive may not be able to support the desired data flow rate for a given data flow. However, if the data packets are to be stored in parallel into a plurality of intelligent hard drives, the desired data flow rate may be met.

A flow or network flow refers to a communication between two computer entities over a wide area computer network or local area computer network, be they servers, processes, or client and server.

The data flow into the computer network is made up of a plurality of different data flows between two devices in the local computer network or a device outside the local computer network and a device within the local computer network. The number of data packets for each data flow, the data flow size, can vary over a given time period. Typically, a data flow of data packets is small and can be stored into one hard drive. However, there may be a few data flows that are extremely large and cannot be efficiently stored into the same hard drive for the given data rate. Accordingly, intelligent load balancing of the storage of data packets for the plurality of data flows into the array of the plurality of intelligent hard drives is desirable.

A flow-hash is computed based on a specific "tuple" of network identifiers depending on the protocol of the flow. For example, an IPv4 TCP flow might use a tuple including source and destination IP addresses, source and destination ports and the protocol (TCP). Note that both directions of communication for the flow will receive the same flow-hash. The intention is that a one-to-one mapping exists between flow and the flow-hash.

In a flow-hash system there will be the potential for collisions where two different flows or network flows have the same flow-hash. A well designed system minimizes the probability of collisions.

Flows or network flows, used interchangeably herein, refers to bidirectional network conversations (e.g., conversation flows), identified by a flow hash tag (flow-hash) unless otherwise noted. The flow-hash function should be reasonably uniform, hash both directions of the same flow to the same key and a minimal collision rate. Broken flows refer to flows whose packet records have been sent to more than one destination node. A node refers to the logical unit of: a network interface or equivalent ingress construct (such as a shared memory buffer), compute, a memory and a storage device. Nodes act as endpoints for traffic from the load balancer.

A packet record (different than a netflow record) includes metadata for an incoming packet. The packet record includes, without limitation, a timestamp, a record length, and a flow hash tag. The record length field may be included to identify the size of a given record. The intelligent load balancer 900 receives records from ingress packets (typically one record per packet) and determines the destination of the record among a plurality of destination nodes. The intelligent load balancer is not necessarily limited to such records, and could be applied to any stream of elements where each element has an attached timestamp and flow hash. For example, a record may be a netflow record (different than a packet record) to which a flow hash tag is applied.

Standard flow or hash based load balancing, where traffic is divided in a fixed manner, works well with a small number of relatively powerful nodes assuming a reasonably uniform hash function. However this breaks down when a large number of nodes and/or a heavily loaded link is used in comparison with the capture bandwidth capability of such nodes. The irregularity of the distribution at finer levels of detail (particularly on a shorter timescale) becomes an issue and is unworkable if there are hot flows that exceed the capability of an individual node. In many environments, the likelihood increases of very hot flows on high bandwidth links that exceed (or use a large portion of) an individual node's capacity. Hot flows typically affect only a single flow (or hash) so the benefit of the load balancing is lost. A small number of unevenly distributed hot flows can overwhelm a standard flow or hash based load balancing system.

Distributing all traffic completely randomly per-packet can produce a perfectly even distribution, but this makes a distributed flow-aware analysis extremely difficult and network resource intensive. It also means that if one storage node is lost, a large cross section of flows have at least one record lost. The alternative approach is to attempt to perform the analysis at a central point, but this quickly becomes a processing bottleneck.

The intelligent load balancer overcomes these difficulties by combining the merits of both approaches by using dynamic load balancing, combined with taking advantages of the specific features of packet capture. Nodes do not need to be dimensioned to handle large hot flows. Nodes can be low cost and low power.

The intelligent load balancer uses window-based heavy-hitter ("hot" flows) detection and load balancing by means of a count-min sketch 1112 (e.g., parallel multistage filter) using a fixed number of packets, rather than a time window, for simplicity and efficiency of implementation. This is possible because approximation of bandwidth is used to ensure the first N packets of all flows go to the same destination with very high probability for deep packet inspection. This would be more complex to achieve with a fixed time window due to boundary conditions.

More advanced dynamic load balancing algorithms exist, however the goals are usually different given different situations. In these situations, moving hot flows is not desirable because it causes packet reordering, and in the case of traffic engineering, it increases overhead from path distribution. The impact of overloading a link or node is also less important in a non-capture situation as TCP congestion control will essentially reduce the bandwidth of the hot flows. With an intelligent network recorder and an environment for passive network monitoring and analysis, there is no ability to control the bandwidth of flows. Moreover, there is a stronger desire to avoid breaking cold flows to enable accurate distributed analysis with minimal east-west traffic. However, once broken, hot flows can be rebalanced on a packet-by-packet basis to achieve overall bandwidth distribution close to that of random assignment (if the fraction of hot traffic is high which is very common). There also is a strong desire that the first N packets of every flow arrive at the same destination node in order. This is so that application detection and other deep packet inspection is enabled at the end node.

An index-based distributed query, retrieval and analysis is improved when the input traffic is load balanced using the intelligent load balancer. With the intelligent load balancer, an efficient reassembly of the stream in time order is possible allowing a very high rate of query return.

In addition to analysis as the traffic arrives at nodes, the ordered nature of the capture at each node is used to enable replaying of a conversation through existing analysis tools, as if the traffic was live, while using low cost low power compute units. Due to the flow coherency, intelligent load balancing per-flow analysis can be performed as if it was on a centralized system. For those few flows that are broken, minimal detection and bounded flow reassembly can be performed using the query mechanism.

Capture Processing

Figure 8A:
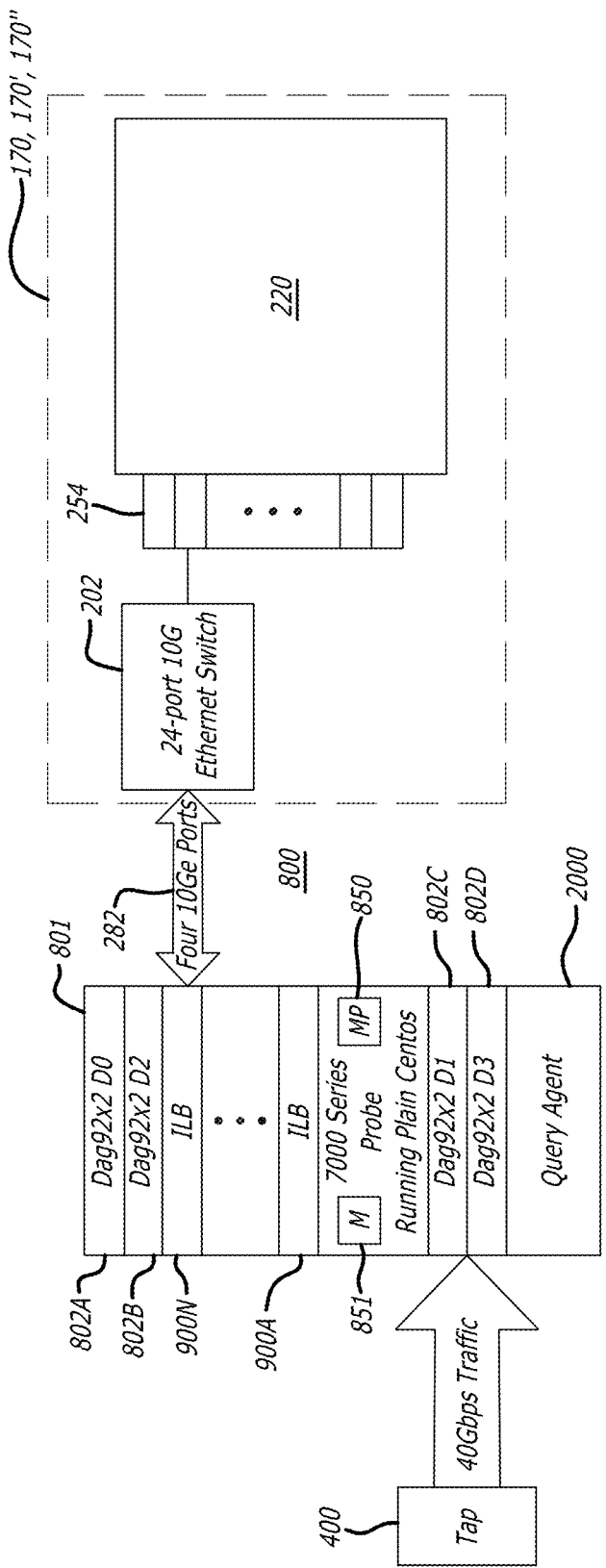
FIG. 8A illustrates a block diagram of a high speed intelligent network recording system within a portion of a local area network.
Figure 8B:
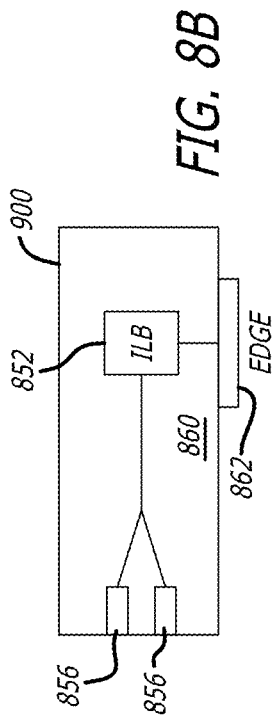
FIG. 8B illustrates a block diagram of an intelligent load balancing card.
Figure 10:
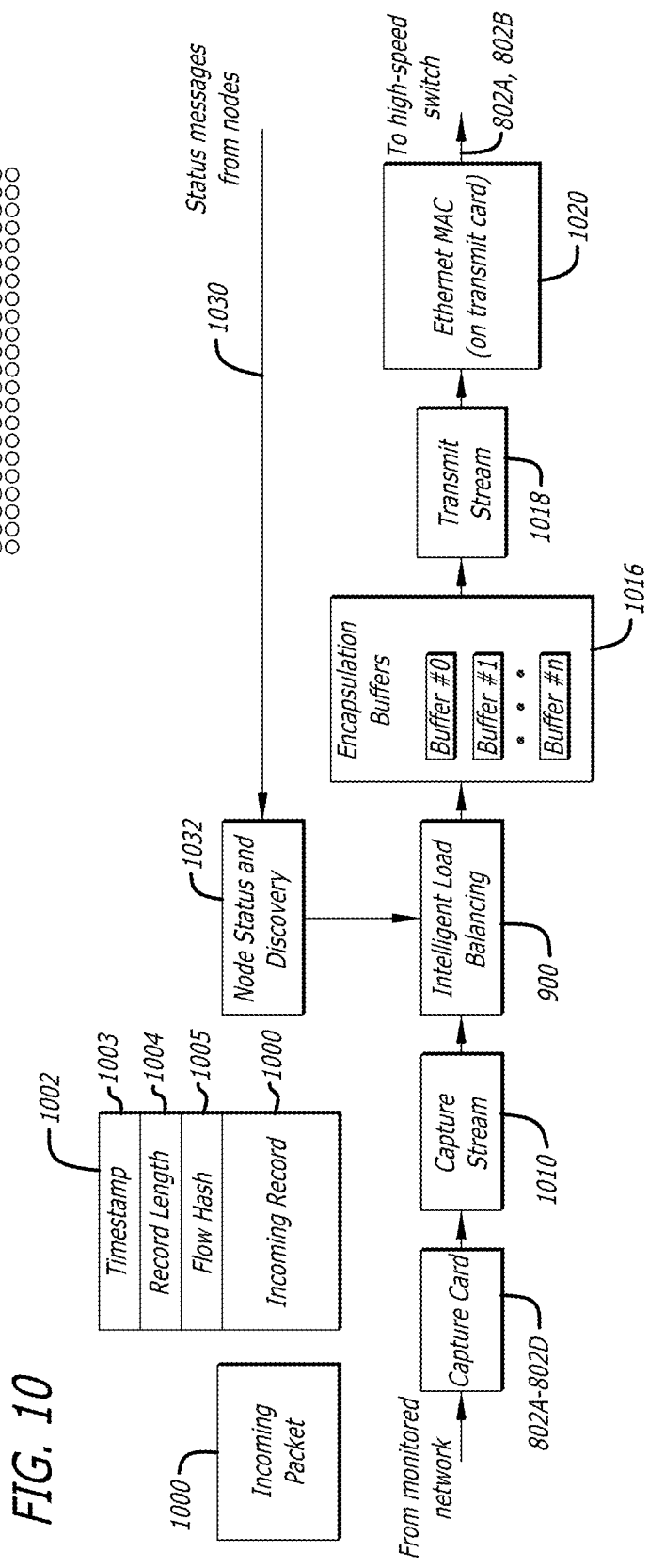
FIG. 10 illustrates a block diagram of data packet flow and processing with intelligent load balancing by an intelligent load balancer in the intelligent network recording system.

Referring now to FIGS. 8A-8B and 10, a portion of the data center network is shown to describe the capture processing and intelligent load balancing of packets for the intelligent network recorder.

FIG. 8A shows an intelligent network recording system 800 including a probe (intelligent load balancing) network device 801 and a high speed intelligent network recorder coupled together. To receive egress and ingress IP packets, the intelligent network recording system 800 is coupled to the tap 400. The high speed intelligent network recorder (HSINR) 170, 170' includes a high speed switch 202 coupled to an intelligent storage array 220, or other suitable devices servicing as nodes of intelligent storage. The intelligent load balancing function of the intelligent load balancing network device 801 may be hardware implemented by one or more intelligent load balancing cards 900A-900N installed into an intelligent load balancing network device 801. The intelligent load balancing function provided by the ILB cards 900A-900N may be referred to as an intelligent load balancer 900.

FIG. 8B shows an instance of an intelligent load balancing card 900. Each intelligent load balancer card 900 may include an intelligent load balancing chip 852 and a plurality of Ethernet connectors 856 mounted to a printed circuit board 860. The printed circuit board 860 includes an edge connector 862 and wire traces to couple circuits together and to the edge connector. The edge connector 862 plugs into the sockets of the motherboard in the intelligent load balancing network device 801. The Ethernet connectors 856 allow each ILB card 900A-900N to couple to the switch 202 using high speed Ethernet wire cables or Fibre Channel optical cables. Additionally, one or more Ethernet connectors 856 may be used to couple the intelligent load balancing network device 801 to the tap 400 in the data center computer network 100A,100B for IP packet capture subsuming the function of capture cards 802C,802D.

Alternatively, the intelligent load balancing function may include software having instructions stored in memory M 851 that can be executed by one or more multiprocessors MP 850 of the intelligent load balancing network device 801. Alternatively, the intelligent load balancing function of the intelligent load balancing network device 801 may be implemented in a combination of software and hardware.

The intelligent load balancing network device 801 may include a query agent 2000. The query agent 2000 may be used to analyze the IP packets that are stored in the storage array 220 of the HSINR 170,170'.

FIG. 10 shows an overview of packet flow captured by one or more capture cards 802A-802D in the intelligent load balancing network device 801. Intelligent load balancing is desirable in a network in which multiple conversations are happening among multiple computers. Incoming packets 1000 over the monitored network are received and are captured by the one or more capture cards 802A-802D. Each capture card 802 performs some processing of the packets to form a capture stream 1010 of packet records. An incoming packet 1000 may include, for example, a TCP SYN, a TCP ACK, data, or something else. One of the capture cards 802A-802D forms a packet record 1002 in metadata for each incoming packet 1000. A packet record 1002 includes, without limitation, a timestamp 1003, a record length 1004 when stored, and a flow hash tag 1005. The capture card 802 sends the incoming packet 1000 in a capture stream 1010 to the intelligent load balancer 900. The capture stream 1010 may be stored, for example, in a large first-in-first-out (FIFO) time-ordered buffer in a multiplexer (MUX). The intelligent load balancer 900 reads the incoming packet 1000 with its packet record 1002 and applies the intelligent load balancing 900 via the intelligent load balancing network device 801.

The intelligent load balancer 900 reads metadata (1003, 1004, 1005) from the packet record 1002, determines a destination node (e.g., a particular hard drive on an intelligent hard drive) based on the flow hash 1005 of each packet record 1002, and steers the packet record 1002 to one of N encapsulation buffers 1016 (e.g., steers packet record to buffer #0). Each flow hash 1005 is a uniquely calculated tag for each conversation flow. The number of encapsulation buffers may be, for example, N=350 or some other number. Each buffer may include, for example, 8 kilobytes of space. Each encapsulation buffer 1016 is associated with an active node (e.g., intelligent hard drive) in the intelligent network recorder 170, 170'. Each encapsulation buffer (buffer #0) may contain multiple packet records. For example, each encapsulation buffer (e.g., buffer #0) may contain one or more packet records from a single conversation, or may contain multiple packet records from multiple conversations. One capture card 802 may contain multiple encapsulation buffers 1016, but encapsulation buffers 1016 are not necessarily on the capture card 802.

When an encapsulation buffer (e.g., buffer #0) for a node becomes full, the system commits that full buffer to the transmit stream 1018. The packet records for that buffer are encapsulated into an Ethernet frame with the appropriate destination addressed for the associated active node. The Ethernet frame of records is sent to the ILB chip 852 or card 802A, 802B having an Ethernet media access controller (MAC) 1020. The Ethernet frame of records form a transmit stream 1018 to the ILB chip 852 or card 802A, 802B. The ILB chip 852, coupled to the connectors 856, in each ILB card 900A-900N or card 802A, 802B and the high speed switch 202 provides a capture network fabric to each node. The transmit stream 1018 of records is transmitted over the capture network fabric to the respective node (intelligent hard drive in the network recorder) to which they are addressed. The system then uses a new buffer, or reuses a buffer, for the node that received the packet 1000.

There may be multiple storage nodes to a single compute unit forming virtual nodes. In such a case, the node address (destination address) information includes an identifier to identify the specific virtual node at the compute unit to which the record is addressed. Generally, the intelligent load balancer 900 assumes nodes are independent, but the intelligent load balancer 900 may take into account link bandwidth and locality when making load balancing decisions to ensure reliability and increase query performance. Note that the intelligent load balancer 900 can also be applied in a non-Ethernet situation, such as a virtual environment where the capture stream and encapsulation buffers are pipes directly connected to analysis applications.

The intelligent load balancer 900 receives status messages 1030 from the nodes that are associated with a status update. A status message 1030 from a node informs the intelligent load balancer 900 of the node's capabilities, availability, and other changed events. The status messages 1030 may be stored into a node status and discovery buffer 1032 for continual use by the intelligent load balancer 900 to make informed load balancing decisions of the packet records to the nodes.

Intelligent Load Balancing Methods

Figure 9:
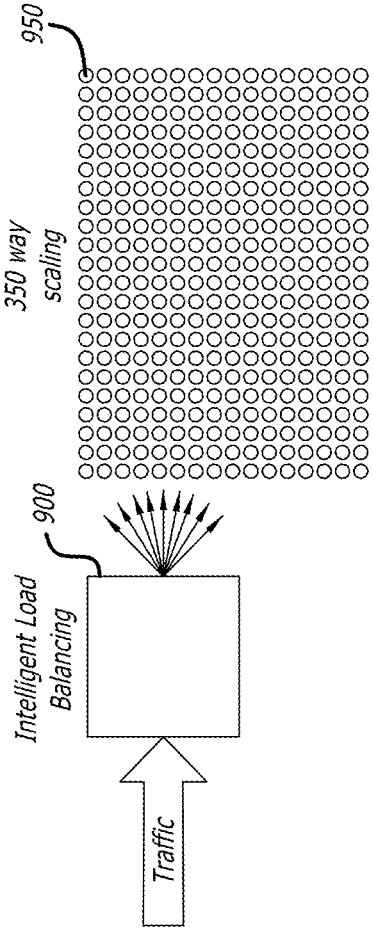
FIG. 9 illustrates a block diagram of an intelligent load balancer providing intelligent load balancing to a plurality of nodes of intelligent network storage.

FIG. 9 shows the intelligent load balancer 900 handling data packet traffic. As described with reference to FIG. 10, intelligent load balancing 900 may occur in a network in which multiple conversations are happening among multiple computers. Referring again to FIG. 9, the intelligent load balancer 900 may be implemented in software and executed by a processor in the intelligent load balancing network device 801 with the one or more capture cards 802A-802D. Alternatively, the intelligent load balancer 900 may be substantially implemented in hardware with minimal software drivers to control the hardware.

The load balancing algorithm performed by the intelligent load balancer 900 allows functionally equivalent implementations in software and hardware. Whether implemented in hardware, software, or combination thereof, the load balancing algorithm attempts to maintain flow coherency, and attempts to ensure the first N packets of a flow are always sent to a single destination to allow deep packet inspection (DPI) such as an application detection. In one embodiment, flow coherency includes records from a bidirectional network flow or flow being sent to the same destination (e.g., a cold flow tends to be directed coherently to a single node). The load balancing algorithm supports load balancing to very limited capability nodes while maintaining flow coherency.

Figure 11:
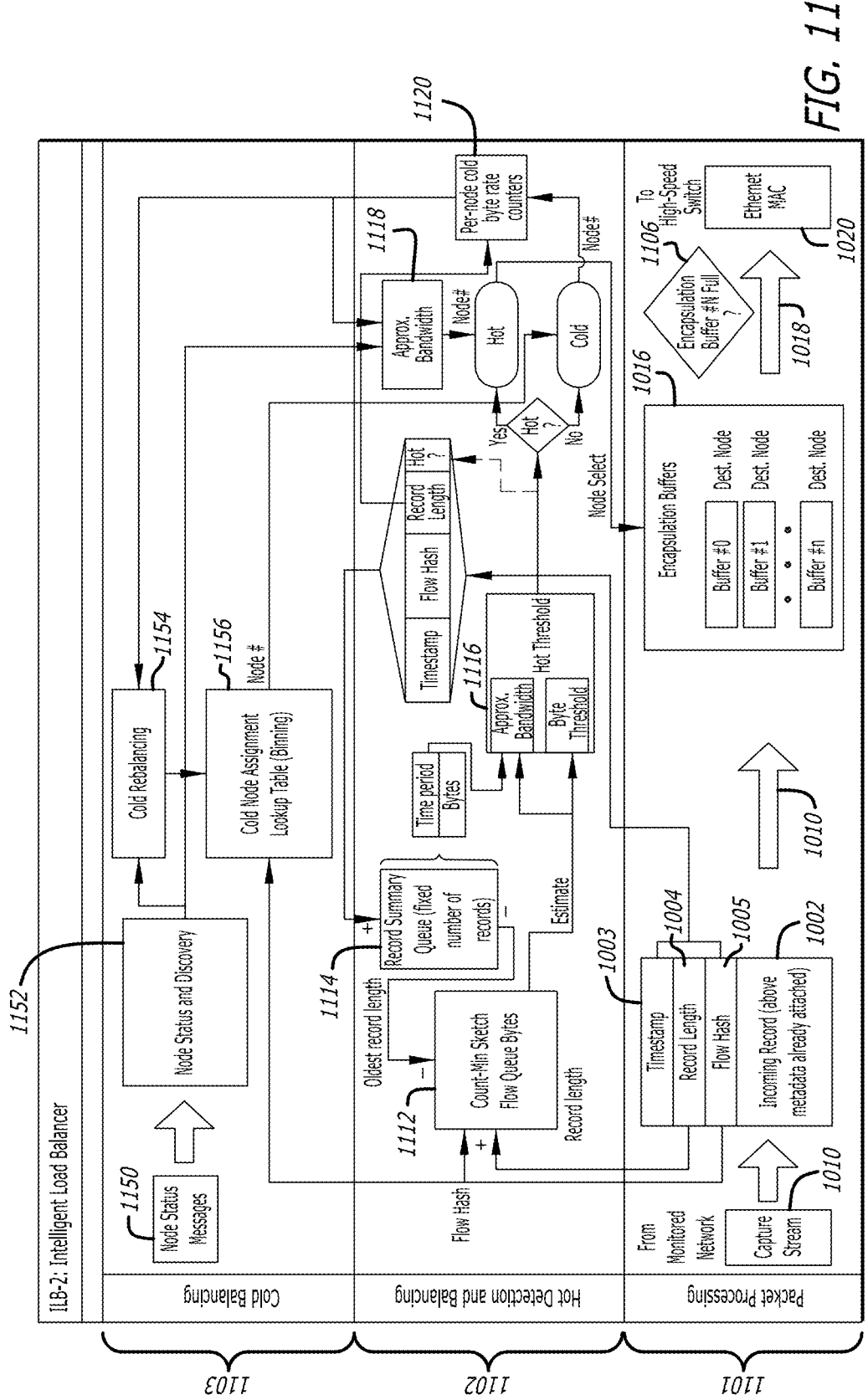
FIG. 11 illustrates a functional block diagram of intelligent load balancing by the intelligent load balancer.

FIG. 11 illustrates details of the methods of intelligent load balancing by the intelligent load balancer 900. The packet processing subsystem 1101 of FIG. 11 is basically the overall processes of FIG. 10. The hot detection and cold balancing processes 1102 and the cold balancing processes 1103 of FIG. 11 are basically the processes of the intelligent load balancer 900 of FIG. 10.

At the packet processing subsystem 1101 of FIG. 11, additional metadata is attached to each incoming Ethernet frame. The additional metadata includes, without limitation, a timestamp 1003, a record length 1004, and a flow hash tag 1005, which form a packet record 1002. The capture stream 1010 includes a plurality of packet records 1002. When the record 1002 is read from the capture stream 1010, the timestamp 1003, record length 1004, and flow hash 1005 are passed to the hot detection and balancing subsystem 1102.

The hot detection and balancing subsystem 1102 determines whether a packet record should be considered part of a "hot" flow (and be randomly distributed) in this subsystem or considered to be part of a "cold" flow (and remain flow coherent) and further processed by the cold balancing subsystem. In one embodiment, a "hot" flow is a conversation having a bandwidth that is greater than a given threshold; while a "cold" flow is a conversation having a bandwidth that is less than or equal to the given threshold. In one embodiment, a capture bandwidth of a destination node is significantly less than (e.g., less than one-tenth) a total incoming bandwidth of the plurality of conversation flows; in one embodiment, a capture bandwidth of a destination node is significantly less than an admissible bandwidth of a single hot flow. Accordingly, at the hot detection balancing 1102, the system inserts the record length 1004, at positions computed from the flow hash 1005, into the count-min sketch 1112. The count-min sketch 1112 provides an estimate of the total length of records represented (e.g., flow queue bytes) in the record summary queue 1114 for that flow.

The system forms a record summary that includes the record timestamp 1003, the record length 1004, and the flow hash 1005. The system adds that record summary of the current packet record to the record summary queue 1114.

Each record summary may also include other flags for tracking additional statistics, such as a flag for whether the record was considered part of a hot flow and the destination that the flow was assigned to. When the load balancer is used for packet capture storage, the length includes record overhead as the entire record is stored at the destination.

Statistics are kept on the record summary queue 1114, including bytes of records in the queue, bytes of records that were marked as hot, and the current queue time period. These (or equivalent state tracking) may be advantageously used by the embodiments. The record summary queue 1114 has one entry of a fixed length (e.g., fixed bytes) for each packet record 1002. The queue 1114 may have a fixed number of records, but that is not a requirement. Accordingly, each entry in the record summary queue 114 effectively represents a period of time. The time periods enable the system to monitor the relative load of the different capture streams 1010 and different nodes. The size of the record summary queue 1114 represents the time period over which the system can measure the bandwidth for the network flow for each conversation. When the number of flows or traffic bandwidth is very high, it is impractical to track an entire conversation over the entire lifetime of the conversation. Each entry is not a fixed unit of time by default, but each entry represents the time window between the packet and the next entry. Accordingly, the record summary queue 1114 provides a window for measuring approximate bandwidth for a transmission of each conversation. Accuracy of the measurement of the bandwidth tends to increase as the size of the record summary queue 1114 increases.

When the record summary enters the records summary queue 1114, the record length is inserted into a count-min sketch 1112 (or other space efficient table). A family of pairwise independent hash functions is used to generate the hashes for the sketch table, using the original record flow hash as the key. The flow hash may be provided to the load balancer, and if not, the flow hash may be computed by the load balancer.

The count-min sketch 1112 is similar in concept to a counting bloom filter. The count-min sketch 1112 provides an accurate value estimate of entries above a threshold. The count-min sketch 1112 is known to have a low probability of false positive and is not proportional to the size of the input.

The simplest count-min sketch 1112 variant includes a group of several pairwise independent universal hashes which map to the same number of rows d of width w in a table. The value is inserted into each row of the table at the position computed by the hash function for that row. The value is estimated as the minimum of the values at the hash position of each row. Other variants exist and may be used to trade off computational complexity, accuracy and the introduction of false negatives. In particular, the intelligent load balancer may use the Count-Mean-Min variant of sketch that uses the mean of the row, excluding the current counter, as a noise estimate and returns the median of the counters as an unbiased estimate, finally returning the minimum of this and the minimum to reduce overestimation.

As the circular queue is fixed length for simplicity, any variant of sketch should allow deletions. In particular, the minimal increase optimization is not used.

In order to represent the flow queue bytes, the record length 1004 of the oldest record summary in the record summary queue 1114 is decremented (e.g., removed) from the counters in the count-min sketch 1112. Once the system decrements (e.g., removes) a record summary from the record summary queue 1114, the system forgets about that record summary.

The count-min sketch 1112 decrement should occur before the insertion of the record summary at the record summary queue 1114. That way, the record summary does not affect the accuracy of the estimated flow queue bytes. The count-min sketch 1112 thereby keeps an approximate count of the number of bytes per flow hash. Accordingly, the count-min sketch 1112 is an approximate hash table or similar. The lookup (and hence counters) of the count-min sketch 1112 is approximate.

At the hot threshold 1116, the system can use the approximate bandwidth, the estimated byte threshold, or both, in order determine if the flow for a packet is hot (relatively high amount of traffic) or cold (relatively low amount of traffic). Once classified as hot or cold, a record is treated differently depending whether it is part of a hot flow or not.

If the system determines the flow is cold, then the system uses the cold balancing algorithm to assign the packet to the appropriate encapsulation buffer 1016. If a bandwidth threshold is used instead of a byte threshold, then the system approximates the bandwidth over the length of the queue (or otherwise initially underestimates bandwidth) in order to maintain very high probability that the first N packets of the flow are sent to the same destination. With very short queues, a simple byte threshold is used instead, or optionally, a simple byte threshold in combination with a bandwidth threshold can be used to approximate the bandwidth. The system attempts, as much as possible, to assign cold flows evenly without breaking up the flows. Cold flows (records not marked as hot) are load balanced evenly by the flow hash tag, with each record having the same flow hash being sent to the same destination node.

Optionally, a small lookup or hash table may be used to differentiate flows once they reach the count-min sketch 1112 threshold level to greatly reduce false positives and flow hash collisions (As described with reference to FIG. 1C, a flow is identified by the end points which are communicating via the flow). This is to assure that at least the first N packets of a flow go to a single destination node with very high probability. However, it is not fully guaranteed that the first N packets in a flow will go to a single destination node due to the cold rebalancing mechanism or node fail-over.

However, if the flow queue bytes value estimation returned by the count-min sketch 1112 (after insertion of the current record length), expressed as an approximate bandwidth (using queue record timestamp period), is greater than the hot threshold, then the record is considered "hot". The hot threshold is set such that no single flow will exceed a significant fraction of the bandwidth capability of the node. For a hot flow, the system pseudo-randomly assigns the packet to the appropriate encapsulation buffer 1016 based on the load of the nodes. Accordingly, a hot flow may be spread across multiple encapsulation buffers 1016 for multiple nodes. Hot traffic generally makes up the majority of bandwidth but in a small number of flows on networks. Thus, the intelligent load balancer sends the vast majority of flows (e.g., cold flows) each to a single node, despite the low capability of the node.

A feature of the system is a delay before a flow is detected as hot—the detection threshold is set such that at least the first N packets of the flow go to the same destination to allow deep packet inspection, such as application detection, even if the flow is later determined to be hot with its packets distributed to a plurality of nodes.

Cold record bytes are tracked in per-node rate counters 1120 (see FIGS. 15A-15C), which informs the weighting of the hot balancing (see FIG. 14) and the triggering and weighting of cold balancing (see FIGS. 15A-15C, 16). Additional statistics may be kept but are not strictly necessary for the operation of the system. The system updates the per-node cold byte rate counters 1120 by using the record length 1004 and the cold node selection. The counters 1120 provide an estimate of how many packets are going to a particular node. So, if a node is relatively busy, the system should not send more packets to that busy node. The system uses the per-node byte rate counters 1120 and the node status and discovery 1152 for cold rebalancing 1154 in the cold balancing processes 1103. The system is informed about the node status and discovery 1152 via the node status messages 1150. The node status messages 1150 can receive status messages a couple of different ways. One way is by each node periodically sending a node advertisement including static information (e.g., node exists, node is operational, node is not operational, node storage capacity, performance claim about maximum bandwidth, how full the node's receive buffer is, etc.). Another way is by each node periodically sending a node advertisement including dynamic information (e.g., the buffer is almost full, etc.). If a node is full, or almost full, the load balancer 900 reassigns the buffer for that node to another encapsulation buffer 1016 for another node. If a node stops working, then the node stops sending status messages. Such a stop on advertisements informs the intelligent load balancer, via a timeout period, that the node is unavailable and cannot receive new traffic. The load balancer 900 reassigns the buffer for that inactive node to another encapsulation buffer 1016 for another node.

Simultaneously (or after the record is determined cold in a sequential implementation) the record flow hash is looked up in the cold node assignment lookup table 1156. The cold node assignment lookup table 1156 is updated infrequently by the cold rebalancing 1154. The flow hash 1005 is passed through a function (such as modulus) which uniformly maps the space of the flow hash to a smaller set of bins, each bin being associated with a node number. The number of bins is at least as many as the number of active destination nodes. Each bin is assigned to or associated with a node. The lookup table 1156 assigns the packet to the appropriate encapsulation buffer 1016 when the flow is determined to be cold. The contents of the lookup table 1156 may change, for example, if one of the nodes goes down (e.g., a hard disk stops working). In such a case, the cold rebalancing 1154 performs a reassignment of the packet to another encapsulation buffer 1016. The contents of the lookup table 1156 are intended to only change when necessary to avoid overloading nodes or sending to an unavailable node, to avoid unnecessarily breaking flows. The output of this lookup table 1156 is the node assigned to that flow, assuming it were a cold flow (See FIG. 10 and its description). In a simple embodiment the lookup table 1156 may be replaced with a simple function that evenly maps the flow hash space to the set of active nodes.

Accordingly, cold flows are assigned based on dynamic coarse hash-based binning by the cold node assignment lookup table 1156, similar to the hash lookup table in U.S. patent application Ser. No. 14/459,748, incorporated herein by reference. It is intended that this binning of cold flows are adjusted as little as possible to avoid breaking flows. To this end there is a further mechanism where individual bins are redistributed away from a node only when it hits a threshold close to its maximum capacity. Until this point, hot redistribution maintains an even load by reducing hot traffic sent to the node.

Further, cold rebalancing may also be necessary with a dynamic number of nodes and should minimize the number of bin movements to minimize flow breakage. When a node becomes unavailable, the cold balancer reassigns all of the bins previously assigned to the departing node in the cold node assignment lookup table 1156. Infrequent rebalancing for more even cold load based on binning and/or node statistics is also possible. However, this is likely unnecessary given the low total bandwidth at end nodes.

A dynamic hot threshold, rehashing or dynamic bin sizing could be used if a single bin exceeds the capacity of an individual node. However, this situation is expected to be extremely rare with a uniformly distributed input hash function and well-chosen hot threshold.

The system informs the hot balancer 1118 by using the node status and discovery 1152 and the per-node cold byte rate counters 1120. Using such information, the system tends to assign a packet of a hot flow to an encapsulation buffer 1016 that is relatively less busy.

Accordingly, in response to the hot detection and cold balancing processes 1102 and cold balancing processes 1103, the system steers the packet record 1002 to one of a plurality of encapsulation buffers 1016 associated with the destination nodes. So, the selection of the destination node to which the record is sent is a function of the intelligent load balancer 900 (e.g., hot detection and balancing 1102 and cold balancing 1103).

Once assigned a node, packet records are accumulated into one of a plurality of encapsulation buffers 1016, where the plurality is the same as the number of active destination nodes. When the buffer (e.g., buffer #0) reaches a maximum size, possibly determined by the maximum supported frame size of the Ethernet network (MTU), the content of the buffer is sent to the destination node through encapsulation into an Ethernet frame. The compute units attached to the internal switch fabric each have a number of attached nodes, but this detail is largely abstracted from load balancing decisions.

At decision operation 1106, the system determines if an encapsulation buffer 1016 is substantially full or not. When an encapsulation buffer 1016 becomes substantially full, the records associated with a destination node are sent via an Ethernet link and high-speed switch to the destination node (see destination node 950 in FIG. 9, for example). The system sends the contents of the full encapsulation buffer (e.g., buffer #0) to the Ethernet MAC 1020 (coupled to a high-speed switch) via the transmit stream 1018. The capture stream 1010 may be stored, for example, in a large first-in-first-out (FIFO) time-ordered buffer in a demultiplexer (demux), where the selector is the node select signal. The transmit stream 1018 is, for example, a FIFO buffer that may contain multiple Ethernet frames destined for nodes.

In one embodiment, the intelligent load balancer 900 is a software process running on a network capture device. The network capture device includes one or more data acquisition and generation (DAG) cards with Ethernet ingress capture ports and Ethernet egress ports. The ingress capture ports are used to capture the network packets flowing into and out of the local area network or data center. The egress ports are connected via a high-speed Ethernet switch to a plurality of nodes to store the network packets. The high-speed Ethernet switch and the plurality of nodes may be referred to as the internal switch fabric.

The core algorithm is expressly designed to be efficiently implementable in both software and hardware (FPGA). A count-min sketch is used to allow high-performance implementation in high-speed SRAM, and the multiple hashes may be computed in parallel. The queue may use slower DRAM. However, only the linearly accessed insertion point (which is also the removal point) needs accessing per record so it could be pre-fetched. Periodic rebalancing operation may be implemented in software. The cold-node assignment lookup table may be implemented by adjusting the hardware hash tag load balancing table described in U.S. patent application Ser. No. 14/459,748 (using the destination node or encapsulation buffer index as the queue index).

Aspects described as "even" may also be weighted based on differing nominal bandwidth and compute capability of individual nodes. Also, the pseudo-random assignment may be deterministic instead (e.g., choose node with minimum traffic). Also note, different policies can be applied to hot traffic, such as not balancing the hot flow unless the node is already overloaded (e.g., exceeding maximum advertised rate 1211).

Nodes may be dynamically discovered and managed, advertising their maximum capture rate and capacity. They may also advise the intelligent load balancer of their buffer level and notify when their buffer reaches a critical level. The communication between nodes and ILB can occur via a multicast node advertisement system. The load balancer's node status and discovery subsystem may use this information in its load balancing decisions (such as in weighting the 'even' load). The load balancer's node status and discovery subsystem may check a destination node's status prior to sending an encapsulated record buffer, instead sending the buffer to a different node where possible if the first node has become unavailable. The load balancer's node status and discovery subsystem may exclude slow or unavailable nodes from further traffic distribution as well. This minimizes packet drop due to node storage or compute failure, which is more likely when using low cost hard drives.

In a software implementation, multiple instances of the intelligent load balancer may be executed by the probe/tap so that even higher data rates can be achieved. Hash-tag load balancing may be used to pre-distribute load amongst the multiple instances of the intelligent load balancer. The multiple instances of the intelligent load balancer may communicate, possibly via a central node manager process or system and share state about bandwidth and load, in order to maintain the correct distribution and to ensure each node in a pool of nodes is assigned to at most one intelligent load balancer to ensure timestamp ordering at the capture end.

Figure 21:
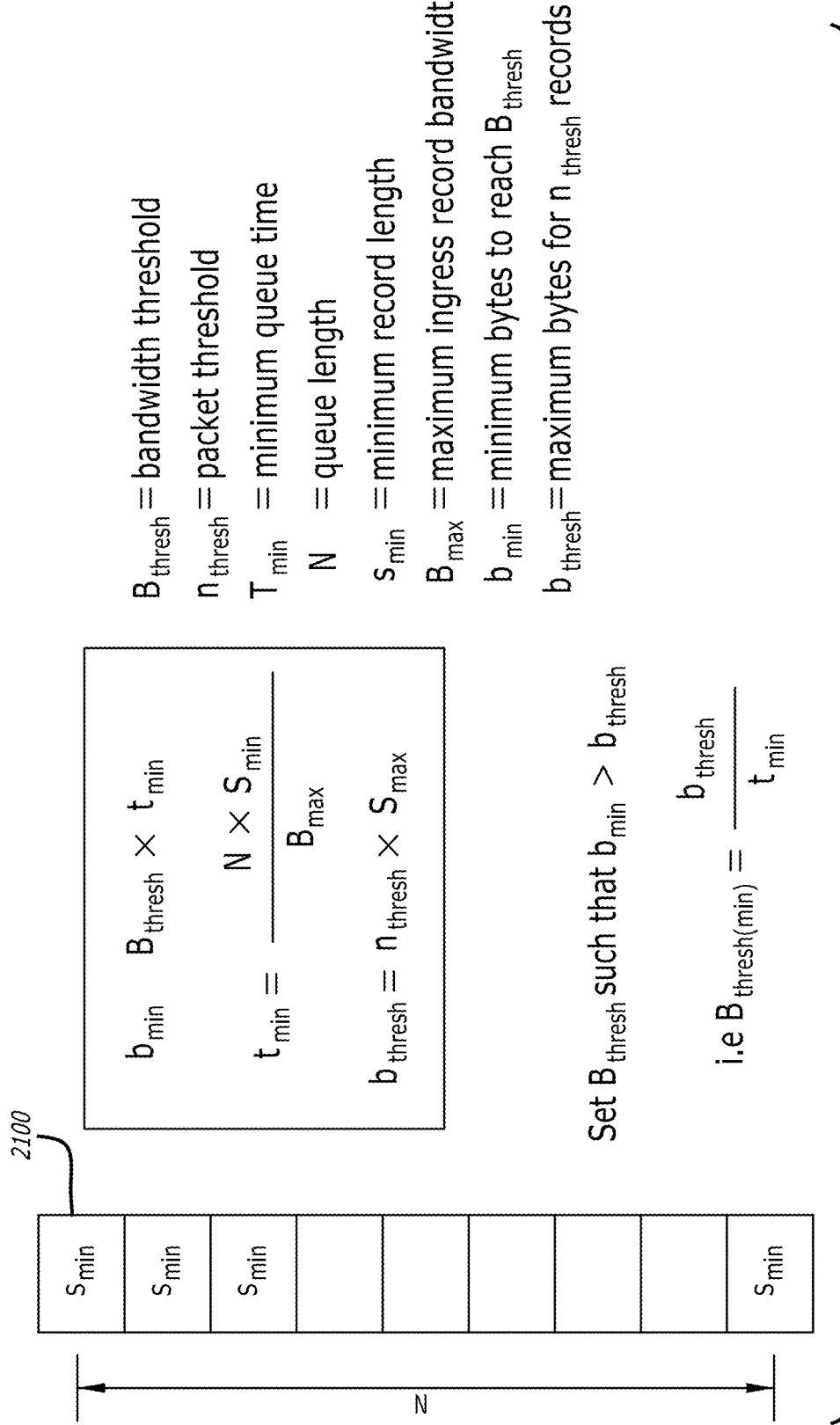
FIG. 21 illustrates a diagram to calculate a minimum approximate bandwidth threshold.

Referring now to FIG. 21, an algorithm for determining a minimum approximate bandwidth threshold $B_{thresh}$ (also referred to as a hot approximate bandwidth threshold) is shown. The algorithm relates the hot approximate bandwidth threshold $B_{thresh}$, and the minimum number of first packets to send to a node for the packet threshold $n_{thresh}$. $S_{min}$ is the minimum record length while $S_{max}$ is the maximum record length. A queue 2100 has a queue length N with a plurality of packets or records of minimum record length $S_{min}$. The equations and variable meanings shown in FIG. 21 are incorporated herein by reference.

The hot approximate flow bandwidth threshold $B_{thresh}$ is compared against the time period of the queue and the flow byte estimate. This threshold determines whether a given flow is to be treated as "hot" for the current record. If a bandwidth threshold is used without a byte threshold, then the bandwidth is approximated over the length of the queue N (or otherwise initially underestimate) in order to maintain very high probability that the first N packets of the flow are sent to the same destination. If the queue length is short, a simple byte threshold may suffice as the hot approximate flow bandwidth threshold. Optionally simple byte threshold may be used in combination with a bandwidth threshold to determine the hot approximate flow bandwidth threshold $B_{thresh}$.

Cold Node Assignment

Figure 13:
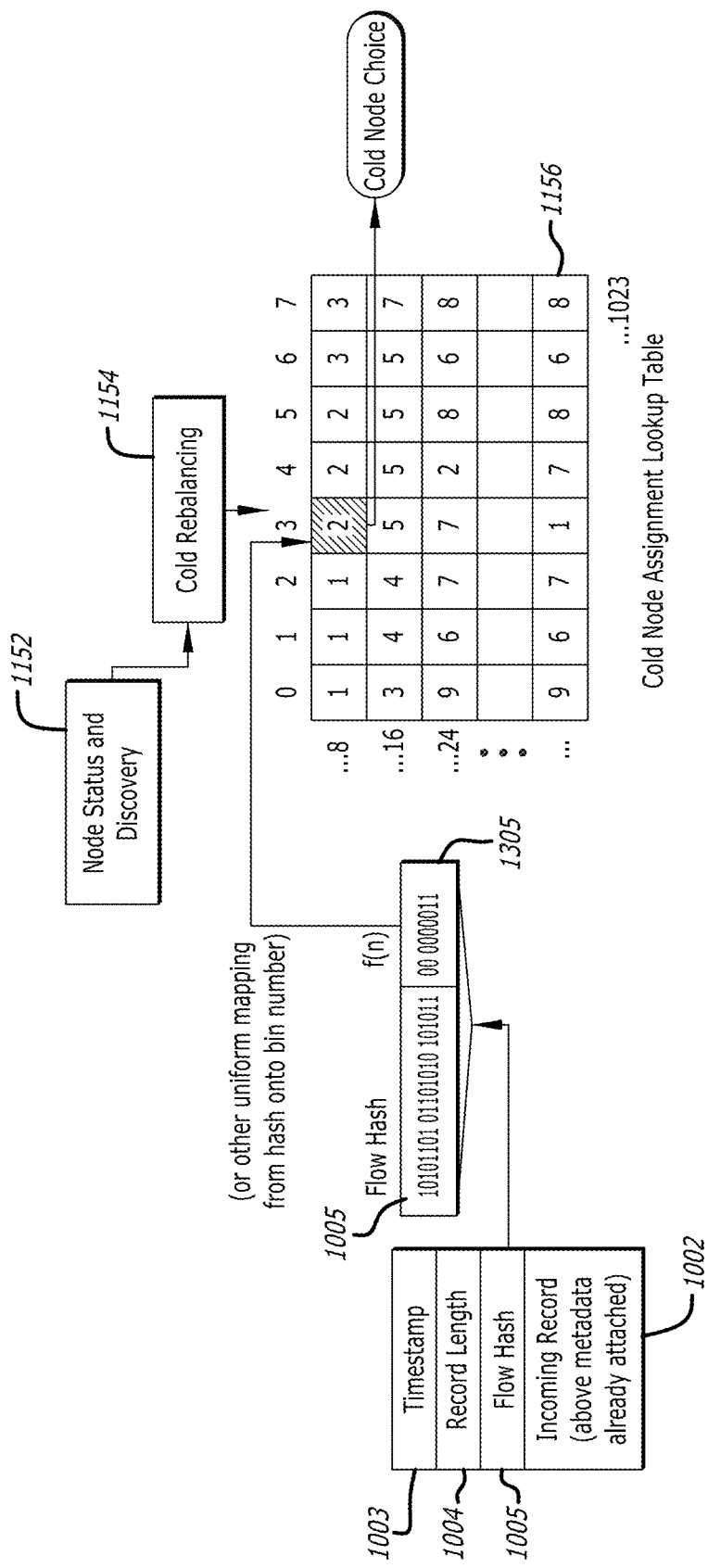
FIG. 13 illustrates a diagram of the process of cold node assignment by a cold node assignment lookup table by the intelligent load balancer.

FIG. 13 illustrates the process of cold node assignment by the cold node assignment lookup table 1156 is now described. The flow hash 1005 of the incoming record is passed through a mapping function f(n) that maps the packets of the flowhash consistently to a smaller number of bins (e.g., 1024 bins in FIG. 13).

In the example of FIG. 13, the mapping function f(n) is a simple bit mask. Each bin in the cold node assignment lookup table 1156 is assigned a node. The cold rebalancing subsystem 1154 updates the mapping in the table 1156 when the number, or availability, of nodes changes. The cold rebalancing subsystem 1154 further handles cold bin movement, and may optionally perform arbitrary major rebalances for long term evenness. However, the arbitrary major rebalances should be performed infrequently by the cold rebalancing subsystem 1154 to minimize broken flows. In a combined hardware-software implementation, the cold rebalancing subsystem 1154 would generally be in software, and the cold node assignment lookup table would be stored and updated with hardware.

Traffic Balancing

Referring now to FIGS. 12A-12D, bandwidth charts are shown for a plurality of nodes to discuss traffic balancing by the intelligent load balancer 900. In each bandwidth chart, the bandwidth of the incoming stream of records for storage is divided into hot traffic and cold traffic across an arbitrary number N of nodes (six nodes A through F being depicted in the figures). A fair share bandwidth level 1210 and a node advertised maximum bandwidth rate level 1211 are depicted by a pair of lines in the chart with each node having the same but for FIG. 12D. In FIG. 12D, the fair share bandwidth level 1210C and the node advertised max rate level 1211C differ for node C from that of the fair share bandwidth level 1210 and the node advertised max rate level 1211 for the other nodes. FIG. 12C illustrates a bandwidth threshold for each node by a line in the chart.

FIG. 12A illustrates a cross section of node bandwidth share (hot and cold traffic) for a plurality of nodes in a typical operation of the intelligent load balancing algorithm. The cold traffic may be assigned through a coarse hash-tag load balancing using the cold node assignment lookup table 1156. But for node D's cold traffic 1201D, the cold traffic 1201A-C,1201E-F is relatively well balanced amongst the nodes A-C and E-F but not exactly even. Cold traffic generally makes up a minority of the record bandwidth but the majority of flows on networks.

After hot detection by the hot detection and balancing 1102, the hot traffic undergoes hot traffic balancing by a hot balancer 1118. The hot balancer 1118 weights hot bandwidth such that each node receives an even share of the total bandwidth, referred to as a fair share 1210. Node D has a large exaggerated cold bandwidth share 1201D and a small hot bandwidth share 1202D but a total share that is substantially equal to the fair share bandwidth level 1210. This illustrates that random weighted hot balancing causes the percentage of hot traffic allocated to nodes to approach zero as the cold bandwidth for that node approaches the fair share amount.

In FIG. 12B, node D's cold bandwidth 1211D has exceeded the fair share 1210 of total bandwidth. In this case, node D receives no hot traffic at all. A rebalancing does not occur with the cold rebalancer 1154 at this point because it would unnecessarily break flows. However, it may be necessary to do a wider rebalancing eventually, if long term storage retention uniformity is desirable.

In FIG. 12C, the cold bandwidth assigned to node D rose beyond a threshold 1252 above the node's advertised maximum storage rate 1211. At this point the cold balancer 1156 selects a single bin to reassign cold traffic to a different node, such as node E. Typically, the cold traffic 1223T that is to be reassigned should be reassigned to the bin (and thereby assigned to that associated node) with the most hot traffic (and thus lowest cold traffic). However, if bin bandwidth statistics are not available, selecting the bin associated with the record at the time of trigger will tend towards bins with higher bandwidth. The cold traffic 1223T is reassigned to the node with the lowest cold flow bandwidth, in this case node E. This only breaks flows that hash to that particular bin associated with node D. With a suitably well-distributed flow hashing function, it is likely that a small number of high-bandwidth bins containing not-quite-hot flows, cause the cold bandwidth imbalance. This is because the flow distribution by the flow hashing function should distribute traffic among bins in a relatively uniform manner. This means it is a reasonable approach to move only a single bin of cold traffic 1223T as shown from node D to node E.

If storage retention uniformity is desired, the threshold 1252 could be set below or at fair share 1210 rather than above the advertised maximum rate 1211. Multiple bins could also be moved to resolve the cold traffic flow imbalance. Note that a similar number of network flows are broken when moving multiple bins individually or in a group.

FIG. 12D illustrates an example of how nodes with differing capability may be included in the weighting of the hot and cold balance algorithms, in order to distribute traffic according to node capabilities. In FIG. 12D, node C has a lower maximum advertised storage rate 1211C than that of the higher maximum advertised storage rate 1211 for the other nodes. In this case, the cold bandwidth share 1231C in the cold balancing bin associated with node C is lower. Moreover, the fair share 1210C of total bandwidth for node C is weighted lower than the fair share 1210 for the other nodes. Due to the lower fair share 1210C, the hot balancing algorithm may allocate a lower percentage of hot traffic to node C as indicated by the difference in the hot bandwidth share 1222C shown in FIG. 12C and the hot bandwidth share 1232C shown in FIG. 12D.

Hot Balancing

Figure 14A:
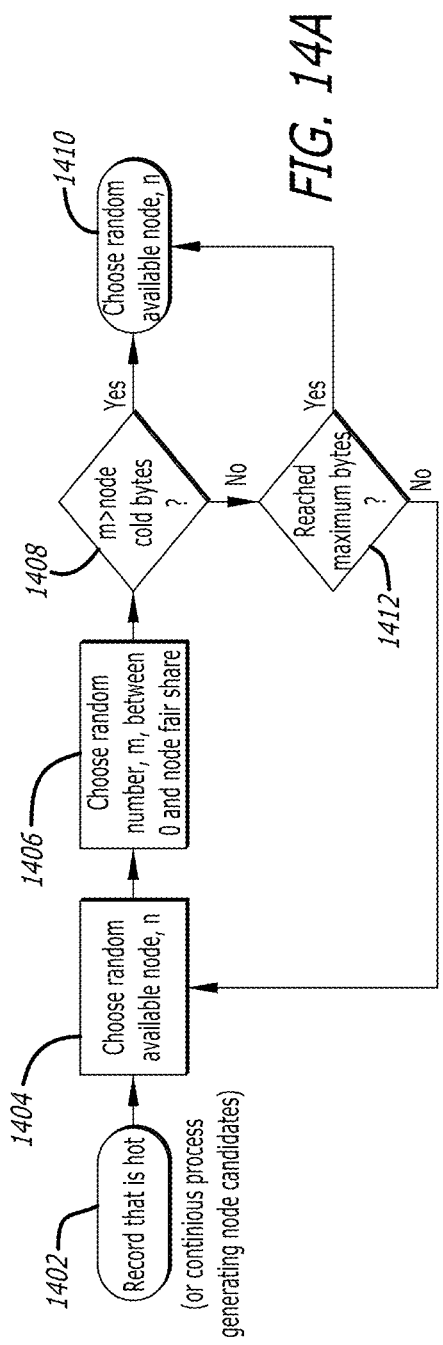
FIGS. 14A-14B illustrate the process of hot balancing with a hot balancing weighting algorithm by the intelligent load balancer.

FIG. 14A illustrates a conventional process of hot balancing by using a hot balancing weighting algorithm. Cold byte rate counters shown in FIG. 14B, for example, are used to determine the hot traffic weighting. The difference between current node current cold bandwidth and total bandwidth fair share is used to weight the node selection.

As shown in FIG. 14A, for an incoming packet record that is a part of hot traffic 1402, at process 1404, the system chooses a random available node n (e.g., by using hot balancer 1118).

At process 1406, the system then chooses a number m (which is random or deterministic) between 0 and a node fair share. The number m may be chosen once per comparison or may be chosen once per packet.

At process 1408, the system determines if the number m is greater than a node cold bytes threshold. If the number m is greater, then at process 1410 the system steers the hot packet record to the node n buffer. However, if the number m is not greater than a node cold bytes threshold, then at process 1412, the system determines if the maximum number of retries has been reached for that packet record.

If the maximum number of retries has been reached, then the system goes to process 1410 and steers the hot packet record to the node n buffer. However, if the maximum number of retries has not been reached, then the system goes back to process 1404 and chooses another random available node n for the packet record.

Figure 14B:
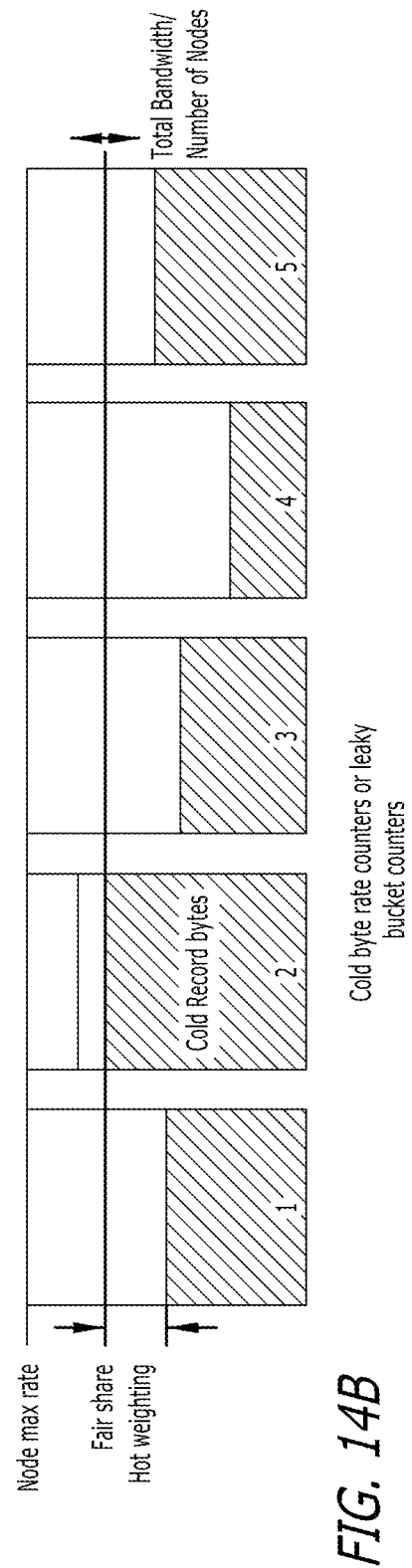

FIG. 14B illustrates hot balancing by using cold byte rate counters or leaky bucket counters. The purpose of FIG. 14B is similar to the purpose of FIG. 14A. However, FIG. 14A shows a "pressure based" buckets for nodes that the system "drains" at a constant rate. In FIG. 14B, the shaded area represents the bandwidth at the nodes (e.g., nodes 1-5) for cold records. The system uses a bucket level in a similar way the system uses the number m for decision making in FIG. 14A.

Where all nodes have equal capability, fair share is equal to the current total bandwidth divided by the number of active nodes. Note that fair share is not a static value. The fair share value fluctuates with the current bandwidth of packets that are being stored. A specific algorithm flow is described but any weighted random algorithm can be used, but most require additional state. A limited number of retries is used to ensure the algorithm terminates in a timely manner, especially with unusually high cold traffic with a large number of nodes, as perfect weighting is not necessary.

Cold Bin Movement Rebalancing

Referring now to FIGS. 15A and 15B, the process of cold bin movement rebalancing is now described. FIGS. 15A and 15B describe FIG. 12C in more detail.

FIGS. 15A and 15B illustrate the process of cold bin movement. A cold node check 1501 is triggered (such as periodically, or per cold record). Then a determination 1502 is made if the cold bandwidth of a node exceeds the node's advertised maximum capture rate (or a threshold). If the cold bandwidth of the node exceeds the threshold (yes), a bin is chosen to reassign cold traffic to another node. At process 1503, a search for a node with a minimum cold bandwidth share amongst the other available nodes is made. At process 1504, the node with the minimum cold bandwidth share is chosen to receive the reassigned cold traffic. Then at process 1506, the bin in the cold node assignment lookup table is rewritten by the cold balancer to be the recipient node. FIG. 15B illustrates bin 3 being assigned from node 2 to node 4, for example. In this manner, the cold bandwidth of the overloaded node (e.g., Node 2) is reduced while breaking only one bin worth of flows.

Figure 15C:
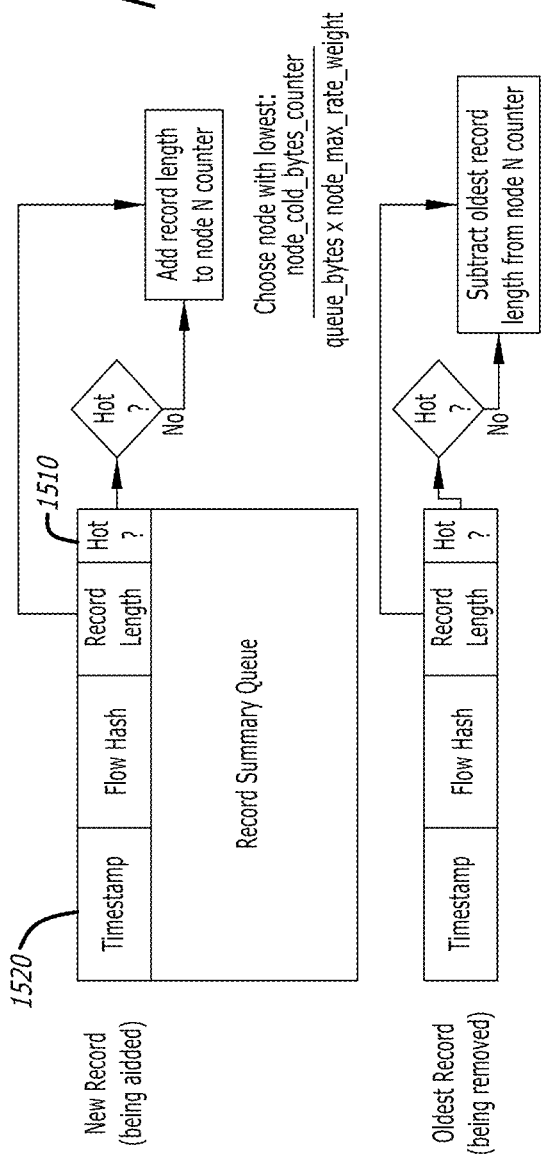
Figure 15D:
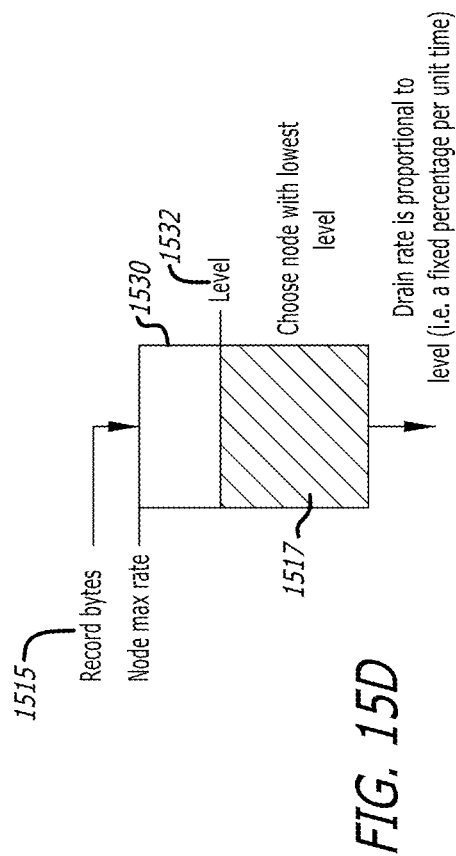

Referring to FIGS. 15C and 15D, two mechanisms of cold byte rate counters for tracking cold bandwidth are described. Other mechanisms can also be used as a cold byte rate counter.

In FIG. 15C, a software implementation includes an extra "hot" bit 1510 in the record summary queue 1520. The record summary queue 1520 also includes the timestamp, the flow hash, and the record length. The hot bit 1510 is used to add and subtract from a per-node cold bandwidth counter (e.g., record summary queue 1114 of FIG. 11). As described with reference to FIG. 11, relative bandwidth can be estimated by using the queue bytes. Alternatively, absolute bandwidth can be estimated by using the queue size (e.g., queue bytes) and the queue time period. The system chooses the node with the lowest ratio of node cold bytes counter/ (queue bytes·node max rate weight). This selection is an example of operation 1503 in FIG. 15B.

FIG. 15D illustrates a leaky bucket counter that can be used for each node. Cold record bytes 1515 for a node are added into a bucket 1530. The bucket 1530 is drained of cold record bytes 1516 over time such that the level of the bucket represents node cold bandwidth (cold bandwidth of a node). The drain rate, a fixed percentage per unit of time, is proportional to the level 1532 of cold record bytes 1517 remaining in the bucket 1530.

Figure 16:
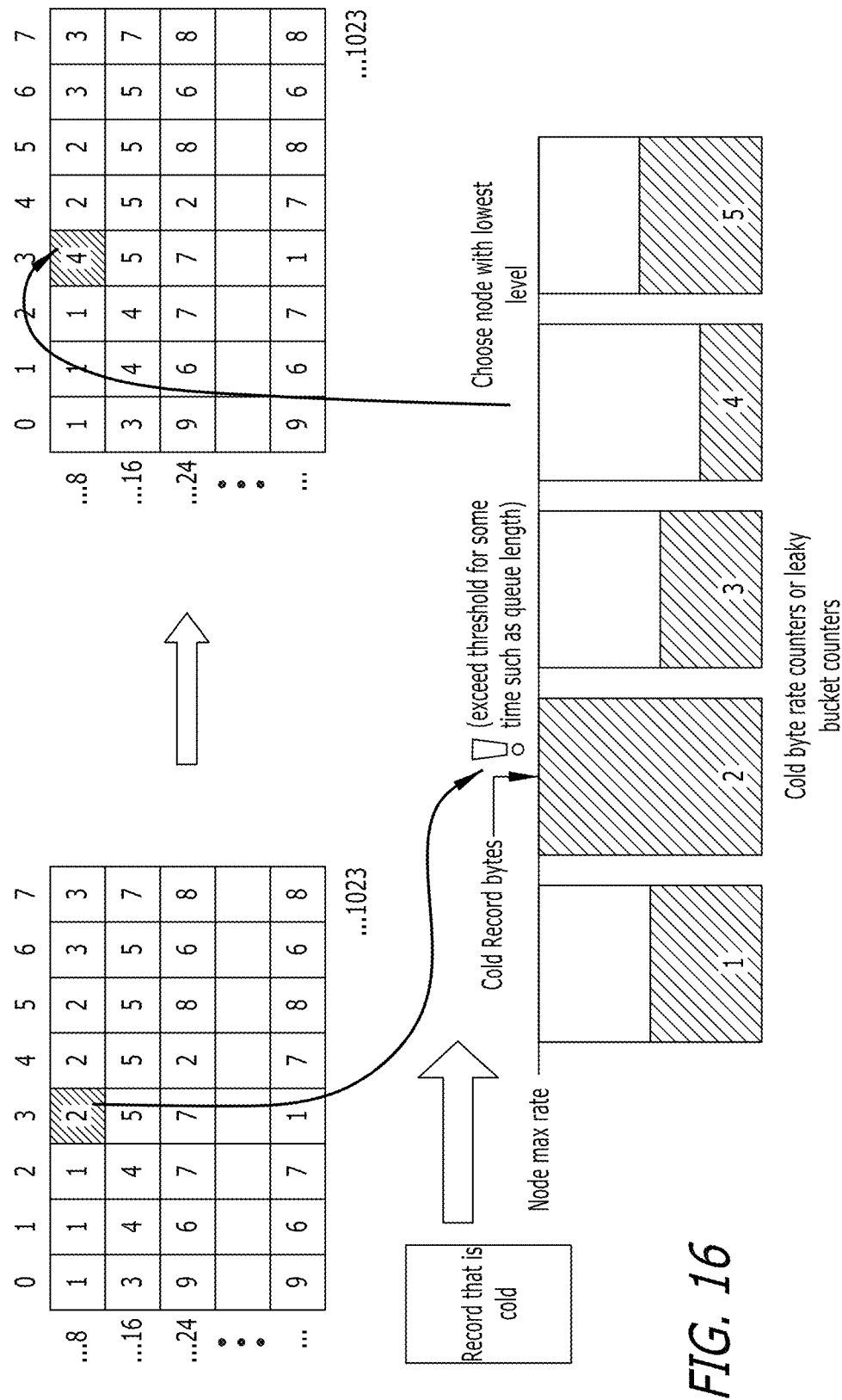
FIG. 16 illustrates the process of cold bin movement rebalancing by the intelligent load balancer.

FIG. 16 illustrates cold bin movement rebalancing. FIG. 16 provides additional detail for FIG. 12C. When a node cold bandwidth (as determined by the per-node cold byte rate counters) exceeds a threshold (usually just above maximum rate), the node is sufficiently unbalanced to require a bin rebalance. In FIG. 16, the bin rebalance is triggered when the record that pushes the cold bandwidth over the threshold arrives, and assumes some buffering delay to limit the churn rate of very high bandwidth bins. Approximating bandwidth using a long queue also helps with this. Alternative methods of introducing stability such as requiring the node cold bandwidth to exceed its bandwidth for a period of time or delaying the rebalance trigger can be used. When a bin rebalance occurs, a bin from the overloaded node is moved by simple reassigning the bin in the cold node assignment lookup table to the node with the least bandwidth (e.g., least cold traffic). In this case, the system moves the bin from node 2 (overloaded node) to node 4 (node with least cold traffic).

Node Availability Change

Figure 17:
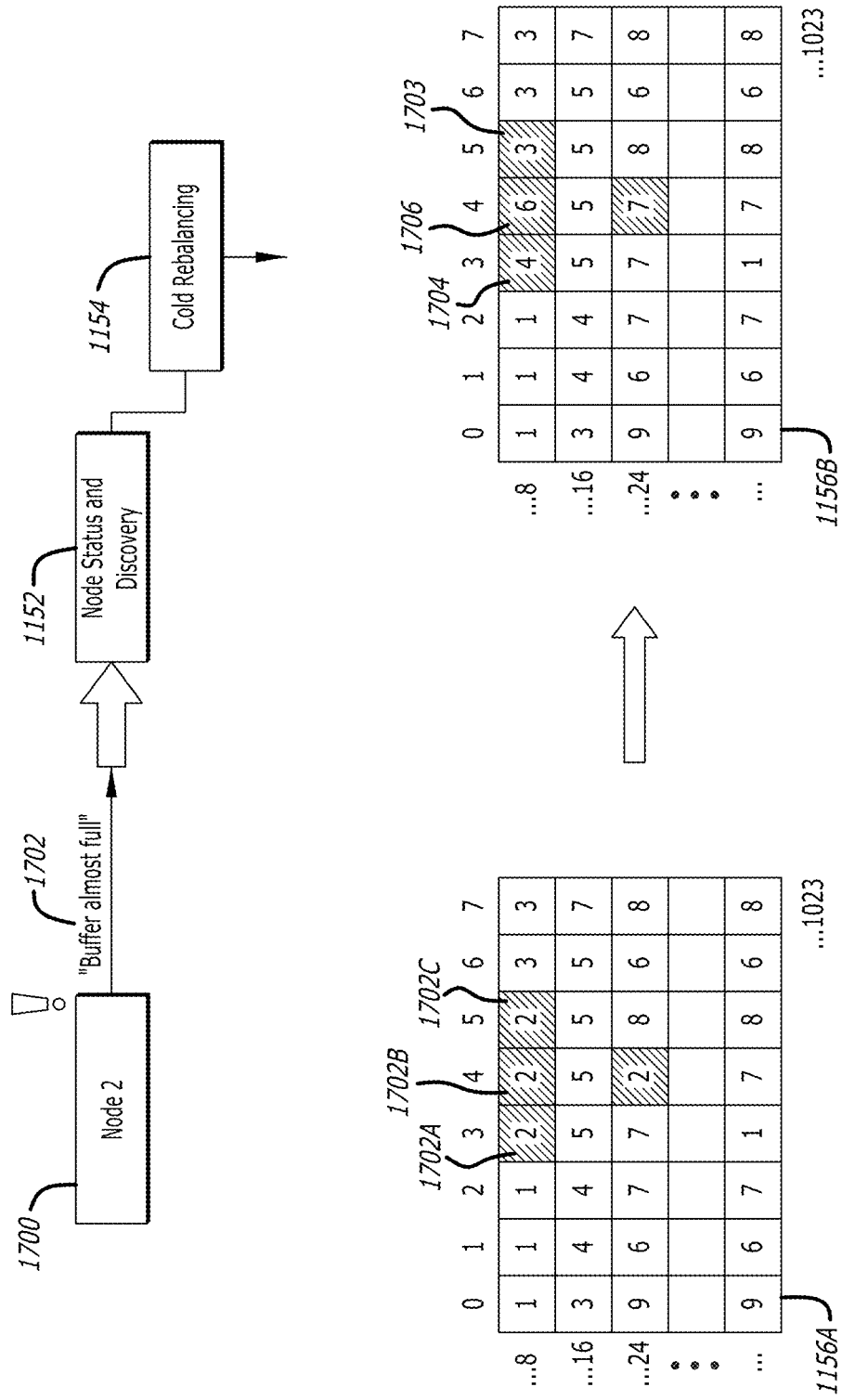
FIG. 17 illustrates the process of node availability change by the intelligent load balancer.

Referring now to FIG. 17, the process of node availability change is now described. FIG. 17 pertains to moving all of the traffic off of an unavailable node, while FIG. 16 above pertains to moving some traffic from an overloaded node.

In FIG. 17, node availability change determines how to load balance traffic when a node becomes unavailable. Consider for example node 2. The node 1700 issues a message 1702 that indicates its capture buffer is almost full because it is writing too slowly into storage, for example. The message 1702 is received by the node status and discovery subsystem 1152. The node status and discovery subsystem 1152 first tries (and fails) to select a replacement idle node. If no replacement idle node is available, the node status and discovery subsystem 1152 fails to find a replacement idle node. The cold rebalance 1154 is informed of the failure in finding a replacement idle node.

When this occurs, the cold balancer 1154 instead reassigns all of the bins previously assigned to the departing node (e.g., node 2) in the cold node assignment lookup table 1156 to other nodes. FIG. 17 illustrates assigning bins 1702A-1702C associated with node 2 in table 1156A respectively to bins 1704,1706,1703 associated with nodes 4,6,3. This can be done without breaking other flows by assigning the orphaned bins to nodes with the lowest cold bandwidth, similar to the cold bin movement algorithm. A wider rebalancing over more or all nodes could also be done, if this is a rare event. However, a wider rebalancing will break more cold flows.

Node Status and Discovery

Figure 18A:
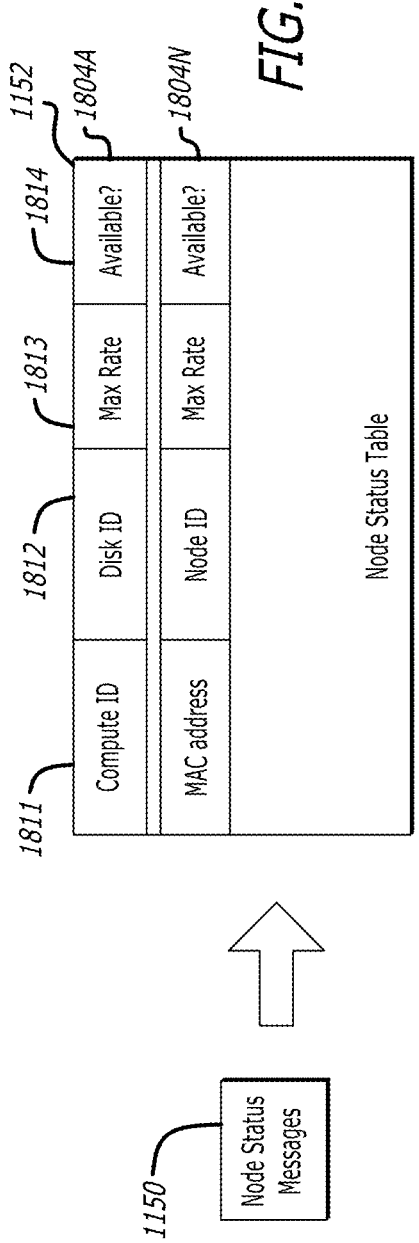
FIGS. 18A-18B illustrate the process of the node status and discovery subsystem performed in the intelligent load balancer.
Figure 18B:
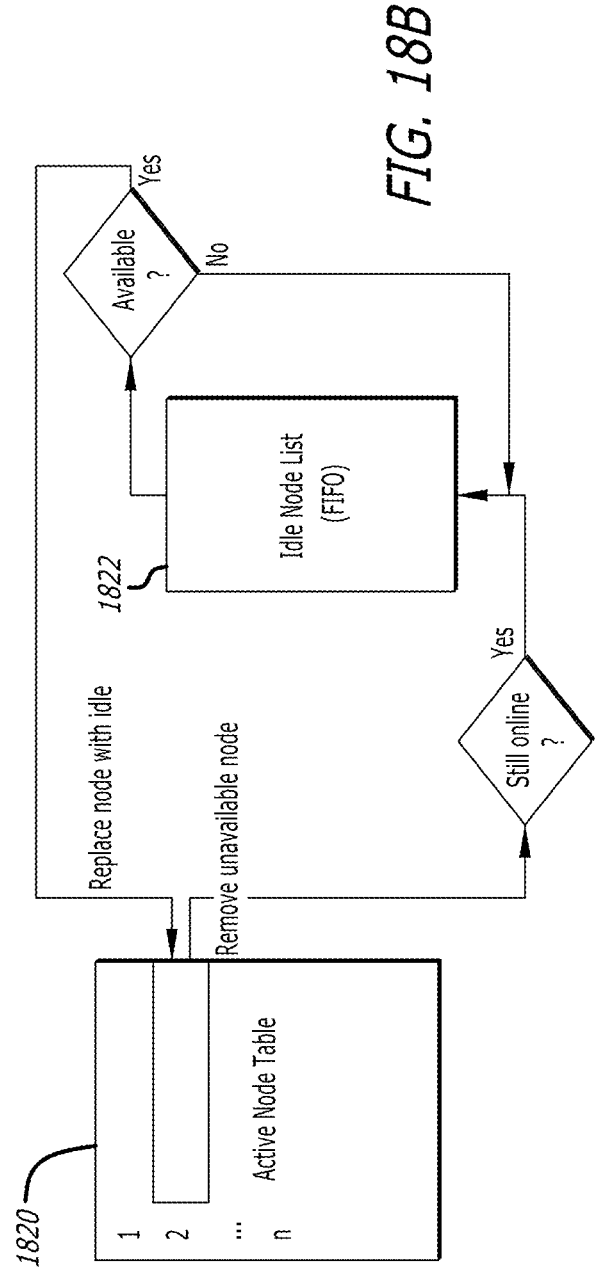

Referring now to FIGS. 18A-18B, the process of node status and discovery subsystem 1152 of FIG. 11 is further described. The node status and discovery subsystem 1152 may be fully implemented by software executed by a processor, or implemented by a combination of software or dedicated hardware.

Node status messages 1150 cause the population of a node status table 1152. The node status table 1152 includes status rows 1804A-1804N with information about the capabilities and status of each and every node on the internal capture fabric. For each node, each status row includes a compute identifier 1811 (e.g., MAC address, IP address, etc.), disk identifier 1812 (e.g., node identifier), maximum advertised rate 1813, and whether the node is currently available 1814 for capturing data. In one embodiment, each compute identifier 1811 correlates to a separate server using one or more separate hard disks. Note, the node status table 1152 is also referred to as the node status and discovery 1152 (e.g., a subsystem) in FIG. 11.

As shown in FIG. 18B, the node status and discovery subsystem 1152 also maintains an active node table 1820 (e.g., pointers for nodes) and an idle node list table 1822 (e.g., first-in-first-out (FIFO) buffer for pointers). The process of FIG. 18B helps determine what rebalancing can be done. If a status message 1150 indicates that an active node is becoming unavailable, an attempt is made to replace the node with an idle node from the idle node list 1822. The node status and discovery subsystem 1152 pops off idle nodes from the idle node list 1822 (e.g., pops off pointers) until an available idle node is found. It is preferred to use an idle node list to keep all flows from the departing node together.

After an available idle node is found, the status message 1150 causes the availability 1814 of the failing or departing node in the node status table 1820 to be updated to unavailable. Depending on the reason for unavailability and the failure history of the departing node, the departing node may be subsequently added back into the idle list 1822 for later re-use.

Count-Min Sketch

Figure 19:
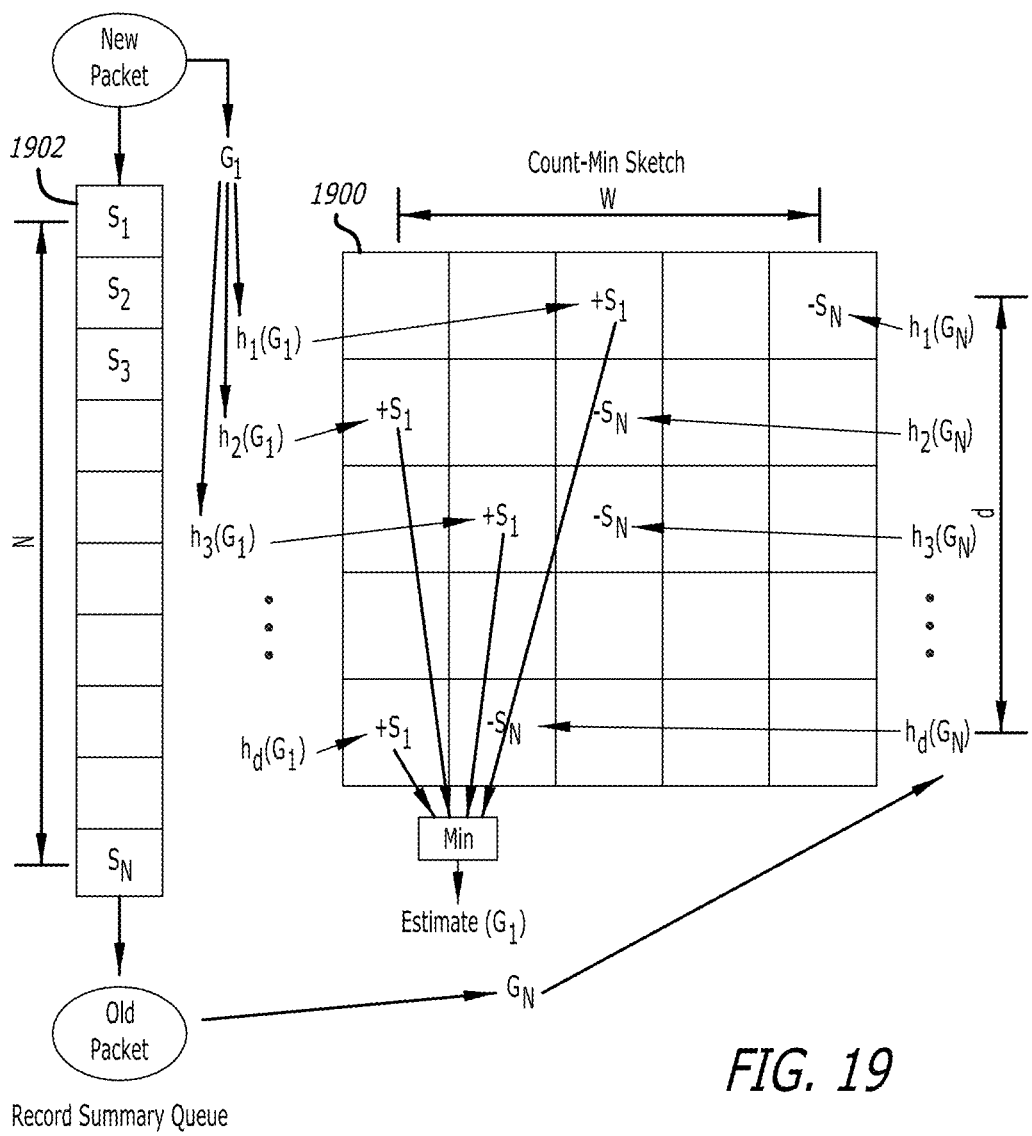
FIG. 19 illustrates the process of the count-min sketch algorithm performed in the intelligent load balancer.

Referring now to FIG. 19, the process of the basic count-min sketch algorithm is shown and now described. The count-min sketch algorithm is used by the intelligent load balancer to perform dynamic load balancing of hot and cold flows. It generates an estimate of the current bytes in the queue for the flow. That estimate is compared against the hot threshold 1116 to determine hot flows from cold flows. The count-min sketch attempts to get a bandwidth estimate of each flow without maintaining a separate counter for each flow.

The count-min sketch 1900 may be implemented with high-speed SRAM. The record summary queue 1902 may be implemented with slower DRAM.

A sketch 1900 includes compact table of a plurality of counters. The sketch 1900 has depth d (Y-axis) with rows of width w (X-axis), such that there are (d·w) counters in the sketch. The size of the sketch may be related to the number of bins of flows that are to be processed by the nodes. In the sketch, each row j has a different associated pairwise-independent hash function which maps input flow hashes h(G) (keys) onto the set of w counters Cj for that given row. Rows may be processed in parallel.

A record with flowhash G1 is inserted into the top of the record summary queue 1902. The record summary queue 1902 can store N records that are shifted each time a new record is generated. With G1 being inserted into the top of the record summary queue 1902, the oldest record associated with the oldest packet(s)

On insert of the record with the flow hash G1 (key), the record size S1 representing a count is added to a single counter for each row at positions $h1(G1), h2(G1), \ldots, hd(G1)$. Then, an estimate Estimate(G1) of the current total count for the flow hash G1 is returned as the minimum of the counters at positions $h1(G1), h2(G1), \ldots, hd(G1)$ within the sketch 1900.

The estimate Estimate(G1) of the current total count for the most recent flow hash G1 is used to form an estimate of the byte threshold and the approximate bandwidth that is used to form the hot threshold 1116 and distinguish hot flows from cold flows.

After the oldest record is pushed out of the record summary queue 1902, presuming it has been processed and stored in the storage device associated with the node, the record can be removed from the sketch 1900. For example, removal of the record with flowhash $G_N$ and record size $S_N$ is performed by subtracting the record size $S_N$ from a single counter in each row at positions h1(GN),h2(GN), . . . , hd(GN).

Network Query/Search

It is desirable to quickly search through the stored data packet communications for network attacks with little impact on continuing operations. The processor of each intelligent hard drive can quickly search through the data stored on the one or more hard drives to which it is coupled. A search request can be multicast out to the multicast group of intelligent hard drives so that each can search through the data stored therein.

It is desirable to evenly spread out the load of data to be searched over the plurality of intelligent hard drives in the array so that minimal impact is made by the search on the continued storage of network flows of data packets. Accordingly, load balancing can be desirable in the storage of data into the array of the plurality of intelligent hard drives. The specific flow-coherent properties of the intelligent load balancer permit highly efficient distributed processing. One such distributed processing is a query process.

Figure 20:
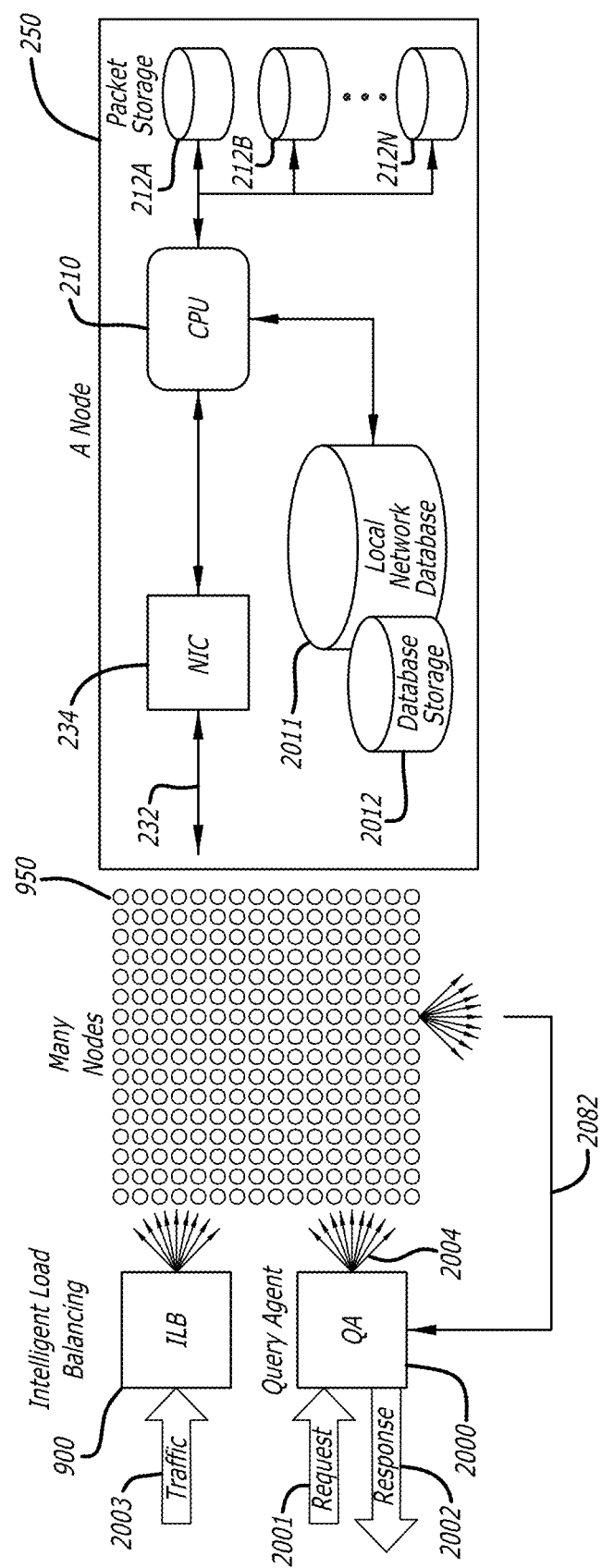
FIG. 20 illustrates a query process that may be performed on the nodes in the intelligent network recording system.

FIG. 20 shows a query process on the nodes in the system. A query agent 2000 is coupled to the intelligent network recording system 800 via the network.

The query agent 2000 receives requests 2001 for packets from an outside or remote client. The requests 2001 include one or more combinations of time range, flow hash key and packet filter. Using multicast IP method similar to the intelligent load balancing (ILB) resource discovery method, the query agent 2000 multicasts these requests to all nodes 950. When a node receives the multicast query 2004 from the query agent 2000, it begins the process of searching through the packets stored in its packet storage device based on timestamp and flow hash indexes. It is searching for the relevant packets to the request. The relevant packets that are found are passed through a query packet filter, if a query packet filter was provided with the query. With the distributed processing, the filtering is advantageously performed in a distributed but parallel manner at the nodes 950.

Once packets are found, they are encapsulated by the node and sent back over the network 2082 to the query agent 2000 in timestamp order. The query agent 2000 maintains a connection with the nodes 950 that respond during the query process. Note that this is a simple multi-way merge as the nodes 950 respond in timestamp order. As the packets are returned, the query agent 2000 sorts them into a globally consistent timestamp order. The query agent 2000 then returns the packets to the requester as the response 2002. The packets may be returned to the requester in either a streaming manner or as a complete response capture file.

Once all nodes 950 have completed the query and the query agent 2000 has responded to the requester with the final timestamp ordered packet in the file, all connections to the nodes 950 can close.

Note that a key advantage of the intelligent load balancing 900 for packet query is that the "hot" flows are distributed widely, resulting in a high return bandwidth not limited by a single node. As "hot" flows are the large flows, this results in significant bandwidth advantages. Metadata queries, such as to query a full flow tracking database or determine expected response size, may also be supported.

During the packet storage process, the node has stored packets using indexes based on timestamp and flow hash key. In an alternate embodiment, sufficient analytic processing may be performed to determine if an arriving packet is likely to be from a broken flow. The presence of a "hot" indication attached to the record metadata by the intelligent load balancer confidently indicates the flow is broken. However, it may not be the only possible cause for a broken flow. Additional detection heuristics for a broken flow may include, but are not limited to, protocol start and end signals and the use of full flow descriptors to check for flow hash collisions. For non session-oriented flows, such as UDP, a flow timeout may be used.

Information concerning broken flows is stored in a local database 2011 or a distributed database 2012 at each node (e.g., intelligent hard drive). Note that the distributed database 2012 may partially reside on each node (e.g., intelligent hard drive) or may be a separate network database that resides on a separate storage device. In the case of a distributed database 2012, an existing entry for the flow from another node may be used to assist in determining if the flow is potentially broken. Without a distributed database, a communication mechanism may be needed in order to check if a flow has been seen elsewhere, especially for non-session-oriented protocols. In particular, the processing attempts to determine if the packet is the first packet of the flow. A relatively low number of false positive broken flows is not a serious issue as it simply increases east-west traffic. The broken flow tracking database (or an additional database) may also be used as a full flow tracking database to allow flow metadata analytics, visualization, and to match flow metadata queries to flow hash keys.

The characteristics of the intelligent load balancer 900 make the system capable of distributed flow-coherent analytics. For example, deep packet inspection (DPI) for the purpose of application detection can be performed during packet storage. For "cold" flows this is obvious as all packets associated with a particular flow will arrive at a single node in time order. The first N packets of all flows go to the same destination with very high probability for DPI. For "hot" flows a significant advantage of this intelligent load balancing implementation is that it tends to ensure a certain number of packets are "cold" balanced, or sent to a single node before "hot" balancing takes place. This certain number of packets (system specified, usually around 20), is sufficient for application detection without accessing the remainder of the flow.

The system is also capable of more elaborate distributed flow-coherent analytics. In particular, various forms of intrusion detection system (IDS) analytics can be performed in a distributed manner (e.g., SNORT or SURICATA). This process may be referred to as "back-testing", as it is normal to perform IDS only in real-time. However, it is extremely useful when a new IDS rule set is released to run it in a "back-testing" mode over the last week's packet data. This allows an operator to determine if the new threat in the new rule set was actually active during the last week. An example of this would be running the SSL Heart bleed IDS attack signature over the last week's data on the day the Heartbleed attack was identified. The difficulty in performing IDS back-testing is the need that complete flows be available. Unlike application detection, which may be happy with the first twenty or thirty packets of a flow, IDS typically uses the entire flow of packets.

In one example, an IDS query request begins identically to the query agent 2000 process described above. However, the filter contains a list of IDS rule sets to run (In general, large IDS rule sets are pre-loaded on the system and just the rule identifiers are queried). The node begins its query process in an identical way by searching for packets in its packet storage based on timestamp and flow hash indexes.

The output packets are not returned to the query agent 2000 directly, however, they are sent to a local IDS process which performs the actual distributed "back-testing" and only returns any alerts found to the query agent 2000. In some cases, the node will detect using the broken flow database that a particular packet is likely to be part of a broken flow. It will not send this packet directly to the IDS process. If the broken flow database marks this packet as the first packet in a broken flow, the node will begin the flow re-assembly process. If this is not the first packet, the packet will be discarded.

For broken or "hot" flows, a flow re-assembly process is necessary. A node finding the start of a broken flow begins a distributed query process, similar to that of the query agent 2000 described with reference to FIG. 20. This node issues a multicast request for packets which may be part of the broken flow. Once the node has received all parts of the broken flow, the node reassembles the flows and sends the flows to the IDS process.

Query Return

Figure 22:
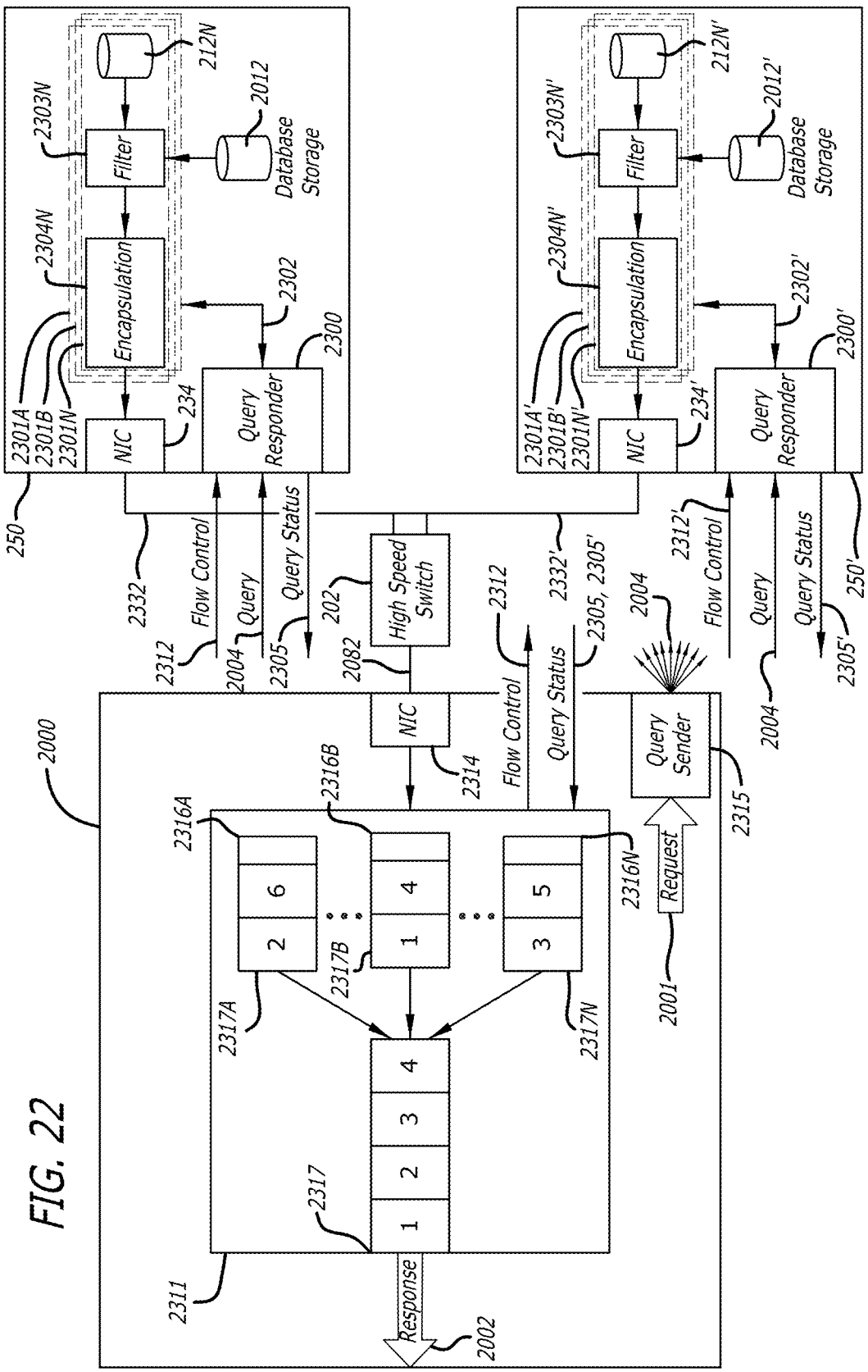
FIG. 22 shows details of a query return process.

FIG. 22 shows details of a query return process. Query agent 2000 receives request 2001, prepares query message using query sender 2315, and multicasts the query 2004 to all nodes. The diagram shows two intelligent hard drives 250,250', each with a plurality of nodes 2301A,2301B, 2301N. Each of the plurality of node query return processes 2301A,2301B,2301N manages one disk 212N. Each intelligent hard drive 250,250' receives multicast query 2004 at a query responder 2300,2300'. The query messages 2312, 2004,2305 may be communicated using network interface cards 234,2314 via high-speed switch 202 and high-speed networking cables 2332,2332',2082 or alternatively via a separate connection, such as a management network interface card, an Ethernet cable 257, and gigabit switch 242. Query responder 2300 receives query 2004 and instantiates or configures per-node query return processes 2301A, 2301B,2301N including Filter 2303N. Filter process 2303N filters the records from disk 212N to the set of records that match query 2004. Filter 2303N uses the flow hash and timestamp index for records stored on disk 212N to accelerate retrieval. Some node-specific aspects of database 2012, such as the flow hash and timestamp index, may reside on disk 212N and may be stored in a different format. After passing through filter 2304 matching records are encapsulated in timestamp order by encapsulation 2304N for transmission over network interface card 234. The encapsulation includes metadata describing the source node identifier 250,212N. Query responder 2300 may update query agent 2000 on the progress of the query response using query status messages 2305 and rate-limit query processes 2301A, 2301B,2301N upon reception of flow control messages 2312.

Query agent 2000 receives encapsulated query responses at network interface card 2314 via one or more high speed networking cables 2082 coupled to high-speed switch 202. Query responses from each of the per-node query return processes 2301A,2301B,2301N are transferred into query response buffers 2316A,2316B,2316N. Query response merge process 2311 performs a time-ordered merge by inspecting the timestamp of first un-merged records 2317A, 2317B,2317N and merging them into time ordered response stream 2317 for response 2002 to the query requester.

Query status messages 2305,2305' are used by query merge process 2311 to determine when the query response from node 2301N is complete and to determine when waiting for the next query response record 2317N is unnecessary. Flow control messages 2312 are sent by query response merge process 2311 to avoid overflow of buffers 2316A,2316B,2316N. Query response buffers 2316A, 2316B,2316N and merge process 2311 may be entirely in hardware, in a combination of hardware and software, or entirely in software. In some embodiments, query agent 2000 may optionally pass query response streams 2316A, 2316B,2316N directly as response 2002 to one or more analysis applications that generate analysis results.

In one embodiment, encapsulation 2304N,2304N' encapsulates query results into Ethernet frames substantially similar to the encapsulation used by intelligent load balancer 900. In another embodiment, encapsulation 2304N,2304N' transfers query results to query buffer 2316N as a TCP stream where the source IP address and port constitute the node identifier. In this embodiment flow control 2312 uses TCP flow control mechanisms. Query status messages 2305 may be delivered in-band. One or more of the high speed networking cables 2332, 2332',2082 may be the same cables 232,282 as used for transmission from intelligent load balancer 900 or may be a different set of cables.

Node Capture and Broken Flow Detection

Figures 23A, 23B:
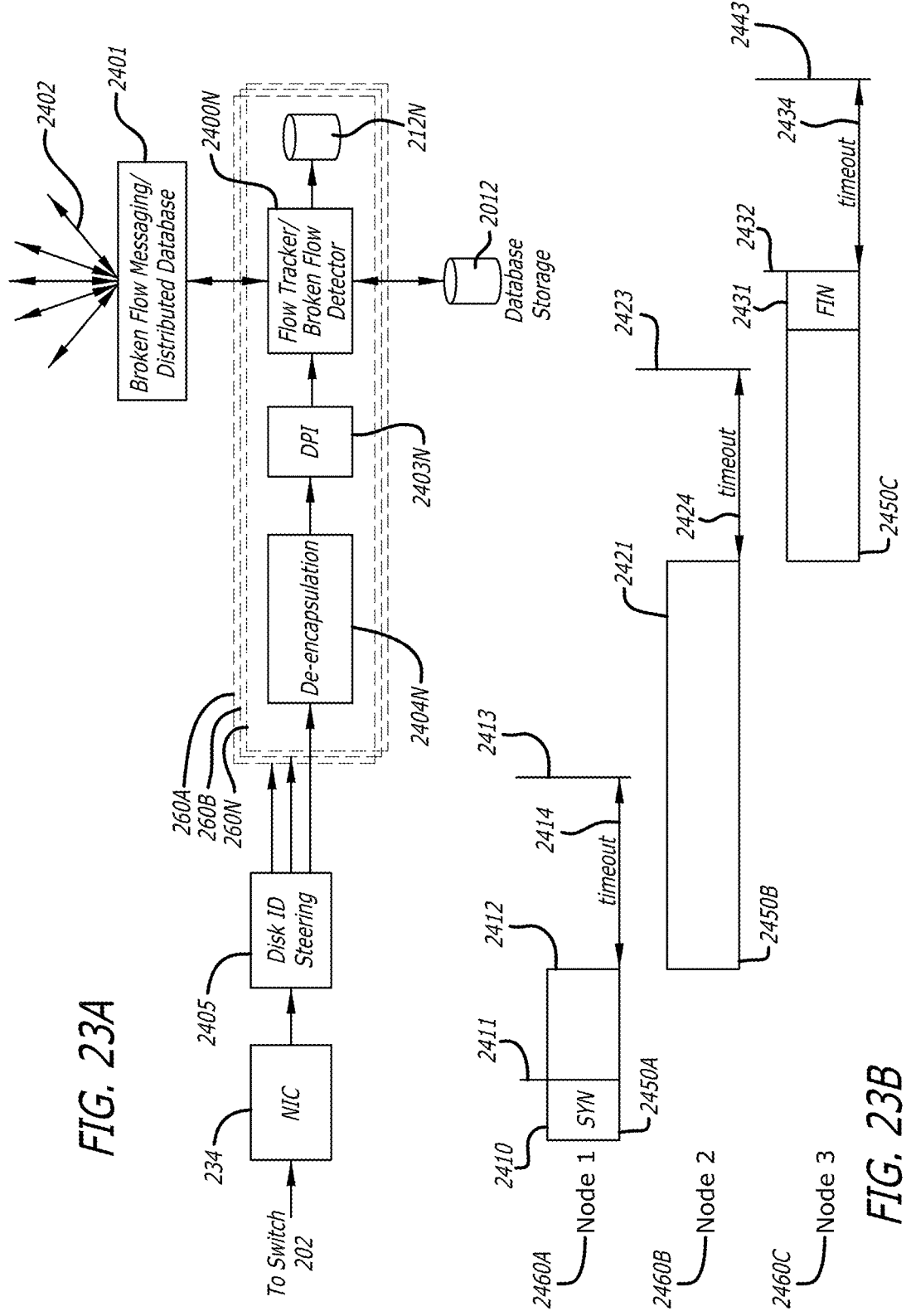
FIG. 23A shows a record capture flow within an intelligent hard drive.
FIG. 23B shows one embodiment of messages transmitted by broken flow messaging system by way of an example broken flow split across three nodes.

FIG. 23A shows a record capture flow within an intelligent hard drive 250. Encapsulated records from the intelligent load balancer 900 are received at NIC 234. Such encapsulated records are directed to one of the plurality of logical nodes 260A,260B,260N within the intelligent hard drive, steered by disk ID 2405 to a particular logical node 260N. Each logical node 260N manages one disk 212N. Encapsulated records are then de-encapsulated by process 2404N, optionally passed through deep packet inspection process 2403N and then passed to flow tracker and broken flow detector 2400N before finally being stored at disk 212N. Disk ID steering 2405 and de-encapsulation 2404N may be performed in hardware, in software, or a combination of both.

Flow tracker and broken flow detector 2400N of each of the plurality of logical nodes 260A,260B,260N is coupled to database storage 2012 which stores flow tracking and/or local broken flow state. Database storage 2012 may be a distributed network database. Flow detector 2400N is also coupled to broken flow messaging system 2401. In an alternative embodiment broken flow messaging system 2401 is a distributed database which may be combined with database storage 2012. Broken flow messaging system 2401 may also be coupled in direct communication with database storage 2012.

FIG. 23B shows one embodiment of messages 2402 transmitted by broken flow messaging system 2401 by way of an example broken flow 2450 split across three nodes 260A, 260B, 260C. Node 1 receives the first segment of the flow, 2450A. Upon receiving start of flow marker 2410 (e.g. TCP SYN) it multicasts message 2411 indicating it has seen the start of flow 2450. Node 1 multicasts additional broken flow indication message 2413 when end of flow flag 2431 (e.g. TCP FIN) is not received timeout 2414 after last packet from flow 2450 received, 2412. Node 2 receives middle flow segment 2450B and multicasts broken flow message 2424 when start of flow marker 2410 is not received timeout 2424 after last packet from flow 2450 received, 2423. Node 3 receives final flow segment 2450C and multicasts message 2432 upon reception of end of flow marker 2431 indicating it has seen the end of flow 2450, additionally multicasting broken flow message 2443 after timeout 2434 having not received start of flow marker 2410.

Start of flow marker 2410 include but are not limited to the TCP SYN flag. End of flow marker 2431 include but are not limited to the TCP FIN flag.

Node 1, node 2 and node 3 can determine flow 2450 is broken due to any of broken flow messages 2411, 2413, 2423, 2432, 2443 where that message is received from another node. Node 2 and node 3 can additionally detect flow 2450 is broken due to not receiving start of flow marker 2410 by the end of timeout 2424 and 2434, respectively. Similarly, node 1 can additionally detect flow 2450 is broken due to not receiving end of flow marker 2431 by the end of timeout 2414. It should be noted that the described broken flow detection process is robust to flow packet mis-ordering while allowing nodes to detect almost all broken flows rapidly before timeout 2414, 2424, 2444 which may need to be on the order of 30 seconds or more. Broken flow detector 2400 may additionally use hot flow marker 1090 to detect broken flows. Responsiveness may be a tradeoff between responsiveness and realistic maximum flow packet mis-ordering.

Broken Flow Reassembly

Figure 24:
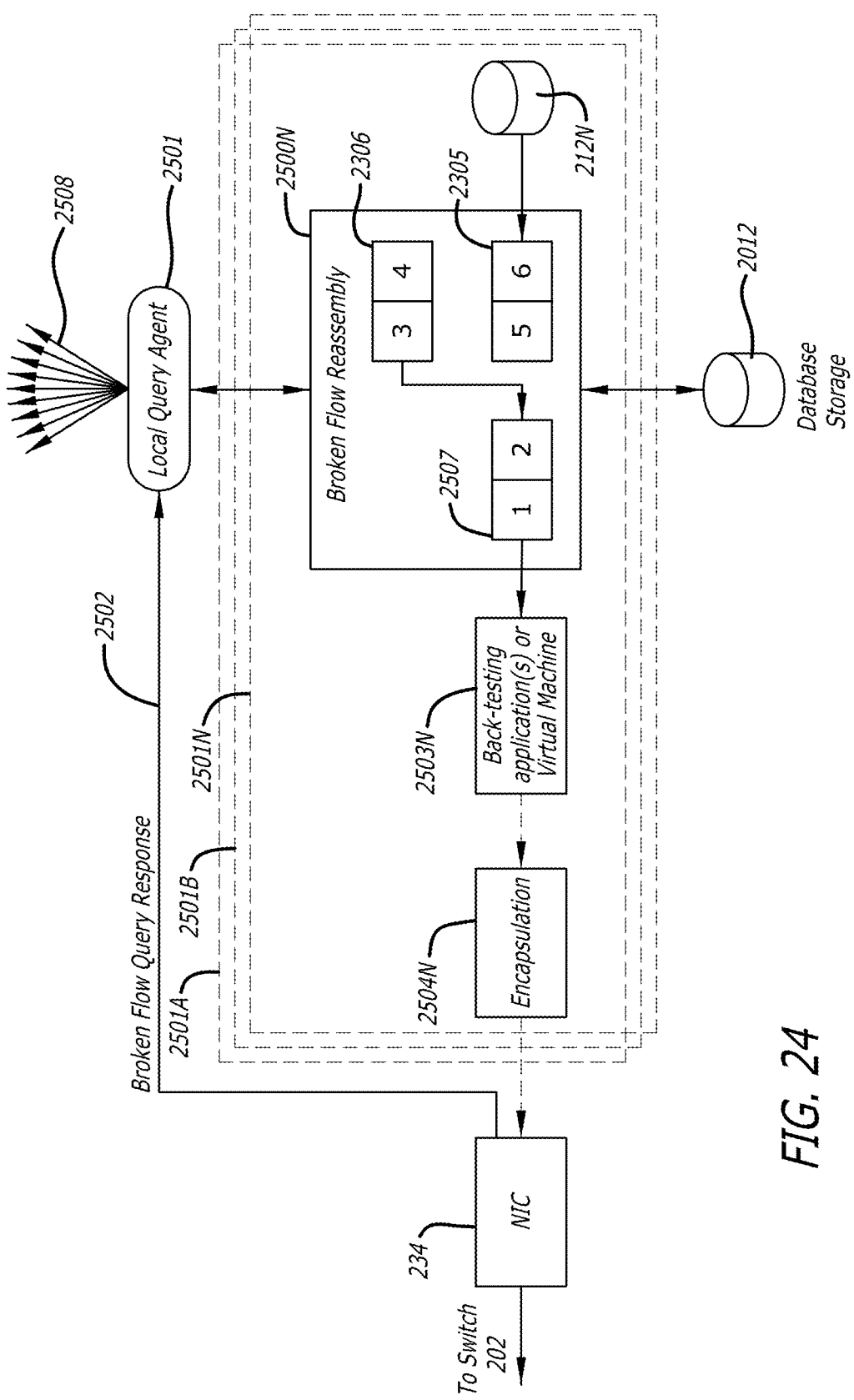
FIG. 24 shows a broken flow reassembly process for back-testing.

FIG. 24 shows a broken flow reassembly process for back-testing. Node back-testing subsystems 2501A,2501B, 2501N read records from corresponding disk 212N. For the first packet read broken flow reassembly process 2500 consults database storage 2012 to determine if the flow 2507,2306,2305 is broken (see FIG. 23). Broken flow reassembly process 2500N is coupled in communication with local query agent 2501, substantially similar to query agent 2000 as described in FIG. 23. If the flow is broken, a query for that flow is multicasted. Query responses 2502 are returned via network interface card 234 and merged by local query agent as in process 2311 into stream 2306. Broken flow reassembly 2500N then merges 2306 and remaining record stream 2305 into completed record stream 2507. When there are multiple broken flows in 2305 there may be additional merging buffers substantially similar to 2306.

Optionally matching records may be returned to the remote query agent via encapsulation 2504 and network interface card 234, or simply summary information of matches via query status messages 2307.

In one embodiment, local query agent 2501 may use information from broken flow messages 2402 or stored in database 2012 to determine a priori which nodes contain records from the broken flow. Hot flows may be limited or excluded from flow reassembly to reduce east-west bandwidth or processed by a highly capable query agent. Broken flows residing on local node disks 212A,212B are also retrieved, although the query response embodiment may differ for efficiency reasons.

Advantages

Intelligent load balancing is provided for distributed deep packet inspection (DPI) and packet storage where individual nodes have limited storage capability. DPI generally identifies flow information by the first N packets, so the flow of the first N packets is maintained together wherever possible. Intelligent load balancing is intended to be used in a system where storage bandwidth is over-provisioned to allow efficient retrieval and analysis. In addition, distributed intrusion detection system (IDS) type analysis is permitted through efficient distributed flow re-assembly with intelligent load balancing.

Separation of "hot" and "cold" traffic allows taking advantage of the different characteristics of each. Cold flows are generally well spread with a good hash function. The individual cold flows typically do not exceed the capacity of a single node. Rebalancing of cold flows only occurs when absolutely necessary and with minimal disruption through utilization of dynamic hash load balancing.

Hot flows make up the majority of the packet traffic and beyond initial deep identification are usually less important. A hot flow may be too hot for an individual node to handle. Hot flows are typically broken up and distributed amongst a plurality of nodes. A portion of an individual hot flow is at least a decent portion of the overall traffic destined for a node by cold balancing. Hot traffic can otherwise be load balanced with a weighted random distribution to produce an even total load over a plurality of nodes.

Hot traffic is treated as cold until a threshold that ensures the first part of the flow is sent to the same destination (unless broken by cold rebalancing). It is desirable to detect sketch false positives and hash collisions where that would lead to breaking cold flows (i.e. incorrectly treating a cold flow as hot). The system can coarsely bin cold flows.

Intelligent load balancing can be used for distributed deep storage, distributed online/offline analysis and efficient retrieval by maintaining flow coherency. It provides minimal flow reconstruction so that east-west traffic is reduced, as well as reducing flow cross section loss on disk or storage failure. In one embodiment, flow reconstruction includes generating or receiving a reconstruction (e.g., replica) of one or more conversations that have been transmitted to one or more nodes. A reconstruction is not necessarily a perfectly accurate reconstruction of the one or more conversations. In one embodiment, flow reconstruction is performed by nodes that are querying each other. A reconstruction may be performed during, and separate from, a back-testing query.

Encapsulation of multiple records reduces packet rate at the node meaning dimensioning is primarily concerned with bandwidth, reducing compute receive interrupt overhead of traditional network interface cards (NICs). This reduces the compute requirements, allowing the use of low cost low power compute units without special purpose capture interfaces thereby providing more headroom for packet analysis.

The system applies very different load balancing policies to hot and cold traffic to mitigate cold flow breakage while maintaining even load suitable for network analytics. The system uses weighted real time hot flow balancing to maximize overall evenness without increasing the number of broken flows (using essentially already broken flows).

The system maintains coherency of cold flows (e.g., coarse cold balancing adjustment only when necessary or a node is still overloaded after the above mechanism fails). The system also takes advantage of the delay in hot flow detection to enable deep packet inspection/application detection even of hot flows.

There is use for the system in distributed network capture and storage that specifically enables distributed online/offline analysis and efficient retrieval through maintaining flow coherency, and allows minimal flow reconstruction that reduces east-west traffic. There is also use for applications that need minimal flow reconstruction (e.g., application detection in DPI). The system also has reduced flow cross section loss on disk failure.

The system has simple load balancing design for network analytics that allows distribution among a large number of very low bandwidth low cost nodes, while capturing at a high rate, including encapsulation to reduce packet rate at nodes. The system has flow-coherent storage which enables IDS back-testing in a distributed manner at real-time speeds.

The system uses a method that is hardware/software agnostic in such a way that high performance can be obtained by placing the data path portions in hardware.

Alternatively, cost can be reduced by placing the data path portions fully in software, while maintaining high efficiency.

The intelligent load balancer and network recorder solution is also generally applicable to network analytics. As network speeds increase far faster than storage/processing speeds, intelligent load balancing should become more in demand. As the method is hardware/software agnostic, a fully software version operating within a virtual environment (e.g., cloud infrastructure-as-a-service) can be a significant technology enabler.

The intelligent load balancing algorithm can significantly improve performance of network produces. Also, a hardware-based platform for IDS "back-testing" has significant potential among large organizations.

CONCLUSION

Various specific materials, designs, dimensions, etc. are provided and are considered highly beneficial embodiments of the present disclosure. However, such specifics are also merely illustrative of broader aspects of the present disclosure and should not be considered to necessarily limit such broader aspects unless expressly specified to be required.

When implemented in software, elements of the embodiments are essentially the code segments or instructions to perform the functional tasks described herein. The code segments or instructions are executable by a processor, such as processor cores in the microcomputer 750 illustrated in FIG. 7B, and can be stored in a storage device or a processor readable storage medium, such as memory 761,762,763 illustrated in FIG. 7B, awaiting execution. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, a hard disk. The code segments or instructions may be downloaded via computer networks such as the Internet, Intranet, etc. into the processor readable storage medium.

Various combinations and sub-combinations, and modifications as may be made, of the presently disclosed components and embodiments and aspects are contemplated whether or not specifically disclosed, to the extent and as would be apparent to one of ordinary skill based upon review of this disclosure and in order to suit a particular intended purpose or application. For example, the high speed intelligent network recorder (or controller unit) may include one or more elements of the intelligent load balancer to further integrate them together as one network device.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the embodiments are to be limited only by patented claims that follow below.

What is claimed is:

1. A high speed intelligent network recorder for distributed recording and analytics of a plurality of flows of network data packets into and out of a computer network over a relevant data time window, the high speed intelligent network recorder comprising:
    a single printed circuit board;
    a high speed network switching device coupled to the single printed circuit board configured to transmit and receive network data packets up to a rate of at least one gigabit per second, the high speed network switching device adapted to couple to a network and receive a plurality of flows of network data packets to and from one or more network devices in the network;
    an X column by Y row array of a plurality of intelligent hard drives coupled to the single printed circuit board and in parallel to the high speed network switching device, each of the plurality of intelligent hard drives including,
        a micro-computer coupled to the high speed network switching device, the micro-computer having a processor, a memory coupled to the processor, and a network interface adapter coupled to the high speed network switching device to send and receipt network data packets,
        a serial advanced technology attachment (SATA) drive coupled to the micro-computer, and
        a network interface adapter coupled to the micro-computer and the high speed network switching device;
    wherein the X column by Y row array of the plurality of intelligent hard drives records a plurality of flows of network data packets in the network over the relevant data time window, wherein the relevant data time window represents the usable storage capacity of the plurality of intelligent hard drives by using a unit of time, and wherein failed storage capacity is identified in the plurality of intelligent hard drives, and wherein a size of the relevant data time window is reduced relative to a size of the failed storage capacity.

2. The high speed intelligent network recorder of claim 1, wherein
    the reliability of each intelligent hard drive in the X column by Y row array of the plurality of intelligent hard drives is monitored to determine if its storage capacity is to be utilized or not as part of a usable storage capacity of the X column by Y row array of the plurality of intelligent hard drives.

3. The high speed intelligent network recorder of claim 2, wherein
    the relevant data time window is responsive to the usable storage capacity of the X column by Y row array of the plurality of intelligent hard drives.

4. The high speed intelligent network recorder of claim 3, wherein
    one or more unreliable intelligent hard drives with failed storage capacity are not replaced in the X column by Y row array of the plurality of intelligent hard drives; and
    the relevant data time window is reduced by a size of the failed storage capacity of the X column by Y row array of the plurality of intelligent hard drives.

5. The high speed intelligent network recorder of claim 3, wherein one or more unreliable intelligent hard drives with failed storage capacity are replaced to maintain the relevant data time window at the storage capacity of the X column by Y row array of the plurality of intelligent hard drives.

6. The high speed intelligent network recorder of claim 1, wherein
network data packets most recently stored in the X column by Y row array of intelligent hard drives are the most relevant data in the relevant data time window, and
network data packets least recently stored in the X column by Y row array of intelligent hard drives are the least relevant data in the relevant data time window.

7. The high speed intelligent network recorder of claim 1, wherein
the relevant data time window is more than one weeks worth of an expected plurality of flows of network data packets and less than one years worth of the expected plurality of flows of network data packets.

8. The high speed intelligent network recorder of claim 1, wherein
if the storage capacity of the X column by Y row array of intelligent hard drives is filled with a plurality of flows of network data packets, then least recently received network data packets near the end of the relevant data time window are overwritten with most recently received network data packets.

9. The high speed intelligent network recorder of claim 1, wherein
network data packets are stamped with addresses so that the high speed network switching device directs the network data packets to addresses associated with the intelligent hard drives in the X column by Y row array of intelligent hard drives to load balance the recording of the plurality of flows of the network data packets.

10. The high speed intelligent network recorder of claim 1, wherein
the high speed network switching device monitors reliability of each intelligent hard drive and is adapted to zero out the recording load on an unreliable intelligent hard drive.

11. The high speed intelligent network recorder of claim 4, wherein
the one or more unreliable intelligent hard drives with failed storage capacity exceed one or more of a threshold level of a data error rate, a threshold level of sector remapping, a threshold level of bad blocks, a threshold level of corrected errors, a threshold level of drive operating temperature, a threshold level of spin retry count, a threshold level of a count of command timeouts, a threshold level of an uncorrectable error count; a threshold level of a write error rate, or a threshold level of a read error rate.

12. A high speed intelligent network recorder for recording a plurality of flows of network data packets into and out of a computer network over a relevant data time window, the high speed intelligent network recorder comprising:
a single printed circuit board;
a high speed network switching device coupled to the single printed circuit board;
an X column by Y row array of a plurality of micro-computers coupled to the single printed circuit board and coupled in communication with the high speed network switching device, each of the micro-computers including
a processor,
a memory coupled to the processor, and
a network interface adapter coupled to the high speed network switching device to send and receipt network data packets;
an X column by Y row array of a plurality of hard drive sockets coupled to the single printed circuit board and coupled to the X column by Y row array of the plurality of micro-computers; and
an X column by Y row array of a plurality of pluggable hard drives plugged into the X column by Y row array of the plurality of hard drive sockets and coupled in communication with the X column by Y row array of the plurality of micro-computers, wherein the X column by Y row array of the plurality of pluggable hard drives records a plurality of flows of network data packets into the network over a relevant data time window in an adaptive load balanced manner, wherein the relevant data time window represents the usable storage capacity of the plurality of pluggable hard drives by using a unit of time, and wherein failed storage capacity is identified in the plurality of pluggable hard drives, and wherein a size of the relevant data time window is reduced relative to a size of the failed storage capacity.

13. The high speed intelligent network recorder of claim 12, wherein
each of the plurality of pluggable hard drives is a two and one half inch standardized form factor hard drive.

14. The high speed intelligent network recorder of claim 12, wherein
each of the plurality of pluggable hard drives is a serial advanced technology attachment (SATA) magnetic hard disk drive.

15. The high speed intelligent network recorder of claim 14, wherein
each of the plurality of hard drive sockets is a serial advanced technology attachment (SATA) socket.

16. The high speed intelligent network recorder of claim 12, wherein
each of the plurality of pluggable hard drives is a solid state drive.

17. The high speed intelligent network recorder of claim 16, wherein
each of the plurality of hard drive sockets is a serial advanced technology attachment (SATA) socket; and
each of the plurality of pluggable hard drives is a SATA solid state drive.

18. The high speed intelligent network recorder of claim 12, wherein
each of the plurality of pluggable hard drives is plugged into the X column by Y row array of the plurality of hard drive sockets so their length is perpendicular to the single printed circuit board.

19. The high speed intelligent network recorder of claim 12, further comprising:
an X column by Y row array of elastic bumpers around a portion of the X column by Y row array of plurality of pluggable hard drives, the X column by Y row array of elastic bumpers adapted to dampen vibrations from one or more rotating magnetic platters and one or more moveable read/write heads in each of the X column by Y row array of pluggable hard drives.

* * * * *